US006853392B2

(12) United States Patent
Maeda

(10) Patent No.: US 6,853,392 B2
(45) Date of Patent: Feb. 8, 2005

(54) IMAGE FORMING APPARATUS THAT ADJUSTS IMAGE POSITIONAL DEVIATION WITHOUT FAIL

(75) Inventor: Katsuhiko Maeda, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 10/633,711

(22) Filed: Aug. 5, 2003

(65) Prior Publication Data

US 2004/0095454 A1 May 20, 2004

(30) Foreign Application Priority Data

Aug. 6, 2002 (JP) ....................................... 2002-229255
Jul. 25, 2003 (JP) ....................................... 2003-202102

(51) Int. Cl.[7] ......................... B41J 2/385; G01D 15/06; G03G 15/01

(52) U.S. Cl. ....................................... 347/116; 399/301

(58) Field of Search ................................ 347/116, 248; 101/365, 486; 399/162, 165, 299, 301, 302; 369/97

(56) References Cited

U.S. PATENT DOCUMENTS

| | | | | | |
|---|---|---|---|---|---|
| 5,208,796 | A | * | 5/1993 | Wong et al. | 369/97 |
| 5,381,167 | A | * | 1/1995 | Fujii et al. | 347/116 |
| 5,394,223 | A | * | 2/1995 | Hart et al. | 399/165 |
| 5,576,753 | A | * | 11/1996 | Kataoka et al. | 347/248 |
| 5,722,003 | A | * | 2/1998 | Suzuki et al. | 399/39 |
| 5,940,114 | A | * | 8/1999 | Kataoka et al. | 347/248 |
| 6,118,463 | A | * | 9/2000 | Houki et al. | 347/116 |
| 6,137,517 | A | * | 10/2000 | Furst et al. | 347/116 |
| 6,321,060 | B1 | * | 11/2001 | Nakayasu et al. | 399/301 |
| 6,348,937 | B2 | * | 2/2002 | Hata | 347/116 |
| 6,661,440 | B2 | * | 12/2003 | Nishigaki et al. | 347/116 |
| 6,684,780 | B2 | * | 2/2004 | Shiraishi | 101/365 |

FOREIGN PATENT DOCUMENTS

| | | |
|---|---|---|
| JP | 63-286864 | 11/1988 |
| JP | 7-244412 | 9/1995 |
| JP | 11-58842 | 3/1999 |

* cited by examiner

*Primary Examiner*—Eugene H. Eickholt
(74) *Attorney, Agent, or Firm*—Oblon, Spivak, McClelland, Maier & Neustadt, P.C.

(57) ABSTRACT

An image forming apparatus that forms a multi-color image by superposing a plurality of monochrome images is provided. The image forming apparatus includes, for each color, an image forming unit that forms the monochrome image; a pattern forming unit that forms a predetermined compensation pattern; a pattern position detecting unit that detects the position of the compensation pattern formed by the pattern forming unit; and an image position adjusting unit that adjusts the position of the monochrome image to be formed by the image forming unit based on the position of the compensation pattern detected by the pattern position detecting unit. Since the compensation pattern is formed under an image forming condition adjustable independently from another image forming condition with which the monochrome images are formed, the image forming apparatus can adjust positional deviation of monochrome images.

80 Claims, 50 Drawing Sheets

IMAGE FORMING APPARATUS THAT ADJUSTS IMAGE POSITIONAL DEVIATION WITHOUT FAIL

BACKGROUND OF THE INVENTION

1. Field of the Invention

The present invention generally relates to a color image forming apparatus that forms a color image by superposing a plurality of monochrome images, to a process cartridge, a photosensitive body unit, and a development unit used for the color image forming apparatus, and to a method of adjusting positional deviation of the images. The present invention more particularly relates to a image forming apparatus that adjusts the position of the monochrome images to be superposed, to a process cartridge, a photosensitive unit, and a development unit used therein, and to a method of adjusting positional deviation of the images.

2. Description of the Related Art

Conventionally, color image forming apparatuses form color images by superposing monochrome images of a plurality of colors. Unlike monochrome image forming apparatuses that do not need to superpose images, the color image forming apparatuses, when they fail to precisely adjust the position of monochrome images to be superposed, may have problems such as change in color of line drawings and characters, and mottling. Accordingly, the color image forming apparatuses need to precisely adjust the position of monochrome images to be superposed.

For example, an image forming apparatus that forms color images using a plurality of photosensitive bodies may fail to adjust the position of monochrome images to be superposed in the main scan directions due to various reasons such as change in ambient and inside temperature, and cause positional deviation in the formed color images. Japanese Patent Laid-open Application No. 63-286864 (Patent No. 2642351) discloses an image forming apparatus that can compensates such positional deviation of images.

According to the invention disclosed in the above application, the image forming apparatus is provided with a straight line (reference unit) extending on the transfer belt in the main scan directions and oblique lines-extending oblique to the moving direction of the transfer belt. The reference unit and the oblique lines are detected by sensors. The positional deviation of the oblique lines in the main scan directions is calculated by a CPU based on the reference values stored in a memory and the actual distance between the reference unit and the oblique lines measured by the sensors. At least one of write timing in the main scan directions and write clock is adjusted based on the calculation. Accordingly, the image forming apparatus can compensate for the positional deviation of images due to not only environmental change but also change over time. The image forming apparatus can form high quality color image without color deviation.

Japanese Patent Laid-open Application No. 11-58842 discloses an image forming apparatus that can change the distance between a compensation pattern for measuring color deviation and sensors for detecting the compensation pattern. Accordingly, the image forming apparatus can detect the compensation pattern at high precision.

Such a system forms the compensation pattern for detecting positional deviation of images on the transfer belt, detects the compensation pattern with sensors, and measures the positional deviation of images based on a signal from the sensor. The measured positional deviation is fed back a compensation unit that adjusts the position of the images. In this case, the compensation pattern needs to be high enough in density so that the sensors can detect the compensation pattern.

If the pattern for compensating for the positional deviation of images is sparse, the sensor cannot detect the pattern correctly. Then, the image forming apparatus fails to compensate for the positional deviation of images and consequently forms color images of low quality.

Japanese Patent Laid-open Application No. 7-244412 discloses an image forming apparatus that forms patch images under an image forming condition that is different from an image forming condition under which the images are formed. The image forming apparatus can detect the patch image at high sensitivity. The image forming apparatus disclosed in the above application, however, detects the patch images at high sensitivity in order to improve the quality of images. The image forming apparatus cannot determine whether the patch image is detectible. The image forming apparatus uses a line image, instead of the patch image, as the compensation pattern for measuring color deviation. Accordingly, the image forming apparatus may fail to detect the compensation pattern due to various reasons.

As described above, although the image forming apparatus forms the compensation pattern for compensating for the positional deviation of images, if it fails to detect the compensation pattern, the image forming apparatus cannot compensate for the color deviation, which results in degrading of the image quality. If the image density of the compensation pattern is not high enough for the sensor to detect, the image density needs to be increased.

SUMMARY OF THE INVENTION

Accordingly, it is a general object of the present invention to provide a novel and useful image forming apparatus, and more particularly, to provide an image forming apparatus that outputs color images of high quality by compensating for the positional deviation of monochrome images without fail, a process cartridge, a photosensitive body unit, and developing unit used in the image forming apparatus, and a method of compensating for positional deviation of images.

To achieve one or more of the above objects, an image forming apparatus that forms a multi-color image by superposing a plurality of monochrome images, according to the first aspect of the present invention, includes: a plurality of image forming units corresponding to respective colors, each of which forms a monochrome image; a plurality of pattern forming units corresponding to respective colors, each of which forms a predetermined compensation pattern; a plurality of pattern position detecting units corresponding to respective colors, each of which detects the position of the compensation pattern formed by the pattern forming unit of the corresponding color; and a plurality of image position adjusting units corresponding to respective colors, each of which adjusts the position of the monochrome image to be formed by the image forming unit based on the position of the compensation pattern detected by the pattern position detecting unit of the corresponding color; wherein the compensation pattern is formed under an image forming condition adjustable independently from another image forming condition with which the monochrome image formed by the image forming unit of the corresponding color is formed.

Before forming monochrome images, the pattern forming unit of each color forms the compensation pattern on a image retaining unit, and the pattern position detecting unit detects the position of the formed compensation pattern. The image position adjusting unit of each color adjusts the position of the monochrome image based on the detected position of the formed compensation pattern. Since the image forming condition with which the compensation pattern is formed is independently adjustable from the image forming condition with which the monochrome images are formed, the image forming apparatus according to the first aspect of the present invention can compensate for the image deviation without fail, and can output color images without color deviation.

According to the second aspect of the present invention, a process cartridge that is used for the above image forming apparatus, includes: an image retaining unit; at least one of a charging unit that charges said image retaining unit, a development unit, and a cleaning unit that cleans said image retaining unit; a memory unit that stores an image forming condition to be used when said compensation pattern is formed; wherein said image retaining unit and at least one of said charging unit, said development unit, and said cleaning unit are combined and detachable from said image forming apparatus.

The detachable process cartridge can store the image forming condition with which the compensation pattern is formed. Accordingly, even if the process cartridge is detached and then reattached to the image forming apparatus, the image forming apparatus can read the image forming condition stored in the process cartridge and can compensate for the image deviation without fail.

According to the third aspect of the present invention, a photosensitive body unit used for the image forming apparatus of claim 2 is characterized in that said photosensitive body unit is structured by said image retaining unit combined with at least one of a charging unit that charges said image retaining unit and a cleaning unit that cleans said image retaining unit; and said photosensitive body unit is provided with a memory unit that stores the image forming condition used when said compensation pattern is formed.

The photosensitive body unit can store the image forming condition with which the compensation pattern is formed. Accordingly, the image forming apparatus with the photosensitive body provided therein can compensate for the image deviation without fail.

According to the fourth aspect of the present invention, a detachable development unit that is used for the above image forming apparatus includes a memory unit that stores an image forming condition to be used when said compensation pattern is formed.

Since the detachable development unit can store the image forming condition with which the compensation pattern is formed, the image forming apparatus with the development unit provided therein can compensate for the image deviation without fail.

According to the fifth aspect of the present invention, a method of compensating for image deviation, by an image forming apparatus that forms a color image by superposing a plurality of monochrome images, is provided with the steps of: setting an image forming condition with which a prescribed compensation pattern for compensating for said image deviation of each monochrome image is formed; forming said prescribed compensation pattern of each monochrome image using said set image forming condition; detecting the pattern position of said formed compensation pattern; adjusting the image position at which each monochrome image is formed based on said determined pattern position.

An image forming apparatus that performs the method of compensating for the image deviation can detect the compensation pattern without fail, which results in forming of color images without color deviation.

The image forming apparatus according to the present invention, before performing adjustment of image positional deviation, confirms whether the image of the compensation pattern is dense enough. If the image of the compensation pattern is sparse, the image forming apparatus adjusts the image density of the compensation pattern, and then, it adjusts the image positional deviation without fail. Accordingly, the image forming apparatus can output color images of high quality. For example, it the toner density is so low that the image of the compensation pattern is sparse, the image forming apparatus increases the toner density.

If the image forming apparatus according to the present invention adjusts the image density of the compensation pattern before it compensates for the image positional deviation, the adjustment requires additional time. That is, the speed of printing may be lowered.

Accordingly, when the speed of printing is prioritized, the image forming condition may be changed before performing the image positional deviation so that the image density of the compensation pattern is increased by increasing the toner density and/or changing development condition, for example. Even if the image of the compensation pattern is sparse, the image forming apparatus can compensate for the image positional deviation without fail.

If the image density of the ordinary images (the actual images to be formed) is too high, it may cause problems such as too dense image and background dust, for example. In the case of the image of the compensation pattern, even if the image density is too high, the image density does not cause any problem unless the image of the compensation pattern is detectible.

A memory unit may be provided to the process cartridge, the photosensitive body unit, and/or the development unit, and the image forming condition may be stored in the memory unit. If those elements are detached from the image forming apparatus and reattached to the image forming apparatus, since the memory unit stores the image forming condition, the image forming apparatus can read the image forming apparatus from the memory unit and adjust the image positional deviation without fail.

If the reserved toner is stored in the process cartridge and/or the development unit, the reserved toner can be supplied to the development unit if necessary. Accordingly, the image forming apparatus can reduce time interval required for supplying toner.

If a cleaning unit that cleans the portion of the image retaining unit in which the compensation pattern is to be formed, the image forming apparatus can clean the portion of the image retaining unit enough, and detect the compensation pattern without fail.

Other objects, features, and advantages of the present invention will become more apparent from the following detailed description when read in conjunction with the accompanying drawings.

DETAILED DESCRIPTION OF THE PREFERRED EMBODIMENTS

[1st Embodiment]

The first embodiment of the present invention is described in detail below.

Figure 1:
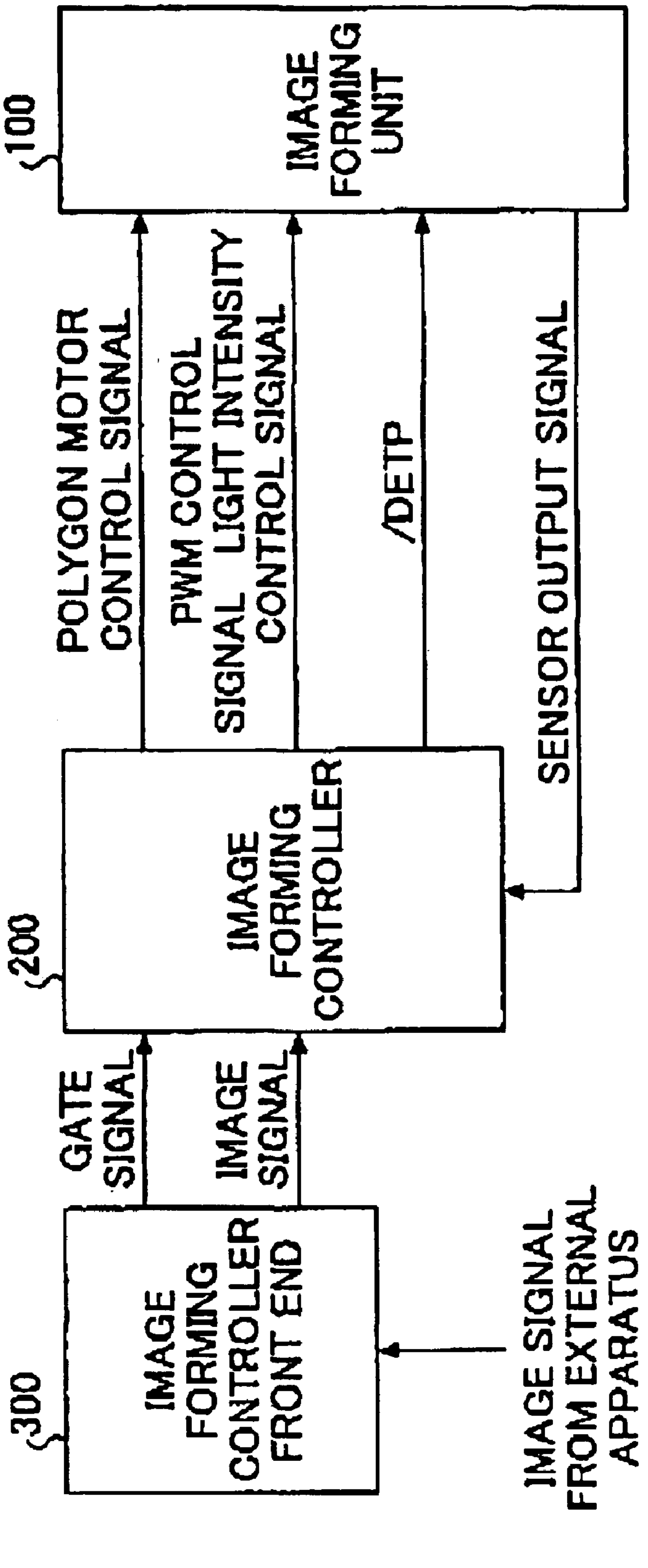
FIG. 1 is a block diagram showing the structure of an image forming apparatus according to the first embodiment of the present invention.

FIG. 1 is a block diagram showing the structure of an image forming apparatus according to the first embodiment. The image forming apparatus according to the first embodiment includes an image forming unit 100, an image forming controller 200, and an image forming controller front end 300.

An image signal from an external apparatus (not shown) such as a frame memory and a scanner is received by the image forming controller front end 300, and is output to the image forming controller 200 in response to a gate signal. The image forming controller 200 outputs a polygon motor control signal, a PWM control signal, and a light intensity control signal, for example, to the image forming unit 100.

The image forming controller 200 compensates for the positional deviation of images by controlling the polygon motor control signal, the PWM control signal, and the light intensity control signal, for example, based on a sensor output signal output by the image forming unit 100.

Figure 2:
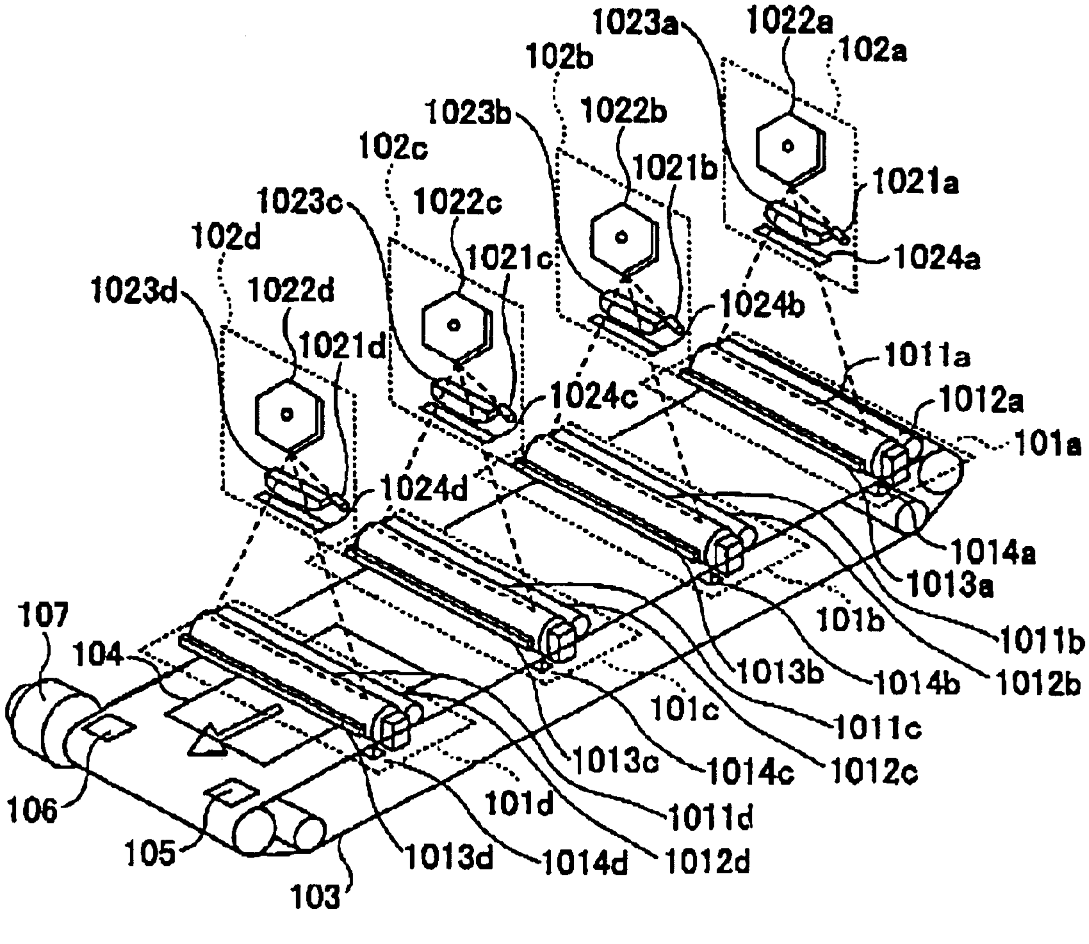
FIG. 2 is a schematic diagram showing the structure of an image forming unit provided in the image forming apparatus according to the first embodiment of the present invention.

FIG. 2 is a schematic diagram showing the structure of the image forming unit 100 of the image forming apparatus according to the first embodiment. The image forming apparatus according to the embodiment is a four-drum type color image forming apparatus. The image forming unit 100 is provided with four image forming units 101 (101*a*–101*d*) and four light beam scanning apparatuses 102 (102*a*–102*d*) that form color images by superposing monochrome images of four colors, yellow (Y), magenta (M), cyan (C), and black (BK), respectively. Each image forming unit 101 (101*a*–101*d*) includes a photosensitive body 1011 (1011*a*–101*d*), a development unit 1012 (1012*a*–1012*d*), a charging unit 1013 (1013*a*–1013*d*), and a transfer unit 1014 (1014*a*–1014*d*).

The image of the first color is formed on the sheet of paper 104 carried by the transfer belt 103 in the direction indicated by an arrow. Likewise, the images of the second, third, and fourth colors are also formed on the sheet of paper 104 one by one. A color image in which the images of four colors are superposed is thus formed on the sheet of paper 104. The color image is then fixed on the sheet of paper 104 by a fixing unit (not shown). The transfer belt 103 is driven by a carrying motor 107.

Each image forming unit 101 (101*a*–101*d*) includes a charging unit 1013 (1013*a*–1013*d*), a developing unit 1012 (1012*a*–1012*d*), a transfer unit 1014 (1014*a*–1014*d*), a cleaning unit (not shown), and a discharging unit (not shown) provided around a photosensitive body 1011 (1011*a*–1011*d*). An image is formed on the sheet of paper 104 through the steps of charging, exposing, developing, and transferring in the same manner as conventional electrophotography.

The image forming unit 100 is also provided with sensors 105 and 106 for detecting the pattern for adjusting the image position. The sensors 105 and 106 are reflection type optical sensors. The sensors 105 and 106 detect the pattern (oblique line pattern and perpendicular line pattern) for adjusting the image position formed on the transfer belt 103. A printer controller 207 (see FIG. 3) compensates for the positional deviation of the image of each color both in the main scan directions and in the sub scan directions, and magnification of the image in the main scan directions based on the detection of the sensors 105 and 106. The operation of the printer control unit 207 is described in detail below.

A light beam scanning apparatus 102 (102*a*–102*d*) is provided with an LD unit 1021 (1021*a*–1021*d*) that is driven and modulated based on image data and selectively outputs a light beam. The light beam output by the LD unit 1021 (1021*a*–1021*d*) is deflected by a polygon mirror 1022 (1022*a*–1022*d*) rotated by a polygon motor (not shown), and travels to a mirror (not shown in FIG. 2) via a fθ lens 1023 (1023*a*–1023*d*) and a BTL 1024 (1024*a*–1024*d*). The light beam reflected by the mirror scans the photosensitive body 1011 (1011*a*–101*d*).

BTL stands for Barrel Toroidal Lens that focuses the light beam in the sub scan directions and adjusts the convergence of the light beam and the image position in the sub scan directions.

Although not shown in FIG. 2, a sync detection sensor 1027 (1027*a*–1027*d*) is disposed in a marginal area where no image is written in front of a write start position in the main scan directions. The sync detection sensor 1027 (1027*a*–1027*d*) receives the light beam deflected by the polygon mirror 1022 (1022*a*–1022*d*) and outputs a sync detection signal for determining write start timing in the main scan directions.

Figure 3:
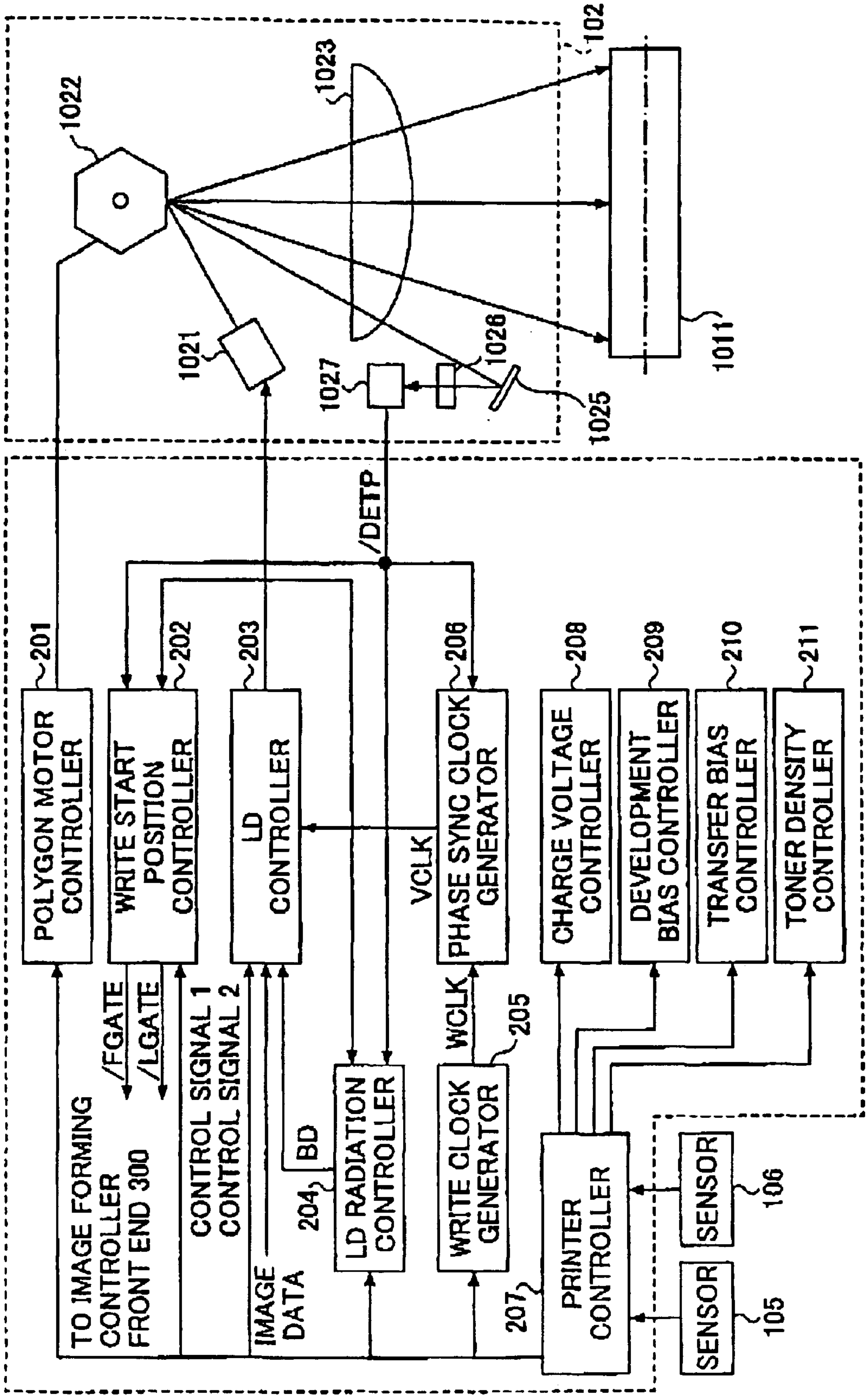
FIG. 3 is a block diagram showing the structure of an image forming controller provided in the image forming apparatus according to the present invention.

FIG. 3 is a block diagram showing the structure of the image forming controller 200. The sync detection sensor 1027 is disposed adjacent to the write start position in the main scan directions of the light beam scanning apparatus 102. The sync detection sensor 1027 detects the light beam that transmits through an f-theta lens 1023, is reflected by a mirror 1025, and converged by a lens 1026.

In response to reception of the light beam, the sync detection sensor 1027 outputs a sync detection signal /DETP. The sync detection signal /DETP is sent to a phase sync clock generator 206, an LD radiation controller 204, and a write start position controller 202. The phase sync clock generator 206 generates a clock VCLK based on a clock WCLK generated by the write clock generator 205 and the sync detection signal /DETP. The clock VCLK is in synchronization with the /DETP, and is transmitted to an LD controller 203, the LD radiation controller 204, and the write start position controller 202. The LD radiation controller 204 initially turns on an LD compulsory radiation signal BD to compulsorily activate the LD in order to detect the sync detect signal /DETP. Once the sync detection signal /DETP is detected, the LD radiation controller 204 turns on the LD compulsory radiation signal BD based on the sync detection signal /DETP and the clock VCLK so that the sync detection signal /DETP can be detected without fail to the extent that no flare light is radiated. The LD compulsory radiation signal BD is transmitted to the LD controller 203.

The LD controller 203 turns on the LD based on pulse signal width generated based on the image signal that is in synchronization with the compulsory radiation signal BD and the clock VCLK. The LD unit 1021 radiates a laser beam. The laser beam radiated by the LD unit 1021 is deflected by the polygon mirror 1022, and the deflected laser beam is transmitted through the f-theta lens 1023. The transmitted laser beam scans the photosensitive body 1011.

A polygon motor controller 201 controls the rotation of the polygon motor 1022 based on a control signal from a printer controller 207 so that the rotative speed of the polygon motor 1022 is kept at a predetermined value. For example, the polygon motor controller 201 controls the rotation of the polygon motor 1022 so that the number of turns in a minute becomes a predetermined constant.

Figure 4:
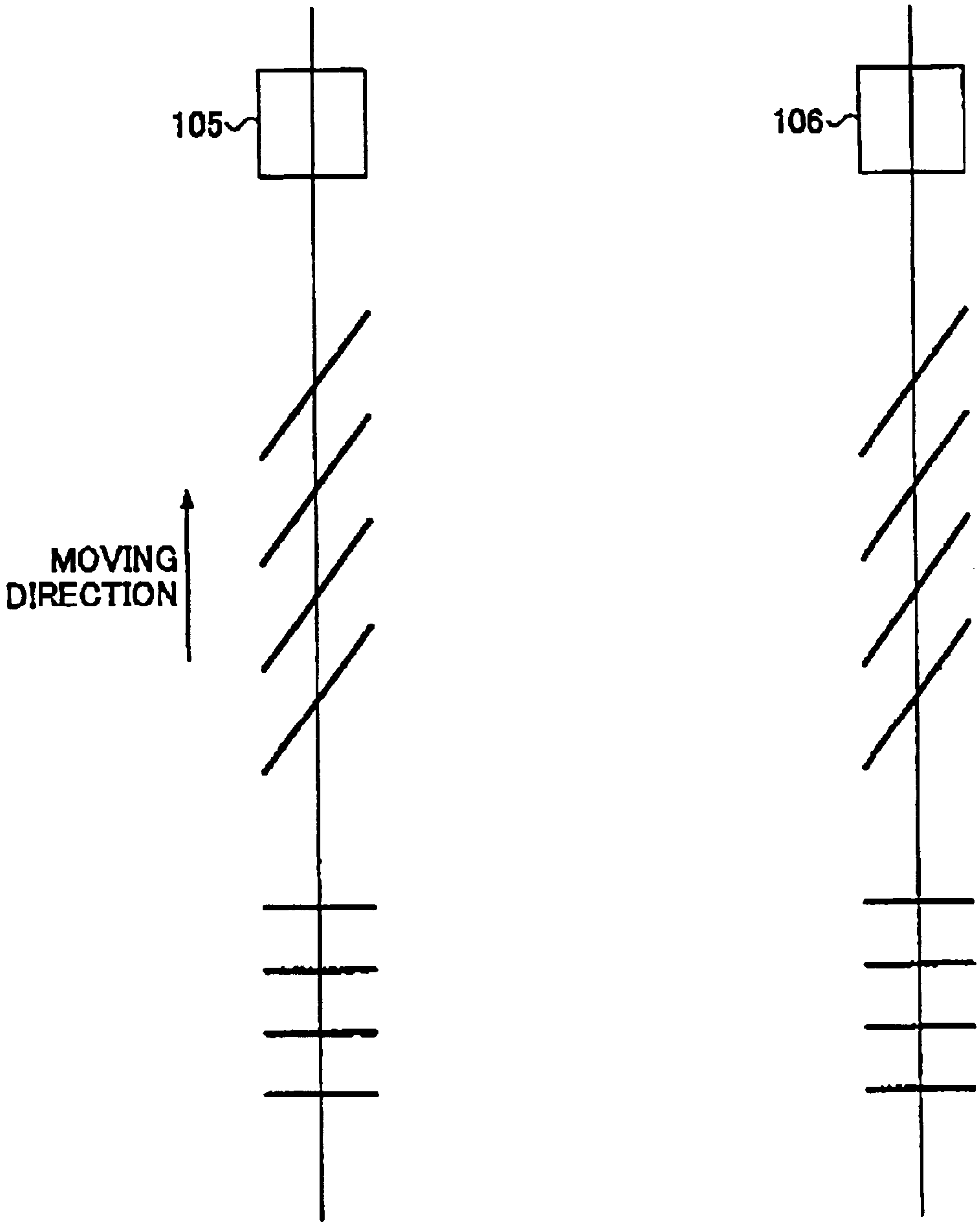
FIG. 4 is a schematic diagram showing a pattern for adjusting image position.

FIG. 4 is a schematic diagram showing a compensation pattern for adjusting the position of images. The compensation pattern is formed on the transfer belt 103. As shown in FIG. 4, oblique lines and perpendicular lines that are distant by a distance (timing) predetermined for each color are formed on the transfer belt 103.

When the transfer belt 103 moves in a direction indicated by the arrow, the oblique lines and the perpendicular lines are detected by the sensors 105 and 106. The output signals from the sensors 105 and 106 are sent to the printer controller 207 so as to calculate the amount of deviation (time) of each color based on black BK as a reference.

When the position of the image is deviated in the main scan directions, the oblique lines of the image position adjustment pattern are detected at a different timing. Accordingly, not only the positional deviation but the change in image magnification can be detected based on the detection of the oblique lines on both edges by the sensors 105 and 106. That is, even the change in image magnification is determinable by detecting the image position adjustment pattern formed on both edges of the transfer belt 103 by the sensors 105 and 106.

When the position of an image in the sub scan directions deviates, the perpendicular lines of the image position adjustment pattern are detected at a different timing. The printer controller 207 calculates a time based on a signal output when the sensors 105 and 106 detect the perpendicular lines, and compares the calculated time with a reference time that is set in advance. The printer controller 207 further calculates the amount of deviation of each color in the main scan directions based on black BK, the error of magnification in the main scan directions, and the amount of deviation in the sub scan directions. The printer controller 207 adjusts the write start position in the main scan directions by adjusting the /LGATE signal by a cycle of the clock VCLK based on the above calculation. The image magnification in the main scan directions is compensated for by changing the frequency of the clock WCLK. The write start position in the sub scan directions is compensated for by adjusting the the /FGATE signal by a cycle (a line) of the sync detection signal /DETP.

The sensors 105 and 106 read the image position adjustment pattern and output the signal to the printer controller 207. Based on the output signal, the printer controller 207 calculates the amount of deviation (time) of each monochrome image using the black BK image as a reference as described above. The printer controller 207 generates compensation data for adjusting the write start position in the main scan directions and the sub scan directions, and transmits the compensation data to the write start position controller 202. The write start position controller 202 adjusts the timing of the main scan gate signal /LGATE and the sub scan gate signal /FGATE.

The image magnification is compensated for by adjusting the frequency of the clock WCLK. Accordingly, the printer controller 207 sends frequency setting data to the write clock generator 205 so as to adjust the frequency of the clock WCLK.

A charge voltage controller 208, a development bias controller 209, a transfer bias controller 210, and a toner density controller 211 are connected to the printer controller 207. Each unit operates based on instructions from the printer controller 207.

Figure 5:
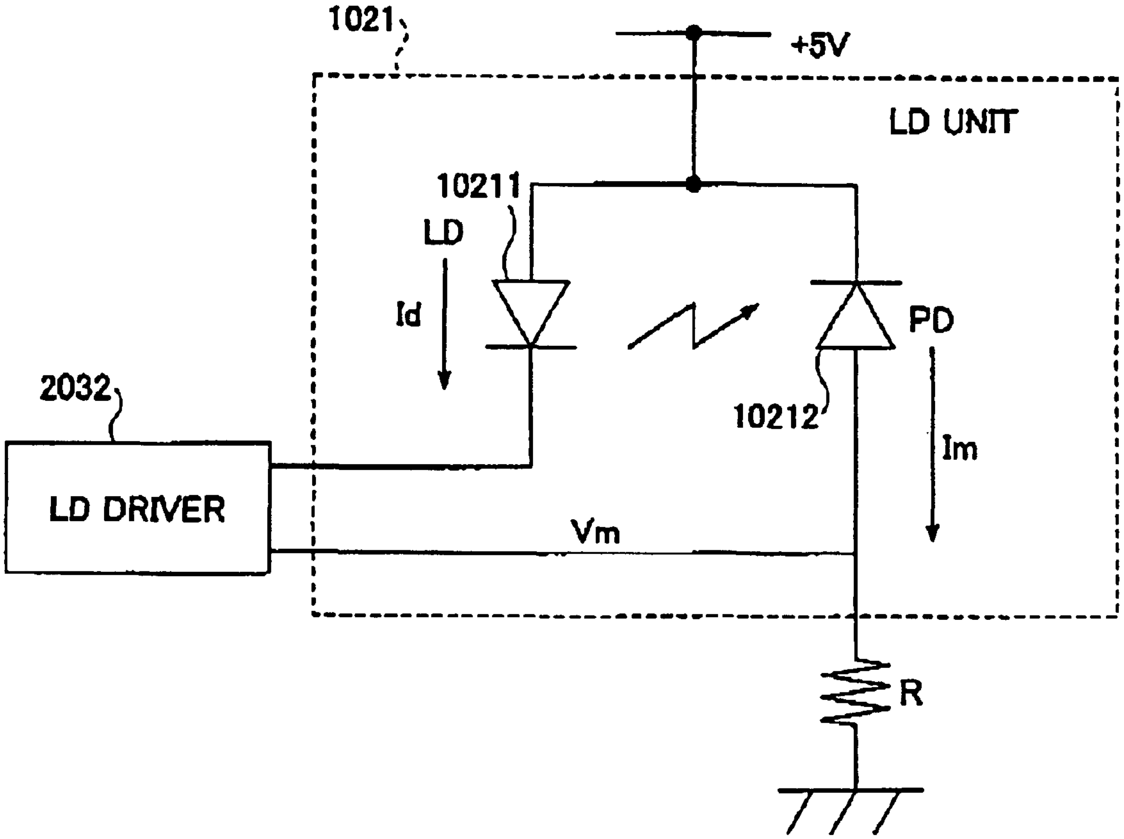
FIG. 5 is a circuit diagram showing the structure of an LD unit according to an embodiment.

FIG. 5 is a circuit diagram showing the structure of the LD unit 1021. The LD unit 1021 is provided with a laser diode (LD) 10211 and a photo diode (PD) 10212 in the same manner as conventional LD units. An LD driver 2032 controls an LD current Id and keeps the monitor voltage Vm of the PD 10212 constant so that the LD 10211 radiates a laser beam of a light intensity designated by the printer controller 207 (Auto Power Control). If the light intensity needs to be changed, the LD driver 2032 adjusts the LD current Id so that the monitor voltage Vm remains at a designated value.

According to an embodiment, the LD driver 2032 is provided in the LD controller 203.

Figure 6:
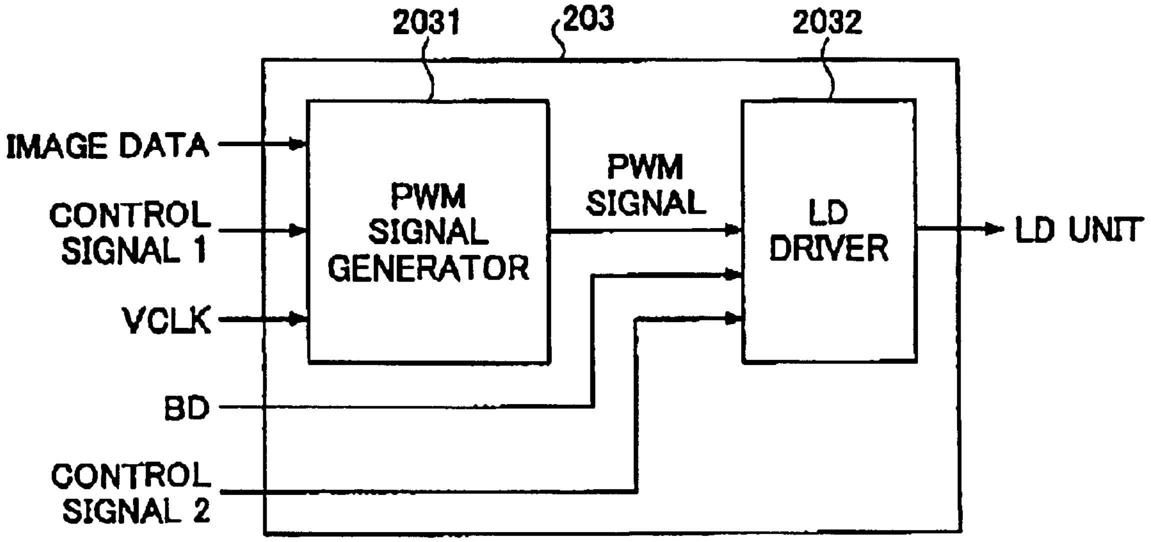
FIG. 6 is a block diagram showing the structure of LD controller according to an embodiment.

FIG. 6 is a block diagram showing the structure of the LD controller 203. The LD controller 203 includes a PWM signal generator 2031 that generates a signal for controlling the time in which the LD 10211 is ON and the LD driver 2032 that controls the LD 10211. The PWM signal generator 2031 outputs the PWM signal to the LD driver 2032 based on the image data and a signal 1 (a pulse width control signal) from the printer controller 207. The LD driver 2032 causes the LD 10211 to radiate a laser beam for time (time interval) to be determined by the PWM signal. If the LD compulsory radiation signal BD provided to the LD driver 2032 is ON, the LD driver 2032 causes the LD 10211 to radiate a laser beam. The light intensity of the LD 10211 is determined by a control signal 2 (light intensity control signal) from the printer controller 207.

The image data may be 1-bit wide, or multi-bit wide (2 bits or more). In the case of 1-bit wide image data, the PWM signal generator may generate a pulse of a predetermined pulse width. In the case of multi-bit wide image data, the PWM signal generator may generate pulses of which pulse width corresponds to image data. The PWM signal generator may change the pulse width corresponding to the image data depending on the control signal 1 (selection signal).

Figure 7:
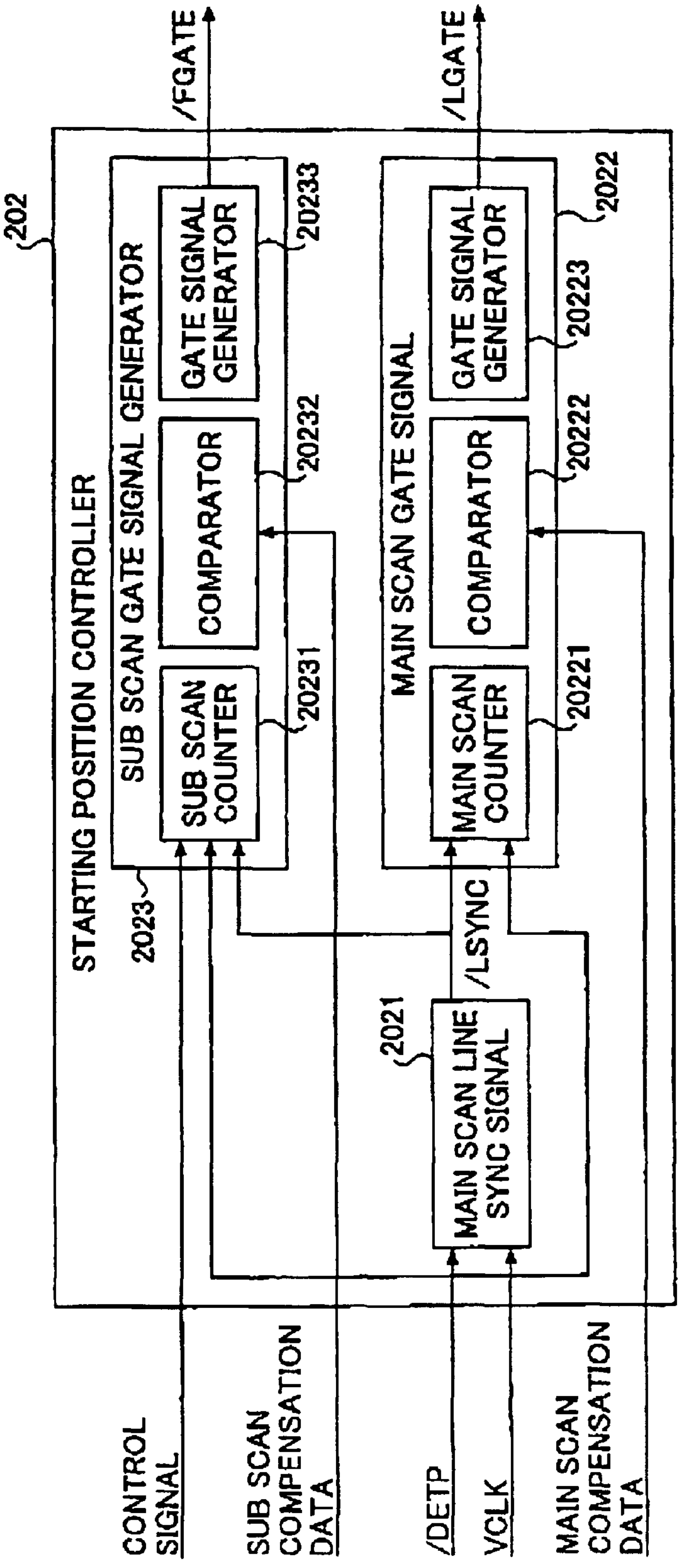
FIG. 7 is a block diagram showing the structure of a starting position controller according to an embodiment.

FIG. 7 is a block diagram showing the structure of the write start position controller 202. The write start position controller 202 is provided with a main scan line sync signal generator 2021, a main scan gate signal generator 2022, and a sub scan gate signal generator 2023. The main scan line sync signal generator 2021 generates a signal /LSYNC for operating a main scan counter 20221 in the main scan gate sync generator 2022 and a sub scan counter 20231 in the sub scan gate signal generator 2023. The main scan gate signal generator 2022 generates a signal /LGATE for determining timing (timing to start writing an image in the main scan direction) in which the image signal is acquired. The sub scan gate signal generator 2023 generates a signal /FGATE for determining timing (timing to start writing an image in the sub scan direction) in which the image signal is acquired.

The main scan gate signal generator 2022 is provided with the main scan counter 20221 that operates depending on /LSYNC and VCLK, a comparator 20222 that compares the count of the main scan counter 20221 and main scan compensation data from the printer controller 207 and outputs the result of the comparison, and a gate signal generator 20223 that generates /LGATE based on the result of the comparison output by the comparator 20222.

The sub scan gate signal generator 2023 is provided with the sub scan counter 20231, a comparator 20232, and a gate signal generator 20233. The sub scan counter 20231 operates depending on /LSYNC and VCLK. The comparator 20232 compares the count of the sub scan counter 20231 and sub scan compensation data from the printer controller 207 and outputs the result of the comparison. The gate signal generator 20233 generates /FGATE based on the result of the comparison output by the comparator 20232.

The write start position controller 202 adjusts the position to start writing the image by a cycle of the clock VCLK (that is, by one dot) in the main scan directions and by a cycle of /LSYNC (that is, by one line) in the sub scan directions.

Figure 8:
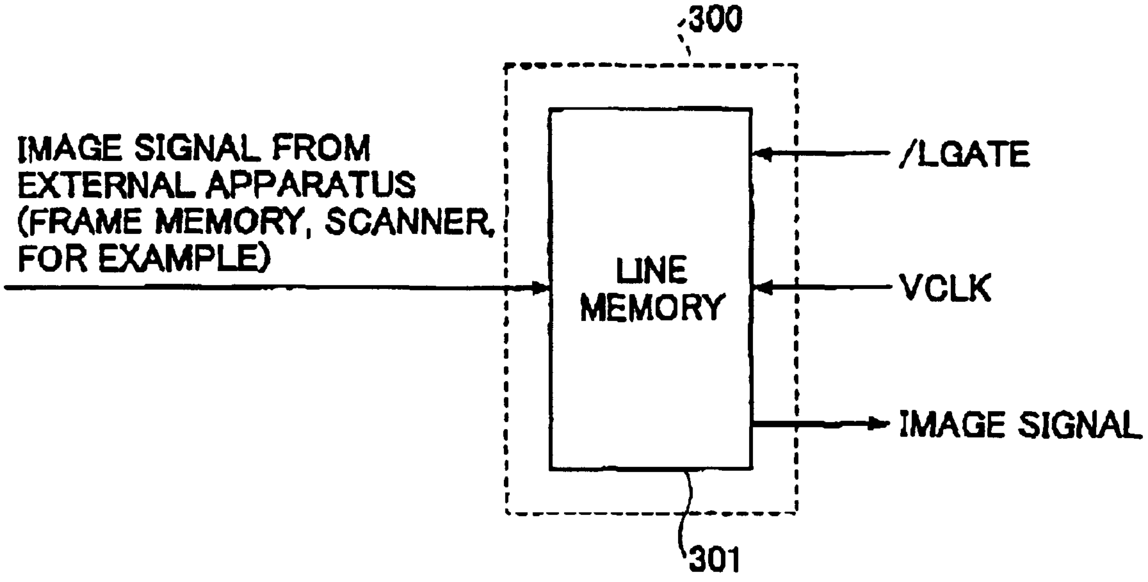
FIG. 8 is a block diagram showing the structure of an image forming controller front end according to an embodiment.

FIG. 8 is a block diagram showing the structure of the image forming controller front end 300 according to an embodiment. The image forming controller front end 300 is provided with a line memory 301. The image forming controller front end 300 acquires image data from an external apparatus (a frame memory, and a scanner, for example) based on the timing of /FGATE, and outputs the image signal in synchronization with VCLK while /LGATE is at a "L" level. The image signal output by the line memory 301 is transmitted to the LD controller 203. The LD controller 203, in response to the image signal output by the line memory 301, causes the LD 10211 to radiate a laser beam.

When the printer controller 207 changes compensation data that are set to the comparator 20222 and 20232, the timing of /LGATE and /FGATE change, and consequently the timing of the image signal changes. Accordingly, the image write position in the main and sub scan directions can be adjusted.

Figure 9:
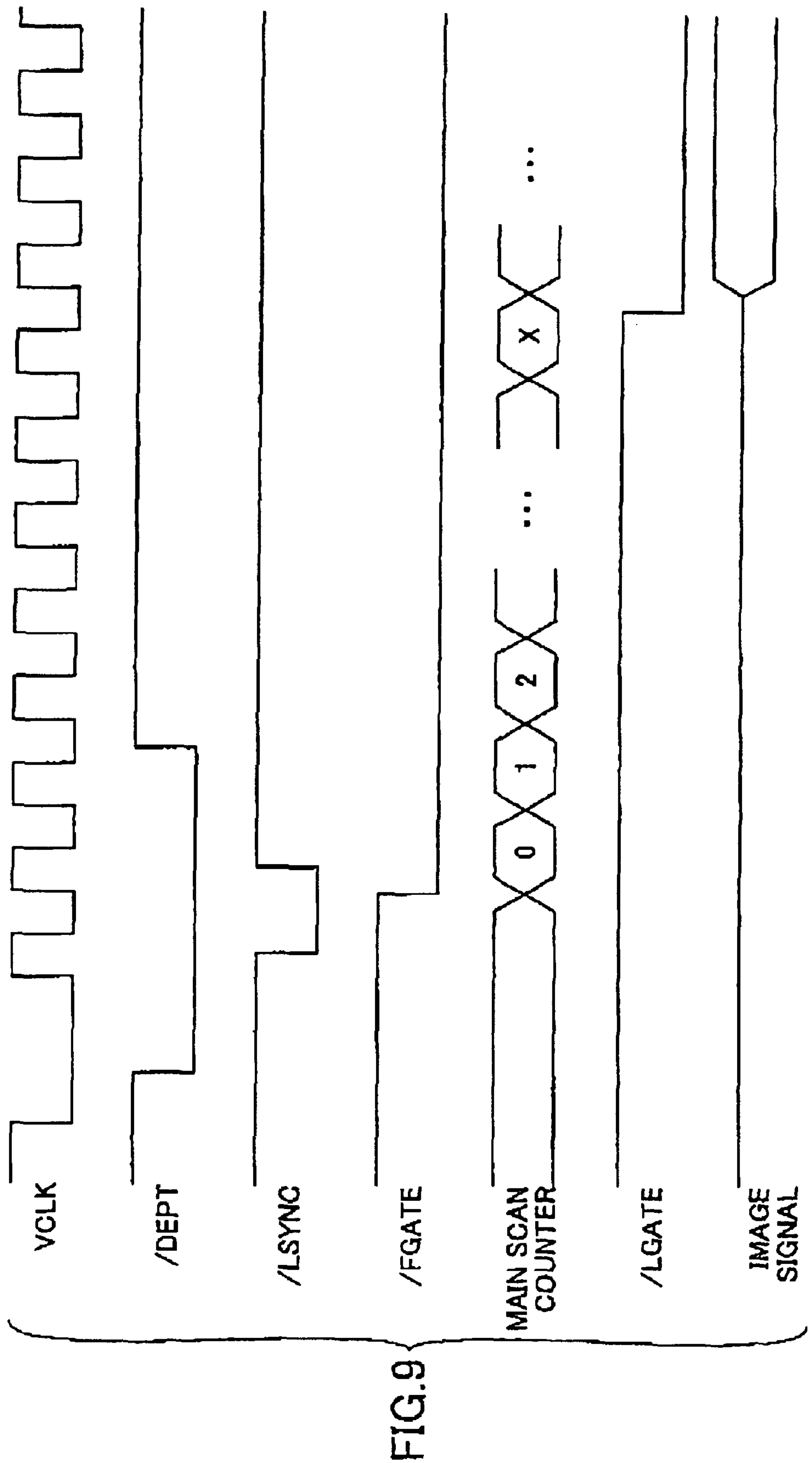
FIG. 9 is a timing chart showing the operation of the starting position controller according to an embodiment.

FIG. 9 is a timing chart showing the operation of the write start position controller 202. Though the adjustment of write start position in the main scan directions is mainly described below, those skilled in the art can easily recognize the adjustment of write start position in the sub scan directions based on the following description.

The main scan counter 20221 is reset in response to /LSYNC, and its count returns to "0". The main scan counter 20221 counts the number of pulses in /VCLK. When the count increases up to the compensation data (a parameter "X") set by the printer controller 207, the comparator 20222 outputs the result of comparison. The gate signal generator 20223 turns /LGATE to a "L" level (effective). /LGATE is a signal of which pulse width of an "L" level is equal to the width of image data in the main scan directions.

The operation in the sub scan directions is nearly identical to the operation in the main scan directions, but different in that the sub scan counter 20231 counts /LSYNC.

Figure 10:
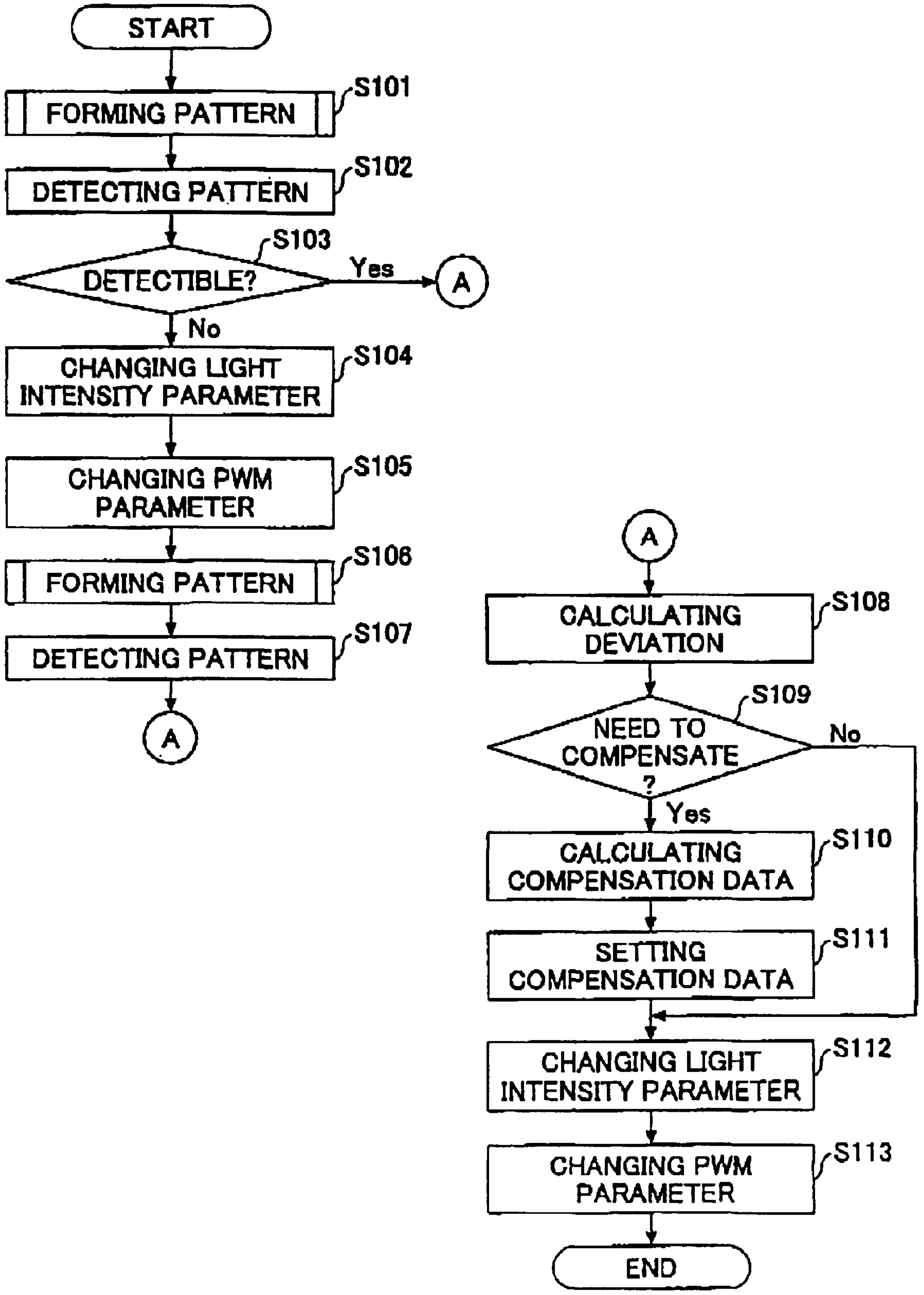
FIG. 10 is a flow chart showing the operation of the image forming apparatus according to the first embodiment.

FIG. 10 is a flow chart showing an operation to compensate for positional deviation according to the first embodiment. The main scan image position, the sub scan image position, and the main scan image magnification of each monochrome image are adjusted using the black BK image as a reference. Accordingly, this operation shown in the flow chart is performed for each monochrome image besides the black BK image. According to another embodiment, the monochrome image of another color (for example, magenta) may be used as the reference.

In step S101, the printer controller 207 forms a compensation pattern to compensate for the positional deviation of a monochrome image on the transfer belt. The compensation pattern is formed by a similar process to that of ordinary images. Specifically, the printer controller 207 transmits signals to the polygon motor controller 201, the write start position controller 202, the LD controller 203, and the write clock generator 205, and activates processes such as charging, exposure, development, and transfer. However, the forming of the compensation pattern is different from that of ordinary images in that the compensation pattern is formed on the transfer belt instead of a sheet of paper.

In step S102, the printer controller 207 detects the compensation pattern for detecting the positional deviation of the image formed on the transfer belt 103 with the sensors 105 and 106.

In step S103, the printer controller 207 compares the signal output by the sensors 105 and 106 with a predetermined threshold, and determines whether the compensation pattern is correctly detected. This step is described in more detail below.

If the printer controller 207 determines that the compensation pattern is not correctly detected in step S103, the printer controller 207 follows the "No" branch. In step S104, the printer controller transmits a light intensity control signal (control signal 2) to the LD controller 203, and adjusts the parameter of light intensity. In this step, the parameter of light intensity is set at "X" multiplied by "α" (αX, α>1), where "X" is the parameter of light intensity that is set for the forming of ordinary images.

In step S105, the printer controller 207 transmits a pulse width control signal (control signal 1) to the LD controller 203, and adjusts a PWM parameter. For example, in the case that the printer controller 207 and the LD controller can output a pulse of 1/8 through 8/8 width, if 6/8 pulse is used for the forming of ordinary images, the PWM parameter is set at 7/8 pulse.

In step S106, the printer controller 207 forms the compensation pattern on the transfer belt 103 under the condition set above.

In step S107, the printer controller 207 causes the sensors 105 and 106 to detect the compensation pattern formed on the transfer belt 103. The printer controller 207 calculates positional deviations in the main scan directions sub scan directions, and an error in magnification in the main scan directions in step S108.

In step S109, the printer controller 207 determines whether adjustment is required based on the calculated deviation and error. As described above, the precision of the adjustment is one dot in the main scan directions and one line in the sub scan directions. If the positional deviation is 1/2 dots or more in the main scan directions and 1/2 lines or more in the sub scan directions, the printer controller 207 determines that adjustment is inevitable.

If the printer controller 207 determines that either the positional deviation in the main scan directions, the positional deviation in the sub scan directions, or the error in the image magnification in the main scan directions is high enough to require adjustment in step S109, the printer controller 207 calculates the compensation data in step S110.

In step S111, if the main scan deviation and the sub scan deviation need to be compensated for, the printer controller 207 sets the main scan compensation data to the main scan gate signal generator 2022 and the sub scan compensation data to the sub scan gate signal generator 2023, and generates /LGATE and /FGATE.

The printer controller 207 determines whether there is error in image magnification in the main scan directions based on the precision of the compensation for magnification. If adjustment is required, the printer controller 207 calculates a parameter of frequency that is required for adjustment of the image magnification, sets the parameter to the write clock generator 205, and causes the clock 205 to generate the clock WCLK.

In the case in which the light intensity parameter and the PWM parameter have been changed in steps S104 and S105, the printer controller 207 transmits the light intensity control signal and the pulse width control signal to the LD controller 203 after the adjustment for positional deviation, and then, restores the light intensity parameter and the PWM parameter (steps S112–S113).

The above operation is repeatedly performed for each color other than black BK. The positional deviation of monochrome images can be adjusted based on /LGATE, /FGATE, AND WCLK.

A description is given below about processing of the printer controller 207 to determine whether the compensation pattern is correctly detected and to calculate the compensation data.

Figure 11:
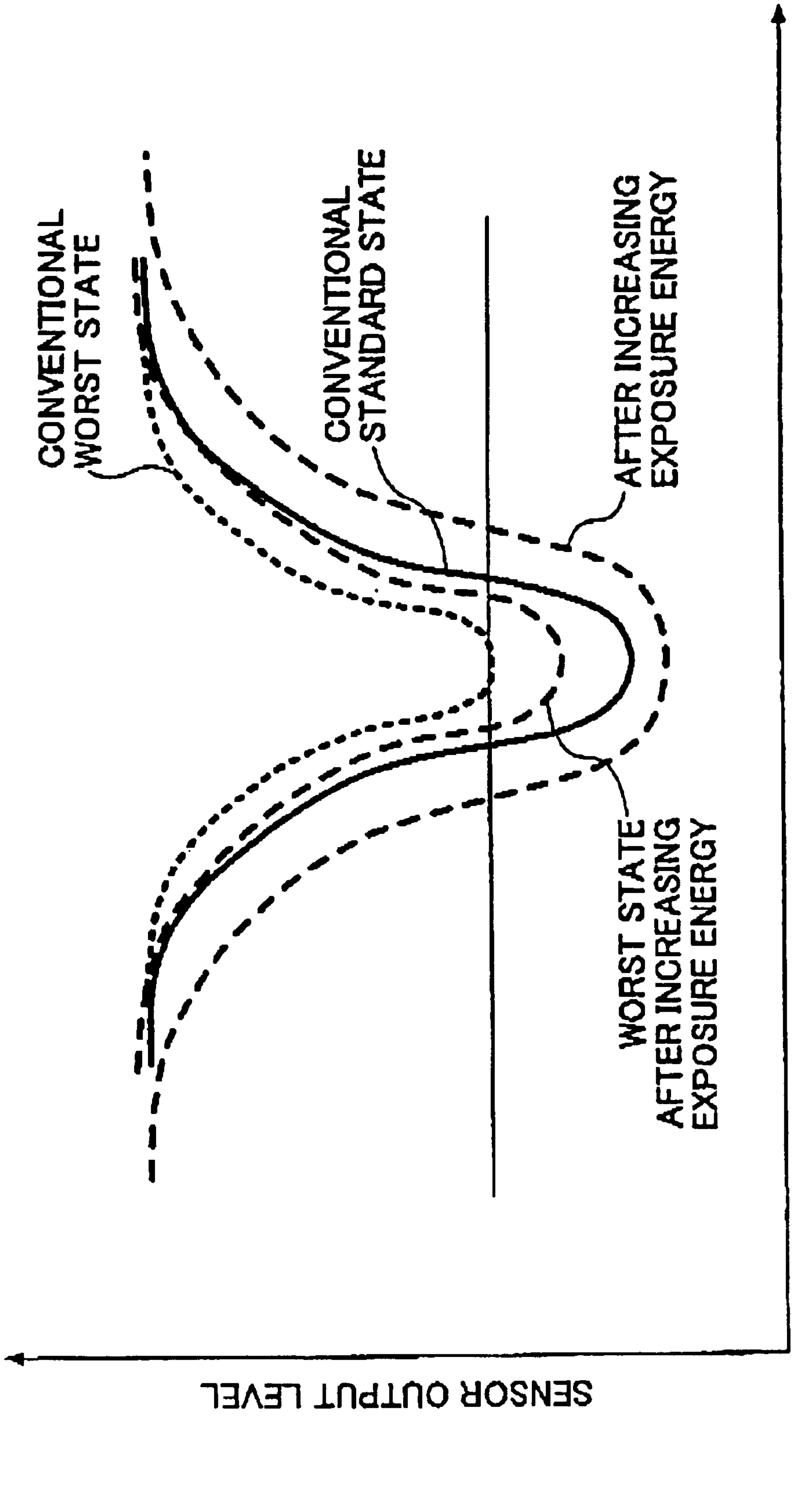
FIG. 11 is a graph showing the output signal of a sensor according to an embodiment.

FIG. 11 is a graph of the signal output by the sensors 105 and 106. In FIG. 11, the Y-axis indicates the output level of the sensors 105 and 106, and the X-axis indicates time. The more sparse is the compensation pattern, the higher the light intensity detected by the sensors 105 and 106 becomes. In other words, if the compensation pattern is sparse, the amount of light reflected by the paper, for example, increases, which leads to an increase in the output level of the sensors 105 and 106. Accordingly, the fact that the output signal of the sensors is high indicates that the condition in which the compensation pattern is detected is not good. Accordingly, if the output level of the sensors 105 and 106 is higher than a predetermined threshold, the printer controller 207 determines that the compensation pattern has not been correctly determined.

The sensors 105 and 106 transmit their output signals to the printer controller 207. The printer controller 207 compares the signals with a predetermined threshold, and calculates the positional deviation of each monochrome image in reference to the black BK image. The output signals of the sensors 105 and 106 usually decrease under the threshold with enough allowance as shown by the solid line in FIG. 11. However, the output signal may not decrease down to the threshold (that is, it may remain higher than the threshold) due to environmental change, change over time, and accidents. The output signal that does not decrease down to the threshold is caused by a sparse compensation pattern. To avoid such problems, the exposure energy of LD 10211 (the light intensity and the exposure time (PWM parameter) in this case) is increased so that the output signals of the sensors 105 and,106 decrease below the threshold with enough allowance. The increase in the exposure energy ensures that, even if an irregularity occurs, the output signal decreases enough (that is, the output signal does not remain over the threshold). The printer controller 207 increases the exposure energy so that the output signals of the sensors 105 and 106 decrease beneath the threshold even under the worst condition.

If, when the actual image is formed on the paper 104, the exposure energy is too high, the image saturates (the state of too much exposure). Accordingly, the exposure energy is changed only when the positional deviation is compensated for. Since the compensation pattern is a line drawing without grey scale, the change in the exposure energy does not cause a problem.

The case in which the exposure energy is changed is described above. Likewise, in the cases in which a development bias voltage, a transfer current, the scan speed of the light beam, the speed of drawing, and the amount of toner are changed, the exposure energy is changed during the forming of the compensation pattern. The conditions are adjusted so that the output signal of the sensors 105 and 106 decrease beneath the threshold.

In the case of the first embodiment, if the light intensity and the pulse width of the PWM signal are not changed enough, the sensors 105 and 106 may fail to detect the compensation pattern formed after the change. Accordingly, if the sensors 105 and 106 fail to detect the initially formed compensation pattern, the light intensity and the pulse width of the PWM signal may need to be increased considerably.

An image forming apparatus according to the second embodiment of the present invention is described below.

Figure 12:
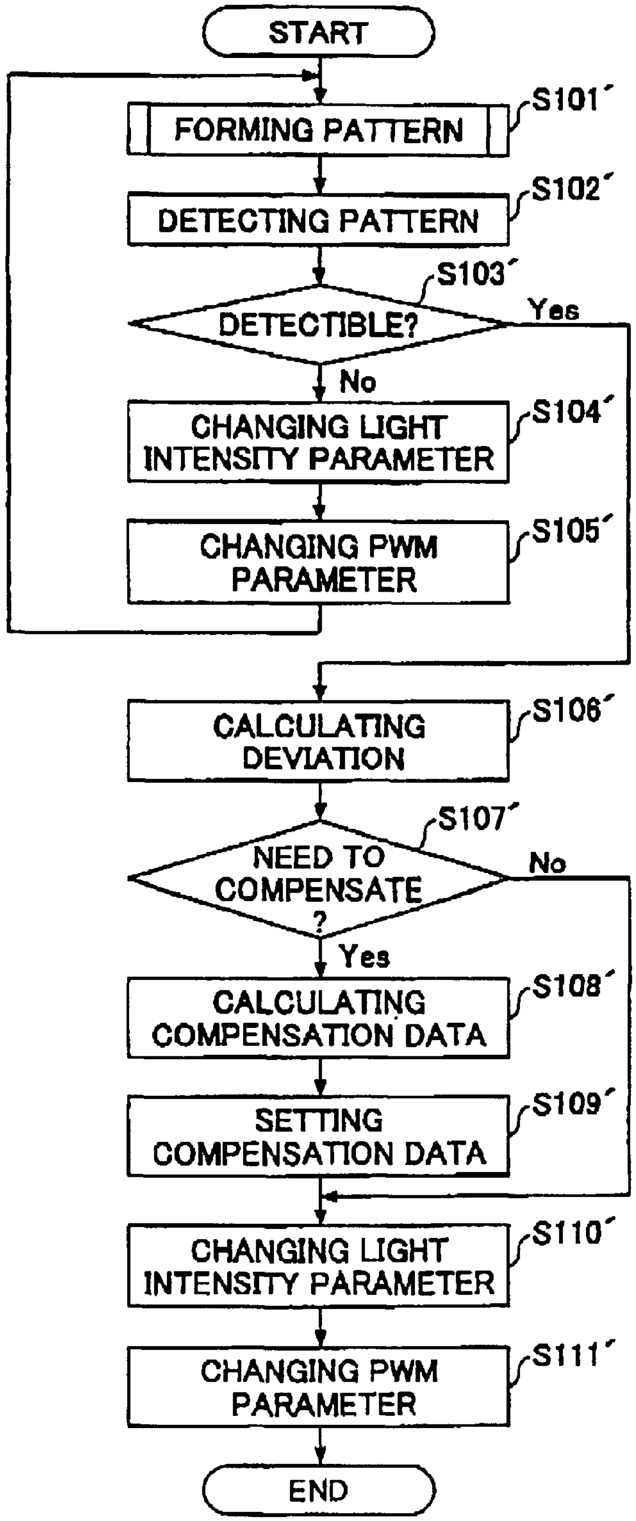
FIG. 12 is a flow chart showing the operation of an image forming apparatus according to the second embodiment.

FIG. 12 is a flow chart showing the operation of the image forming apparatus according to the second embodiment.

The operation is almost the same as the operation of the image forming apparatus according to the first embodiment, but is different as follows: when the compensation pattern is not detectible by the sensors 105 and 106 ("No" in step S103'), the printer controller 207 repeats adjusting the light intensity and the pulse width of the PWM signal (steps S104', S105'), and forming the compensation pattern (step S101') until the sensors 105 and 106 detect the compensation pattern ("Yes" in step S103').

After the sensors 105 and 106 detect the compensation pattern, the printer controller 207 performs steps S106'–S111' that are identical to steps S108–S113 shown in FIG. 10.

As described above, the printer controller 207 repeats changing the image forming condition in increments until the sensors 105 and 106 detect the compensation pattern, and the compensation pattern becomes detectible without fail by the sensors 105 and 106.

In the above description, both the light intensity and the time in which the light beam is radiated (the pulse width of PWM signal) are changed to adjust the exposure energy. According to another embodiment, either one may be changed. For example, if the light intensity of LD 10211 cannot be increased due to the maximum rating of LD 10211, the exposure energy can be adjusted by changing the radiation time. If the radiation time cannot be adjusted because the 8/8 pulse of the PWM signal is used, the light intensity may be changed.

[$2^{nd}$ Embodiment]

An image forming apparatus according to the second embodiment of the present invention is described below. The structure of the image forming apparatus and controllers provided therein, and the compensation pattern for compensating for positional deviation of monochrome images according to the second embodiment are identical to those of the first embodiment.

Figure 13:
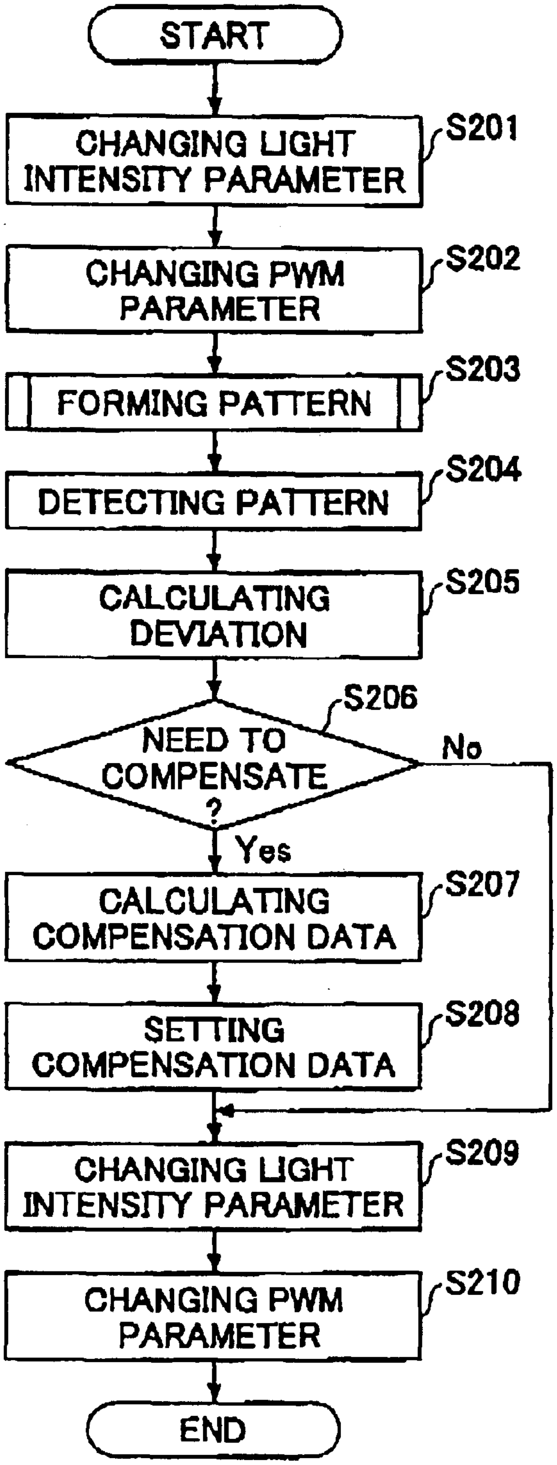
FIG. 13 is a flow chart showing the compensation of positional deviation performed by an image forming apparatus according to the second embodiment of the present invention.

FIG. 13 is a flow chart showing the compensation for positional deviation performed by the image forming apparatus according to the second embodiment. The image forming apparatus, using the black BK image as a reference, adjusts positions of other monochrome images in the main and sub scan directions and image magnifications in the main scan directions. To achieve this object, the image forming apparatus repeats the steps shown in the flow chart for each monochrome images other than the black image.

The printer controller 207 of the image forming apparatus transmits a light intensity control signal (control signal 2) to the LD controller 203 to change the light intensity parameter (step S201). The printer controller 207 sets the light intensity at αx ("X" multiplied by α, α>1) where "X" is a light intensity parameter used for the forming of ordinary images.

The printer controller 207 transmits a pulse width control signal (control signal 1) to the LD controller 203 to change the PWM parameter (step S202). For example, if the LD controller 203 supports pulse widths of 1/8 through 8/8, and a pulse of 6/8 pulse width is used for the forming of ordinary images, a pulse of 7/8 pulse width may be used for forming the compensation pattern.

The printer controller 207 forms the compensation pattern on the transfer belt 103 using the above light intensity parameter and PWM parameter (step S203). The printer controller 207 detects the compensation pattern formed on the transfer belt 103 with the sensors 105 and 106 (step S204). The printer controller 207 determines positional deviation in the main scan directions, positional deviation in the sub scan directions, and error in image magnification in the main scan directions based on the detection by the sensors 105 and 106 (step S205). The printer controller 207 determines whether the positional deviations and the image magnification error are so large that the printer controller 207 needs to compensate for the positional deviations and the image magnification error. As described above, the image forming apparatus can compensate for the positional deviation by one dot in the main scan directions and by one line in the sub scan directions. Accordingly, if the positional deviation is 1/2 dots or more in the main scan directions and 1/2 lines or more in the sub scan directions, the printer controller 207 may determine that it needs to compensate for the positional deviations and the image magnification error.

If the printer controller 207 determines that it needs to compensate for either the positional deviation in the main scan directions, the positional deviation in the sub scan directions, or the image magnification error ("Yes" in step S206), the printer controller 207 determines compensation data (step S207)

When compensating for the positional deviation in the main and sub scan directions, the printer controller 207 sets main scan compensation data and sub scan compensation data to the main scan gate signal generator 2022 and the sub scan gate signal generator 2023, respectively, to cause them to output /LGATE and /FGATE, respectively (step S208).

The printer controller 207 determines whether the printer controller 207 needs to compensate for the image magnification error in the main scan directions-based on the precision of the image magnification error compensation. If the printer controller 207 determines that the printer controller 207 needs to compensate for the image magnification error, the printer controller 207 determines a frequency parameter required for the compensation and sets the determined frequency parameter to the write clock generator 205. The write clock generator 205 generates the clock WCLK in accordance with the frequency parameter set by the printer controller.

After compensating for the positional deviations, the printer controller 207 transmits the light intensity control signal and the pulse width control signal to the LD controller 203, and restores the light intensity parameter and the PWM parameter that have been changed for the adjustment (steps S209–S210).

The above steps are repeated for monochrome images other than the black BK image. Using /LGATE, /FGATE, and WCLK, the image forming apparatus can compensate for the positional deviations and the image magnification error, and can output multi-color images of high quality.

The printer controller 207 of the image forming apparatus according to the second embodiment determines the compensation data in the same manner as that of the first embodiment.

If the light intensity parameter and the PWM parameter are changed as necessary, even the image forming apparatus according to the second embodiment may fail to detect the compensation pattern with the sensors 105 and 106. Accordingly, before forming the compensation pattern, the light intensity parameter and the PWM parameter need to be increased to be large enough.

Although the exposure energy is changed by changing both the light intensity and the radiation time (PWM parameter) in the above embodiment, either the light intensity or the radiation time may be changed. For example, if the light intensity cannot be increased due to the maximum rating of the LD 10211, only the radiation time (PWM parameter) may be changed. If the radiation time (PWM parameter) cannot be increased because a pulse of 8/8 pulse width is used for the forming of ordinary images, only the light intensity may be changed accordingly.

[3rd Embodiment]

An image forming apparatus according to the third embodiment of the present invention is described below. The structure of the image forming apparatus and controllers provided therein and a compensation pattern according to the third embodiment are the same as those of the first embodiment.

Figure 14:
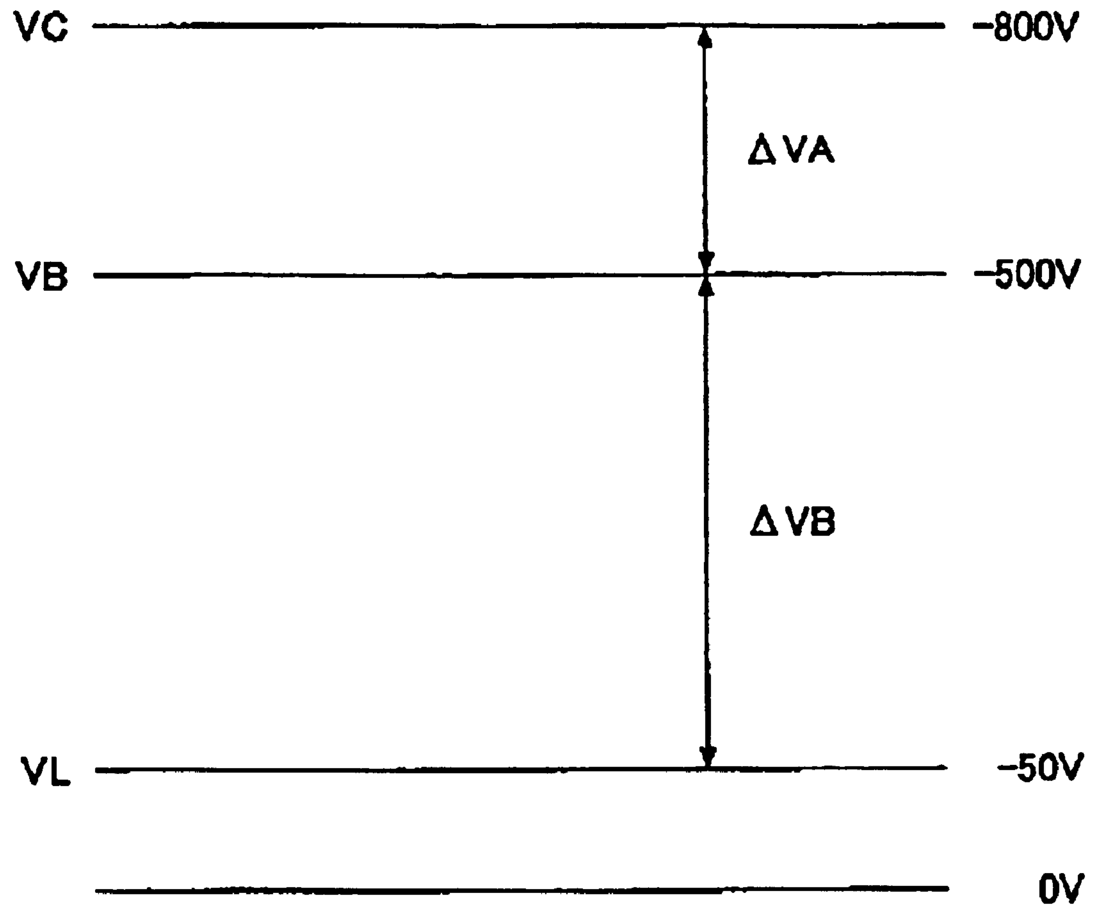
FIG. 14 is a graph showing the relationship between potentials of the photosensitive body and a development unit according to the third embodiment.

FIG. 14 is a graph for explaining the relationship between potentials of the photosensitive body 1011 and the development unit. In FIG. 14, the potential of the charged photosensitive body is denoted as "VC"; the potential of the development roller, which is a bias voltage (development bias voltage) is denoted as "VB"; and the potential of an exposed portion of the photosensitive body by the LD 10211 is denoted as "VL". The difference between VC and VB is further denoted as "ΔVA", and the difference between VB and VL is denoted as "ΔVB". Since the potential VC of the charged photosensitive body 1011 depends on the degradation of the photosensitive body 1011, for example, if ΔVB increases, ΔVA decreases.

If ΔVB increases, image density rises. However, since ΔVA decreases, background dust (undesired adhesion of toner to the transfer belt, for example) becomes more apparent. The potentials are optimized during the forming of ordinary images as follows: VC −800V, VB −500V, and VL −50V, for example.

When images are formed, the background dust causes a problem. When the compensation pattern is formed on the transfer belt 103, however, the background dust does not matter so much since the sensors can detect the compensation pattern even if the background dust is apparent. Accordingly, VB may be increased over −500V (moving upward in FIG. 14) during the forming of the compensation pattern.

Accordingly, the allowance of the output level by the sensors can be increased by increasing the image density of the compensation pattern.

Figure 15:
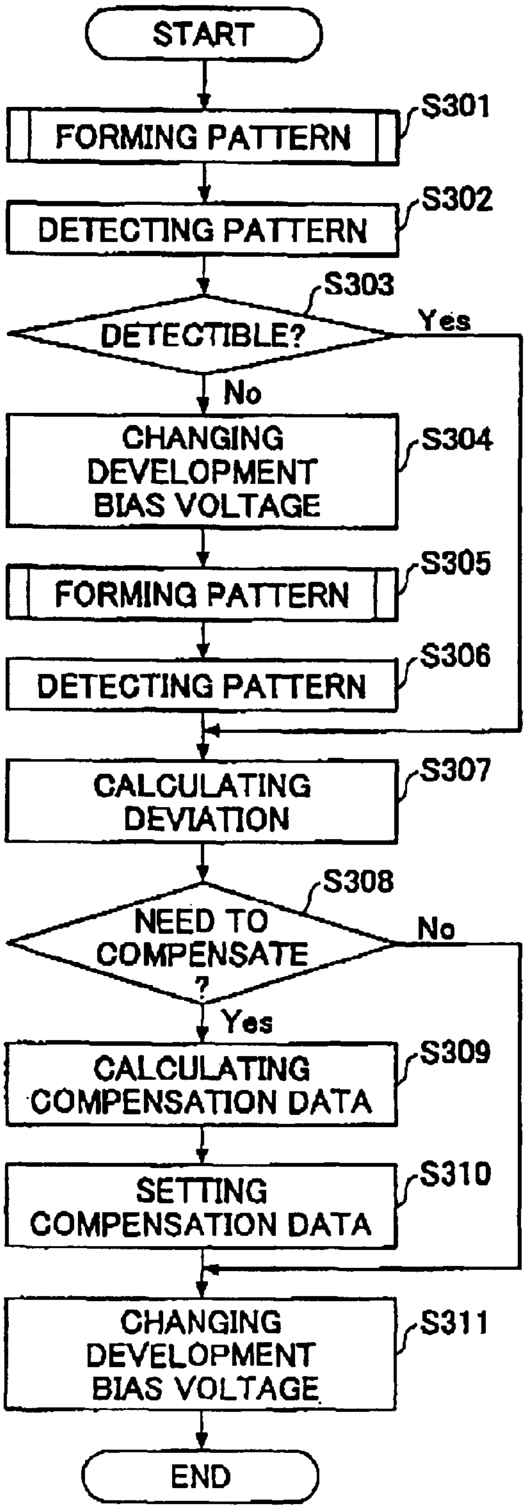
FIG. 15 is a flow chart showing the operation of an image forming apparatus according to the third embodiment.

FIG. 15 is a flow chart showing the compensation for positional deviations performed by the image forming apparatus according to the third embodiment. The image forming apparatus, using the black BK image as a reference, compensates for the positional deviation in the main scan directions, positional deviation in the sub scan directions, and image magnification error in the main scan directions. To achieve this object, the image forming apparatus repeats the above steps for each monochrome image other than the black image.

The printer controller 207 forms the pattern for compensating for positional deviation on the transfer belt (step S301). The printer controller 207 detects the pattern for compensating for positional deviation formed on the transfer belt 103 (step S302) When detecting the pattern, the printer controller 207 compares the signal detected by the sensors 105 and 106 with a predetermined threshold, and determines whether the pattern for compensating for image deviation is correctly detected (step S303). This step is the same as that of the first embodiment.

If the formed pattern for compensating for image deviation cannot be detected correctly ("No" in step S303), the printer controller 207 transmits a signal to the development bias controller 209 to change the development bias voltage VB (step S304). For example, if the development bias voltage set for the forming of ordinary images is −500V, the printer controller 207 change the development bias voltage VB to −600V.

In the next step, the printer controller 207 forms the pattern for compensating for image deviation on the transfer belt 103 in compliance with the above condition (step S305). The printer controller 207 detects the pattern for compensating for the image deviation formed on the transfer belt with the sensors 105 and 106 (step S306).

The printer controller 207 calculates the amount of image deviation in the main scan directions, image deviation in the sub scan directions, and magnification error in the main scan directions from the black image as a reference based on the result of the detection by the sensors 105 and 106 (step S307). The printer controller 207 determines whether the calculated amounts of deviation and error are at level that require the compensation (step S308).

If at least one of the amount of deviation in the main scan directions, the amount of deviation in the sub scan directions, and the amount of magnification error in the main scan directions is at a level that requires the compensation ("Yes" in step S308), the printer controller 207 computes the compensation data (step S309).

If the amount of deviation in the main scan directions and the amount of deviation in the sub scan directions need to be adjusted, the printer controller 207 sets the main scan compensation data to the main scan gate generator 2022 and the sub scan compensation data to the sub scan-gate generator 2023 to generate /LGATE and /FGATE, respectively (step S310).

The printer controller 207 determines whether the image magnification error needs to be compensated for based on the precision of the compensation. When compensating, the printer controller 207 computes the frequency parameter required for the adjustment of the image magnification error, and sets the frequency parameter to the write clock generator 205 to generate the clock WCLK.

If the development bias voltage is changed in step S304, the printer controller 207, after adjusting for the positional deviation, transmits a signal to the development bias controller 209 to restore the changed development bias voltage VB (step S311).

The above steps are repeated for each monochrome image other than the black BK image. Accordingly, the image positional deviation and image magnification error of each color can be adjusted using /LGATE, /FGATE, and WCLK.

If the change in the development bias voltage is small, the sensors 105 and 106 may fail to detect the pattern for compensating for image deviation formed under the changed image forming condition. Accordingly, if the sensors 105 and 106 fail to detect the initially formed pattern for compensating for the image deviation, the development bias voltage may be greatly increased.

Figure 16:
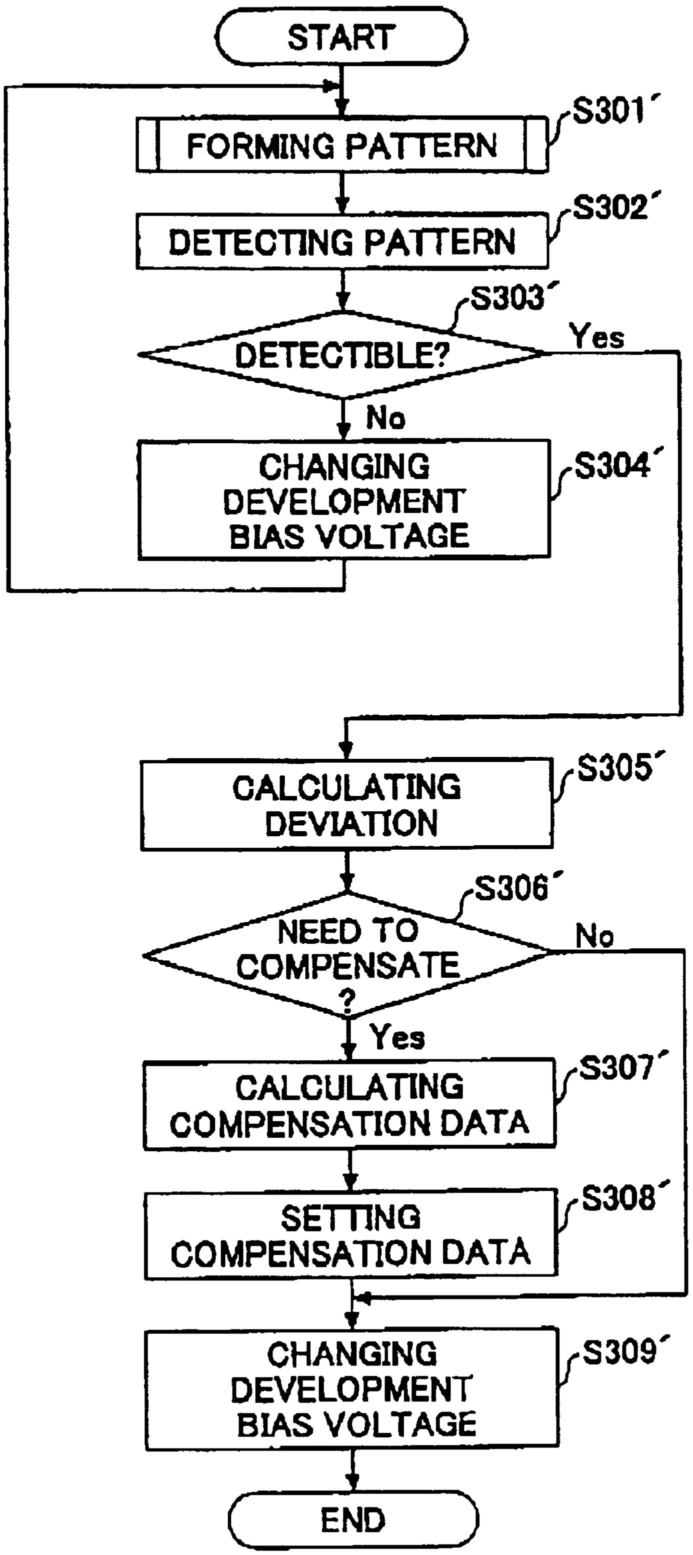
FIG. 16 is a flow chart showing the steps of positional deviation compensation according to the third embodiment.

A variation of the compensation for positional deviation performed by the image forming apparatus according to the embodiment is described below. FIG. 16 is a flow chart showing the steps of the compensation.

The steps are almost identical to those shown in FIG. 15. The differences are as follows: if the printer controller 207 fails to detect the pattern for compensating for the image deviation with the sensors 105 and 106 ("No" in step S303'), the printer controller changes the development bias voltage (step S304') and forms the pattern for compensating for the image deviation again (step S301'). These steps are repeated until the sensors 105 and 106 detect the pattern for compensating for the image deviation ("Yes" in step S303').

After detecting the pattern for compensating for the image deviation with the sensors 105 and 106, the printer controller 207 follows steps S305'–S309' shown in FIG. 16 that are identical to steps S307–S311, respectively, described with reference to FIG. 15.

As described above, the printer controller 207 of the image forming apparatus according to the variation of this embodiment repeatedly changes the image forming condition in increments until the pattern for compensating for the image deviation using the sensors 105 and 106, the sensors 105 and 106 can detect the pattern for compensating the image deviation without fail.

[Fourth Embodiment]

An image forming apparatus according to the fourth embodiment of the present invention is described below. The structure of the image forming apparatus and controllers provided therein and the pattern for compensating for the image deviation are the same as those of the first embodiment.

Figure 17:
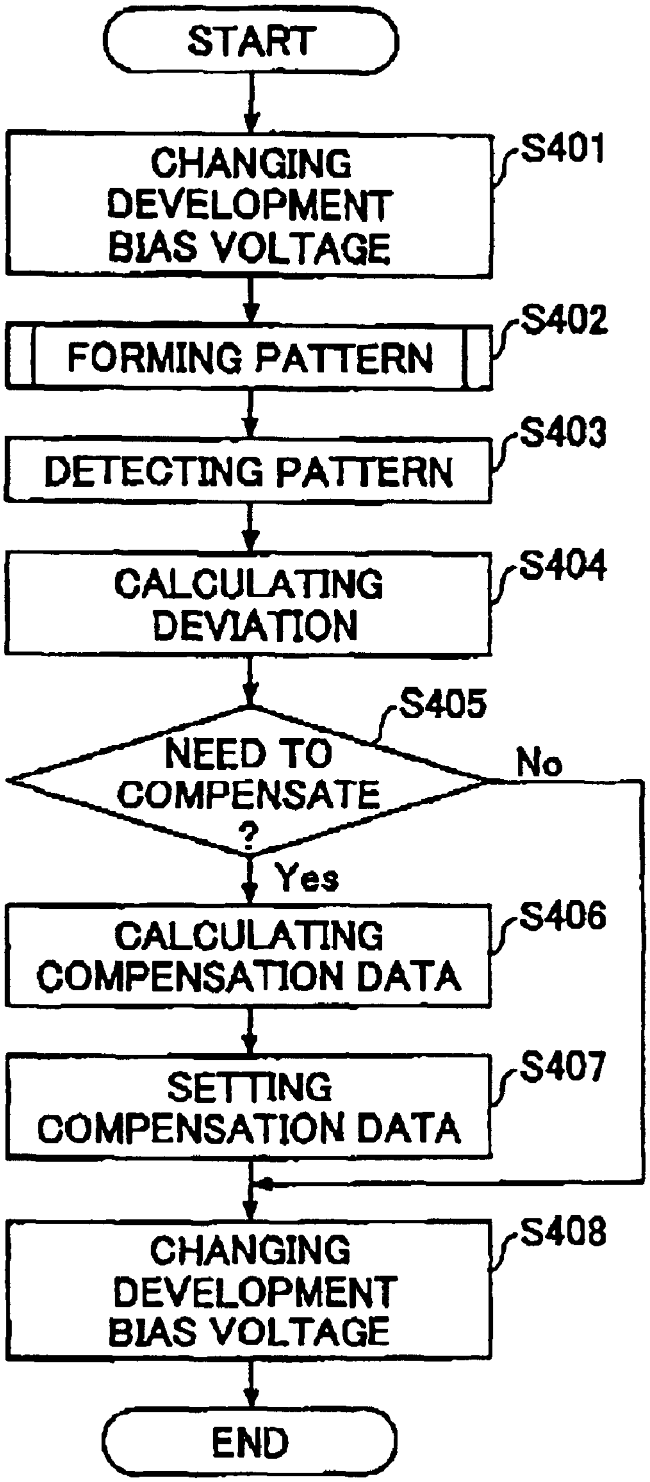
FIG. 17 is a flow chart showing the operation of an image forming apparatus according to the fourth embodiment of the present invention.

FIG. 17 is a flow chart showing the compensation for the positional deviation performed by the image forming apparatus according to the fourth embodiment. The image forming apparatus according to the embodiment, using the black BK image as a reference, repeatedly adjusts the image position in the main scan directions, the image position in the sub scan directions, and image magnification in the main scan directions of each color other than black BK.

The printer controller 207 transmits a signal to the development bias controller 209 to change the development bias voltage VB (step S401). For example, if the development bias voltage VB is set at −500V during the forming of ordinary images, the development bias voltage VB may be changed to −600V.

The printer controller 207 forms the pattern for compensating for the image deviation on the transfer belt 103 under this image forming condition (step S402). The printer controller 207 detects the pattern for compensating the image deviation formed on the transfer belt 103 using the sensors 105 and 106 (step S403). The printer controller 207 computes the amount of deviation in the main scan directions, the amount of deviation in the sub scan directions, and the magnification error in the main scan directions based on the detection by the sensors 105 and 106 (step S404). The printer controller 207 determines whether the computed amount of deviation and error is at a level that requires compensation (step S405).

If at least one of the main scan deviation, sub scan deviation, and main scan magnification error is at a level that require the compensation ("Yes" in step S405), the printer controller 207 computes the compensation data (step S406).

In the case where the main scan deviation and/or the sub scan deviation is adjusted, the main scan compensation data is sent to the main scan gate generator 2022 and the sub scan compensation data is sent to the sub scan gate generator 2023 to generate /LGATE, and /FGATE (step S407).

A determination is made based on the precision of the compensation of magnification whether the main scan magnification error is compensated for. When compensating, the frequency parameter required for the compensation of the image magnification is computed, and is set to the write clock generator 205 to generate the clock WCLK.

After compensating for the positional deviation, the printer controller 207 transmits a signal to the development bias controller 209 to restore the development bias voltage VB changed before forming the pattern for compensating (step S408)

The above steps are repeated for each color other than black BK. The image forming apparatus according to the embodiment can output a multi-color image of which the image positional deviation and the image magnification error are compensated for by using /LGATE, /FGATE, and WCLK.

If the change in the development bias voltage is small, the sensors 105 and 106 may fail to detect the pattern for compensating for image deviation formed under the changed image forming condition. Accordingly, if the sensors 105 and 106 fails to detect the initially formed pattern for compensating for the image deviation, the development bias voltage may be greatly changed.

[$5^{th}$ Embodiment]

An image forming apparatus according to the fifth embodiment of the present invention is described below. The structure of the image forming apparatus according to this embodiment and the controllers provided therein and the pattern for compensating for the image,deviation are the same as those of the first embodiment.

Figure 18:
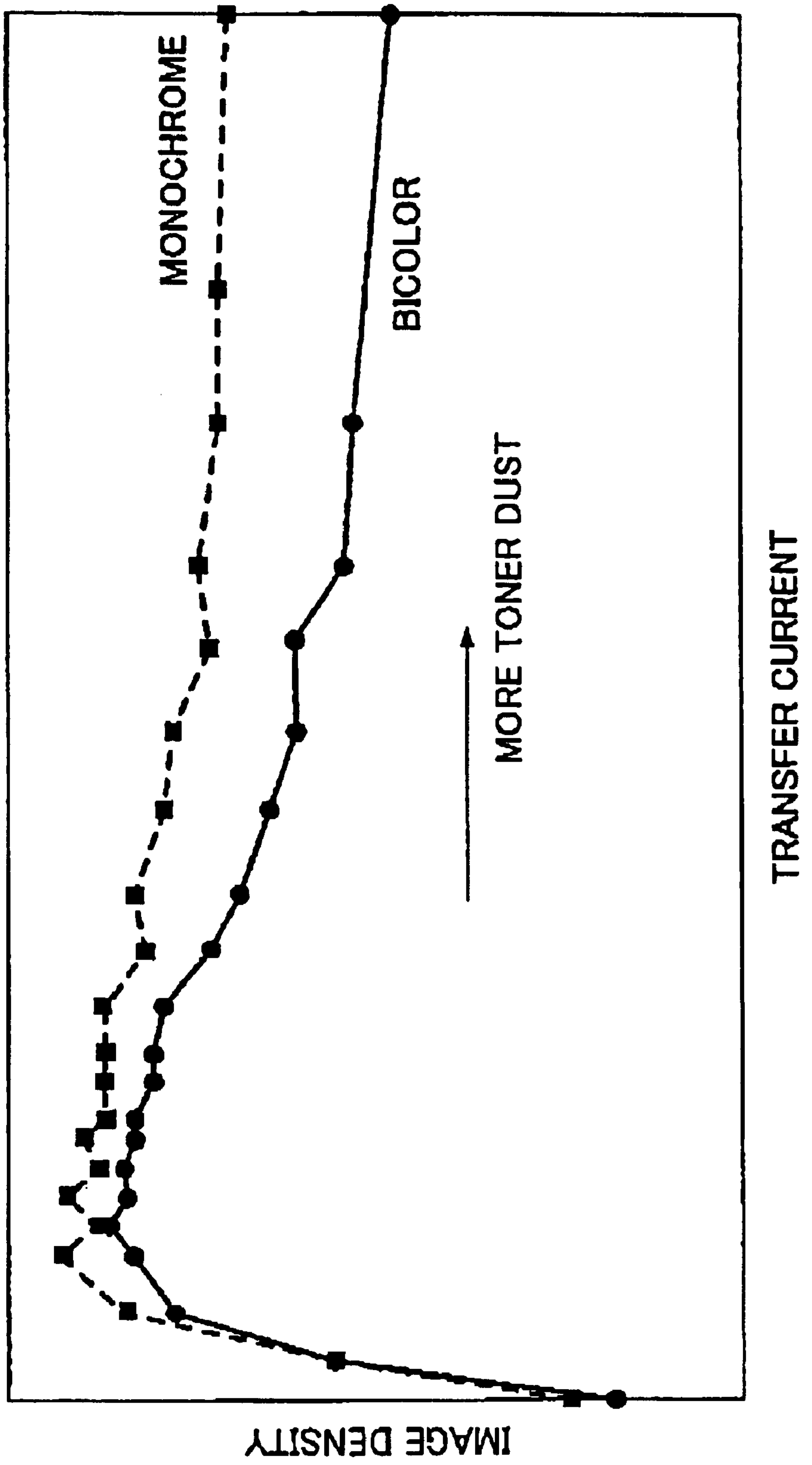
FIG. 18 is a graph showing the relationship between transfer current and image density according to the 5$^{th}$ embodiment of the present invention.

FIG. 18 is a graph showing the relationship between the transfer current and the image density. The following description is based on the comparison between a monochrome image and a bicolor image.

When the transfer current is within a predetermined range, the image density of a monochrome image becomes stable. However, if the transfer current increases too much, the image density of a bicolor image is rapidly reduced. Additionally, the graphs of image density peak at slightly different transfer currents.

The pattern for compensating for the image deviation is equivalent to a monochrome image. No other image is superposed on the pattern. However, when forming a multicolor image, a plurality of monochrome images corresponding to two, three, or four colors need to be superposed. Furthermore, the optimum image forming condition of the case in which the image is formed on the paper 104 differs from that of the case in which the image (pattern, in this case) is formed on the transfer belt 103.

In general, when the transfer current is large to some extent, the image density becomes high. When the pattern for compensating for the image deviation is formed, the transfer current is increased more than that for forming ordinary images. In this case, problems such as toner dust may occur. In the case of the pattern for compensating for the image deviation, however, a little dust does not disturb the detection of the pattern. It is possible to keep the pattern density high and reserve allowance large enough to the threshold.

Figure 19:
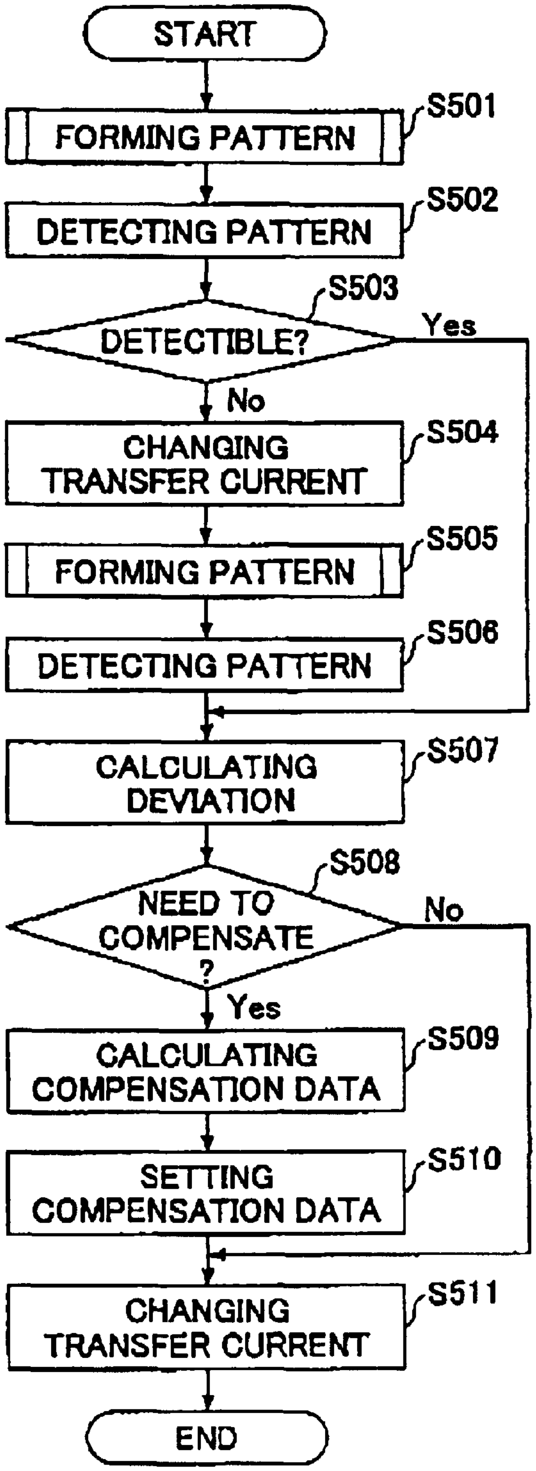
FIG. 19 is a flow chart showing the 1$^{st}$ exemplary operation of an image forming apparatus according to the 6$^{th}$ embodiment of the present invention.
Figure 20:
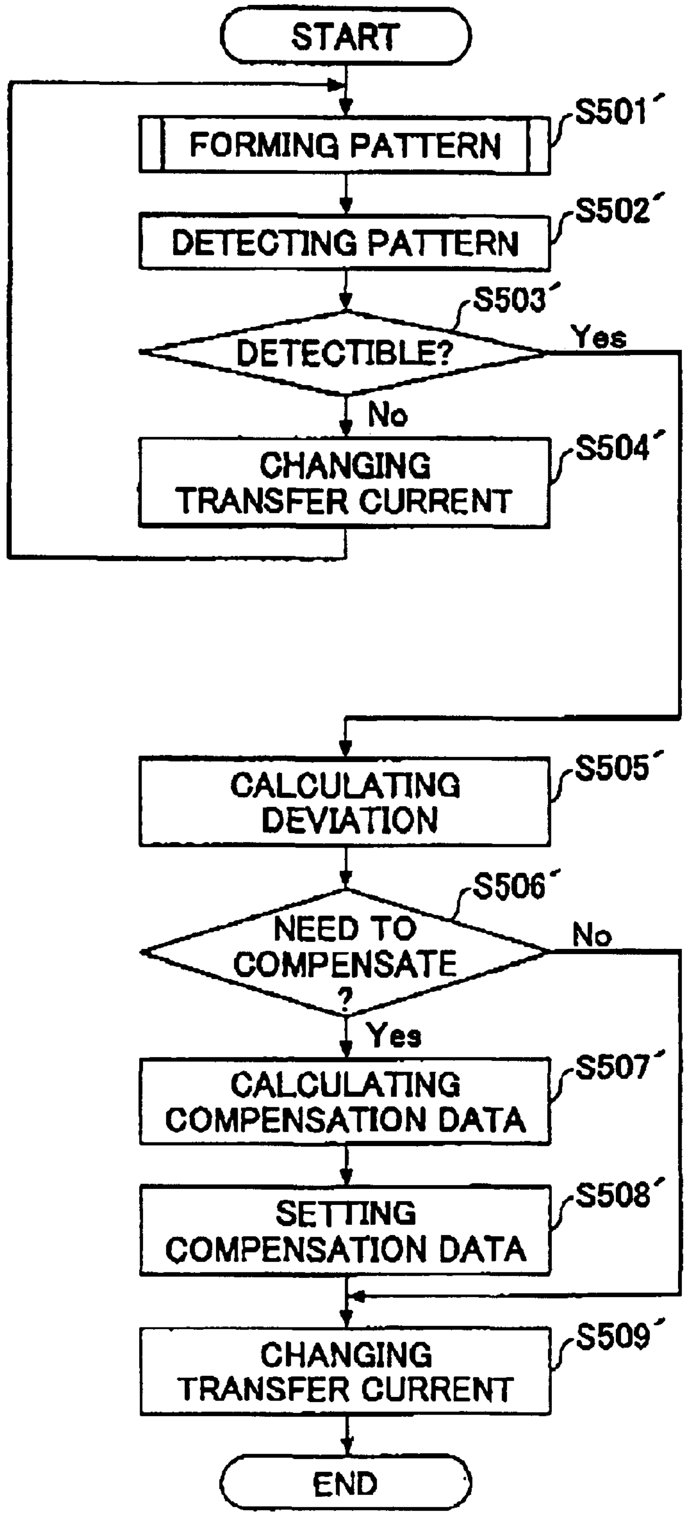
FIG. 20 is a flow chart showing the 2$^{nd}$ exemplary operation of the image forming apparatus according to the 5$^{th}$ embodiment.

FIGS. 19 and 20 show the first and second variations, respectively, of the compensation for the positional deviation performed by the image forming apparatus according to the embodiment. The compensation operation according to this embodiment is different from that of the third embodiment only in that: when the pattern for compensating for the image deviation is increased, the printer controller 207 sends a signal to the transfer bias controller 210 to increase the transfer current. Since the other steps are substantially identical to those of the third embodiment, detailed description is omitted.

[$6^{th}$ Embodiment]

An image forming apparatus according to the sixth embodiment of the present invention is described below. The structure of the image forming apparatus according to the embodiment and the controllers provided therein and the pattern for compensating for the image deviation are the same as those of the first embodiment.

Figure 21:
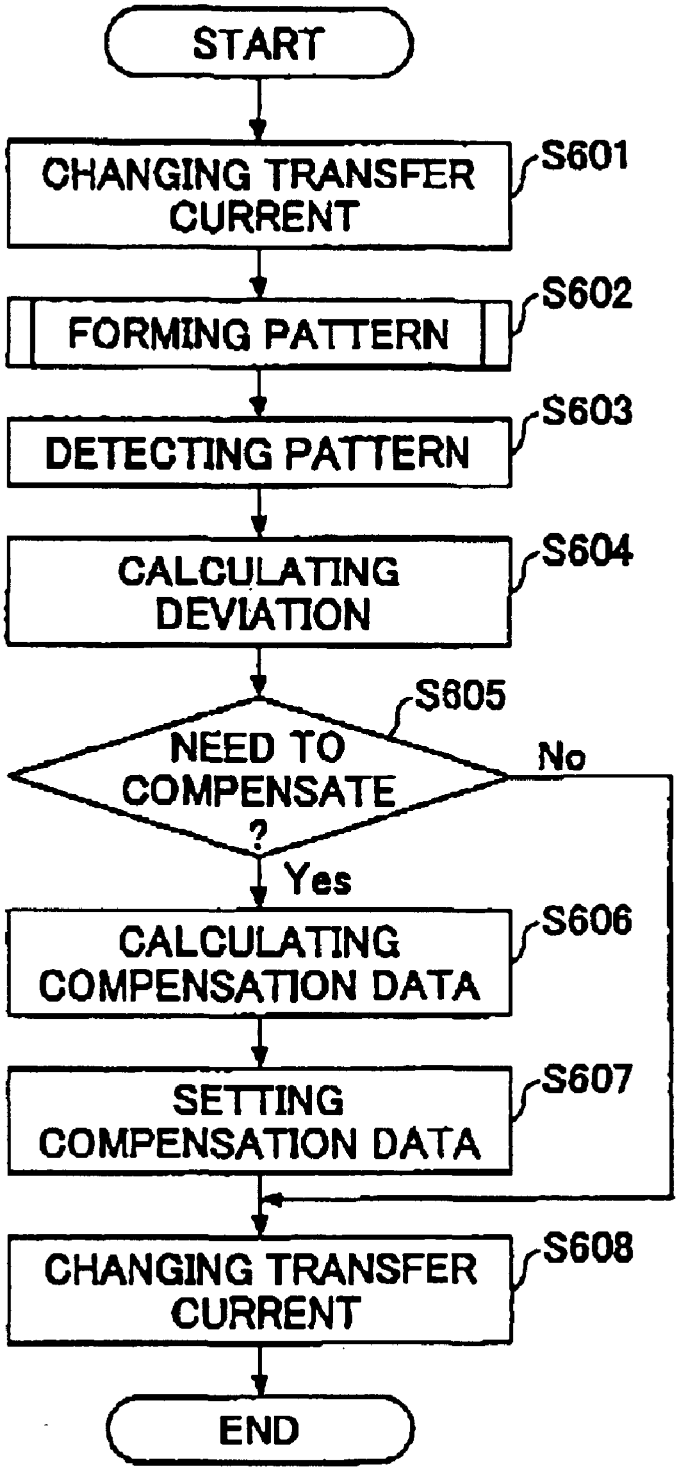
FIG. 21 is a flow chart showing the exemplary operation of an image forming apparatus according to the 6$^{th}$ embodiment.

FIG. 21 is a flow chart showing the operation for compensating for the positional deviation performed by the image forming apparatus according to the embodiment. The operation for compensating for the positional deviation according to the embodiment is substantially the same as that of the image forming apparatus according to the fourth embodiment, but different only in that, when the density of the pattern for compensating for the image deviation is increased, the printer controller 207 sends a signal to the transfer bias controller 210 to increase the transfer current. Accordingly, detailed description is omitted.

[$7^{th}$ Embodiment]

An image forming apparatus according to the seventh embodiment is described below. The structure of the image forming apparatus according to this embodiment and the controllers provided therein and the pattern for compensating for the image deviation are the same as those of the first embodiment.

Figure 22:
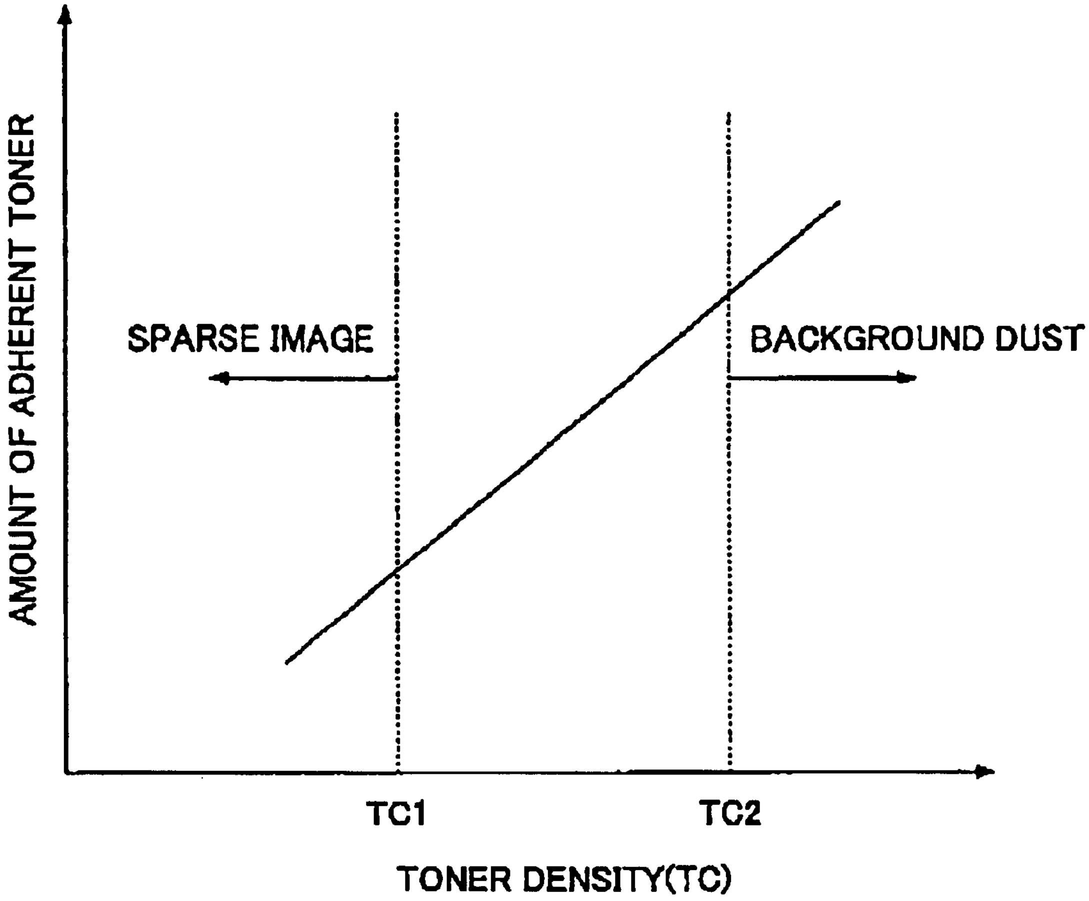
FIG. 22 is a graph showing the relationship between toner density and the amount of adhered toner.

FIG. 22 is a graph showing the relationship between toner density and the amount of adhering toner. If the toner density is too low, the image becomes sparse, and if the toner density is too high, background dust becomes apparent. Accordingly, the toner density is controlled within the range between TC1 and TC2.

In the case in which the image density of the pattern for compensating for the positional deviation is too low for the sensors 105 and 106 to detect the pattern, the toner density may be around, or occasionally below, TC1. In such a case, it is necessary to add toner to increase the toner density, and to increase the image density of the pattern.

Even if the toner density is close to TC2 and background dust is apparent, the sensors 105 and 106 can detect the pattern for compensating. Even if there is a little dust in the background, the pattern for compensating for the positional deviation is detectible without any problem. Accordingly, the output level of the sensors 105 and 106 has enough allowance to the threshold by increasing the pattern density.

The additional toner amount to be supplied in order to increase the image density of the pattern needs to be determined so that the addition of toner does not affect the images to be formed after the compensation for the positional deviation. Accordingly, the additional toner amount is determined based on both the minimum toner amount needed to form a detectible pattern and allowance between the maximum toner density TC2 of the range and the toner density (above TC2) at which background dust actually becomes apparent.

Figure 23:
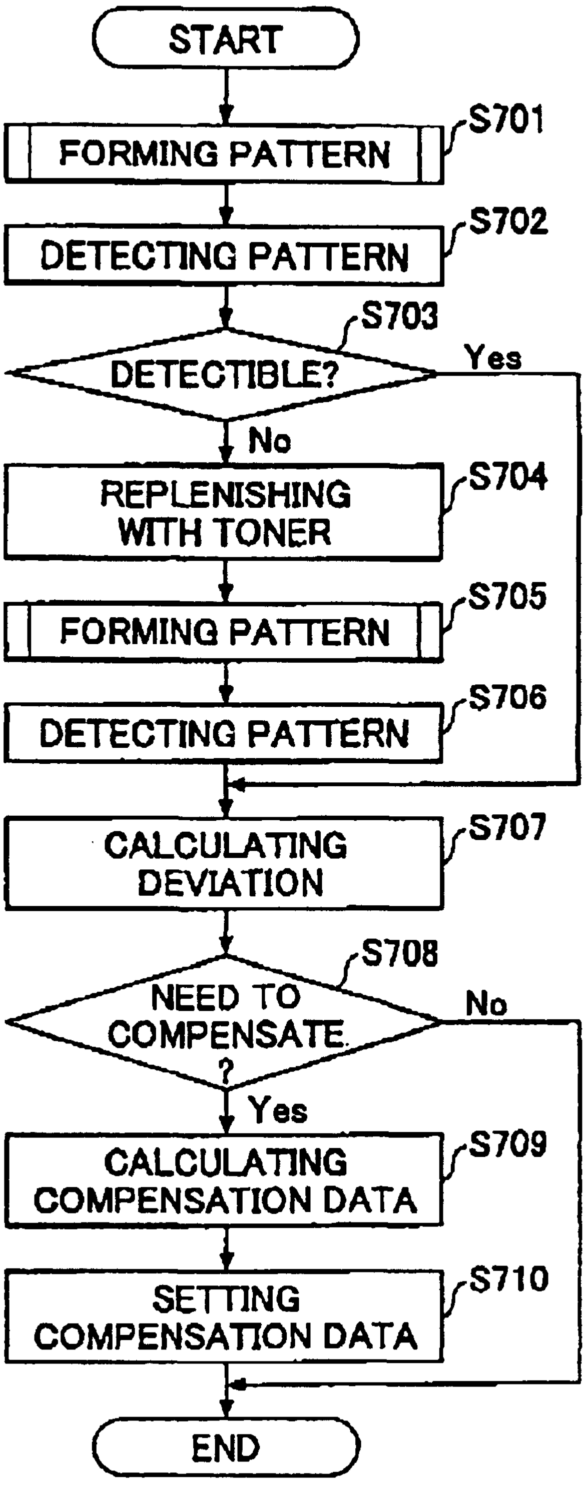
FIG. 23 is a flow chart showing the 1$^{st}$ exemplary operation of an image forming apparatus according to the 7$^{th}$ embodiment.
Figure 24:
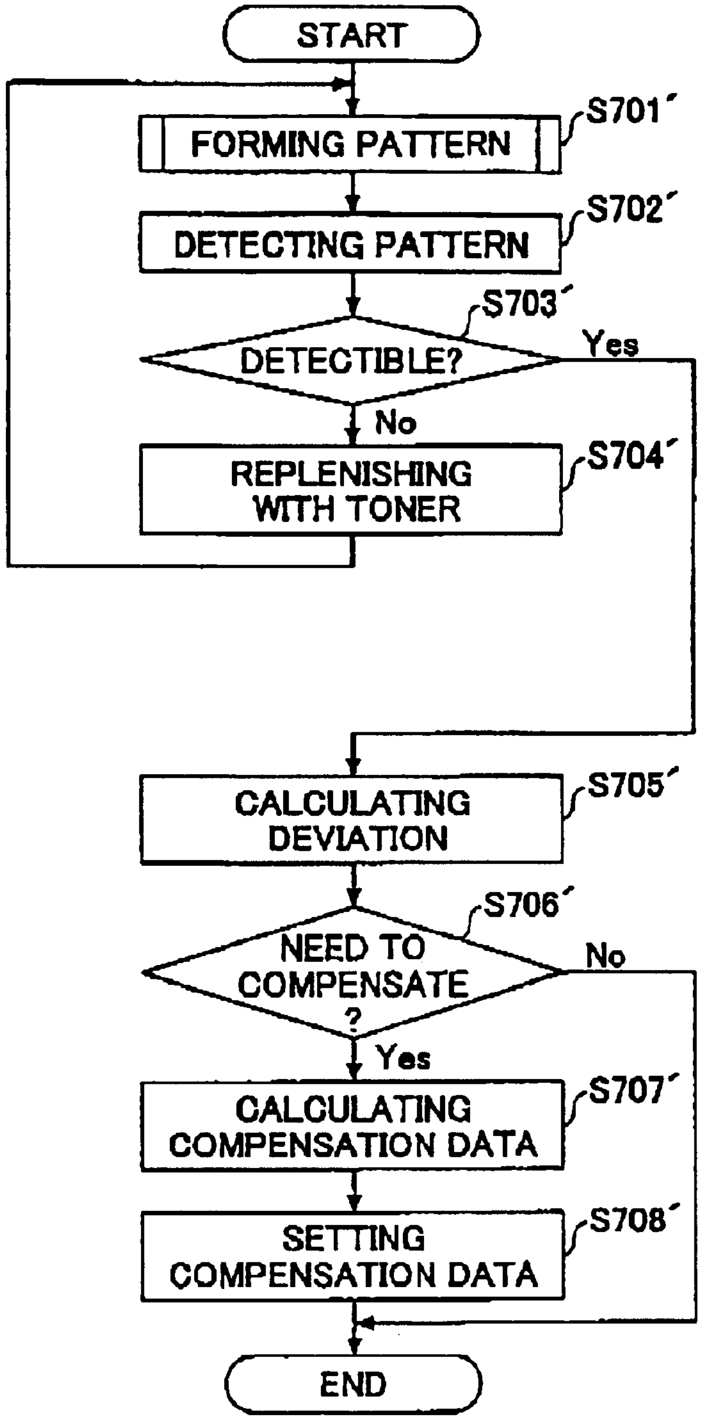
FIG. 24 is a flow chart showing the 2$^{nd}$ exemplary operation of the image forming apparatus according to the 7$^{th}$ embodiment.

FIGS. 23 and 24 are flow charts showing the first and second exemplary operations, respectively, for compensating for the positional deviation performed by the image forming apparatus according to the seventh embodiment. The operation for compensating for the positional deviation of the image forming apparatus according to the seventh embodiment is different from that of the image forming apparatus according to the third embodiment in that, when increasing the image density of the pattern for compensating for the image deviation, the printer controller 207 transmits a signal to the toner density controller 211 to supply additional toner. Since the other steps are identical to those in the operation performed by the image forming apparatus according to the third embodiment, the detailed description of the operation is omitted.

[$8^{th}$ Embodiment]

An image forming apparatus according to the eighth embodiment of the present invention is described below. The structure of the image forming apparatus according to the embodiment and the controllers provided therein, and the pattern for compensating for the image deviation are the same as those of the first embodiment.

Figure 25:
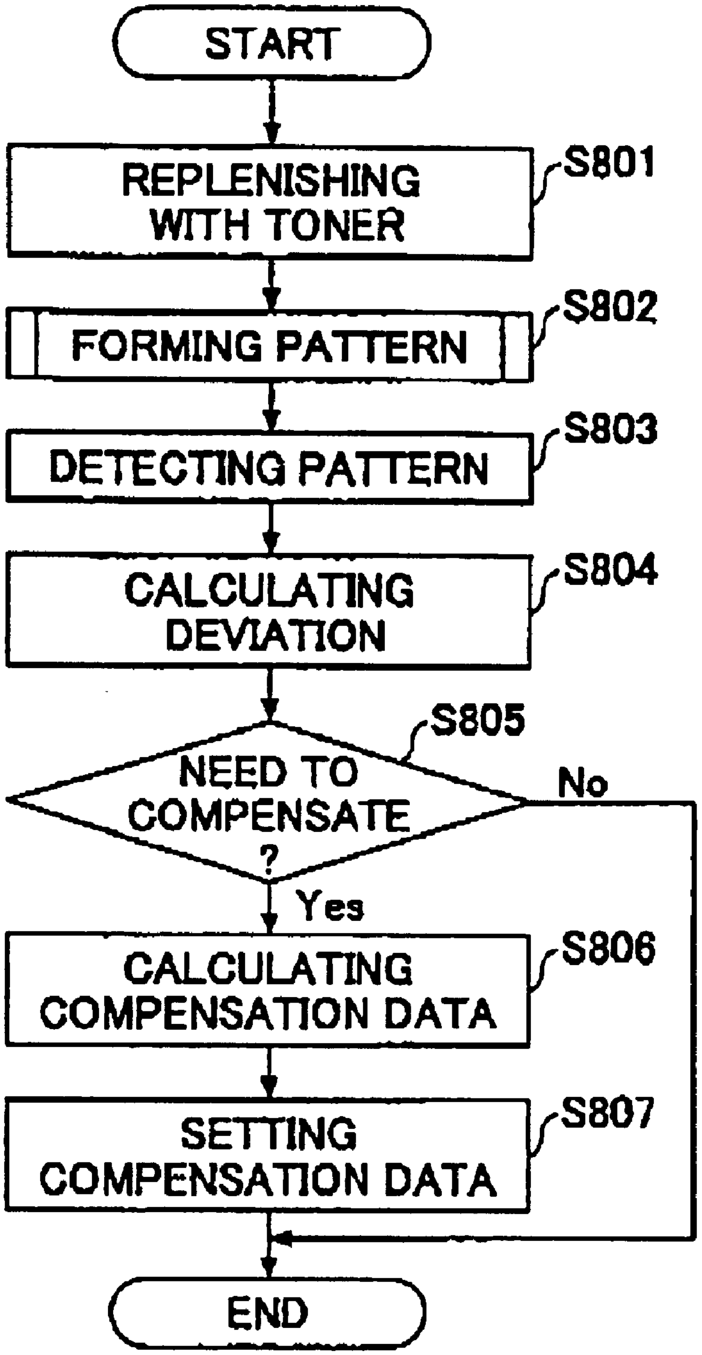
FIG. 25 is a flow chart showing the exemplary operation of an image forming apparatus according to the 8$^{th}$ embodiment.

FIG. 25 is a flow chart showing the operation by the image forming apparatus according to the embodiment of compensating for the positional deviation. This operation is different from that of the image forming apparatus according to the fourth embodiment in that, when increasing the image density of the pattern, the printer controller 207 sends a signal to the toner density controller 211 and causes the toner density controller 211 to supply additional toner. Since the other steps are the same as those of the fourth embodiment, the detailed description is omitted.

If the output level of the sensors is too high, and the ordinary images to be formed after the adjustment are likely to be degraded due to the additional toner, an additional operation to consume the toner may be performed after the adjustment.

[$9^{th}$ Embodiment]

An image forming apparatus according to the ninth embodiment is described below. The structure of the image forming apparatus according to the embodiment and the controllers provided therein and the pattern for compensating for the image deviation are the same as the first embodiment.

Figure 26:
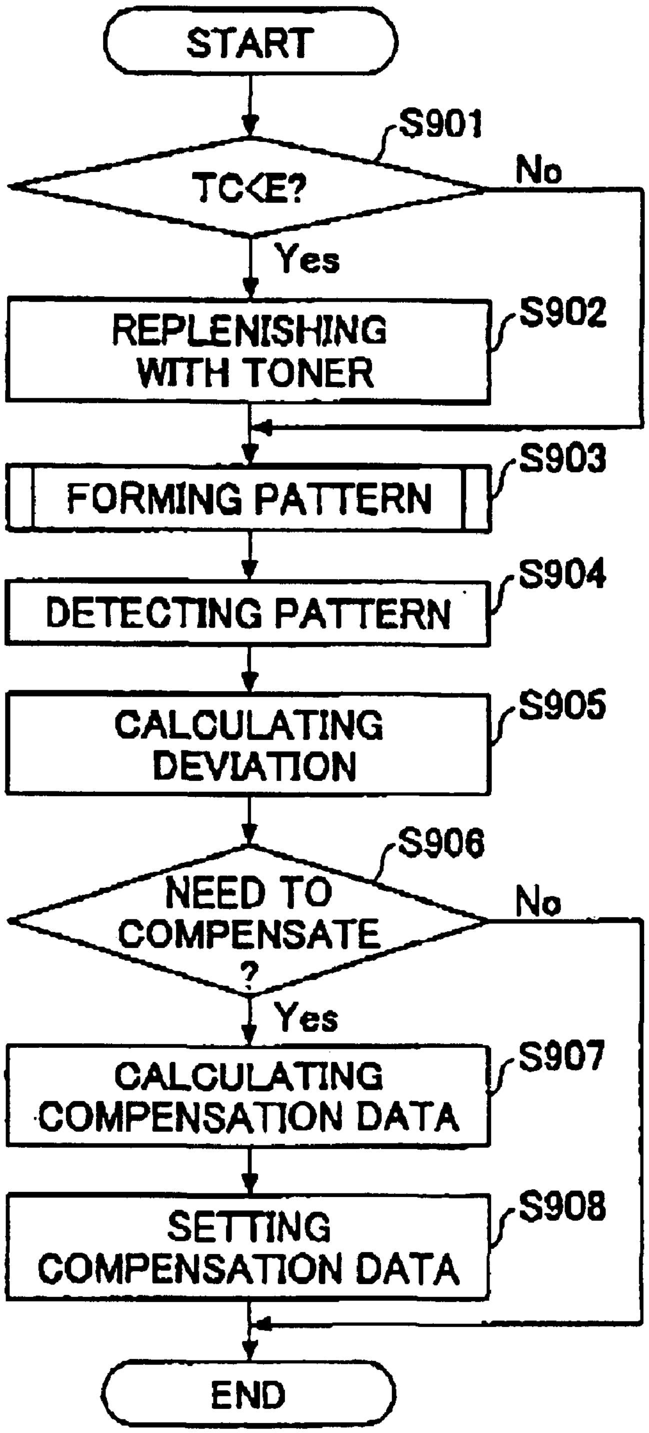
FIG. 26 is a flow chart showing the exemplary operation of an image forming apparatus according to the 9$^{th}$ embodiment.

FIG. 26 is a flow chart showing the operation of the image forming apparatus according to the ninth embodiment of compensating for the positional deviation. The operation of compensating for the positional deviation according to the ninth embodiment is almost the same as that of the eighth embodiment, but is different in that, before supplying additional toner, current toner density is determined (step S901), and if the current toner density is lower than a predetermined value ("Yes" in step S901), the additional toner is supplied.

The other steps are identical those of the second exemplary operation of the image forming apparatus according to the eighth embodiment.

Since the image forming apparatus according to the ninth embodiment supplies additional toner only if the toner density is lower than the predetermined value, it is possible to surely prevent the images after the adjustment from being affected by the supply of the additional toner.

[$10^{th}$ Embodiment]

An image forming apparatus according to the tenth embodiment of the present invention is described below. The structure of the image forming apparatus according to the tenth embodiment and the controllers provided therein and the pattern for compensating for the image deviation is the same as the first embodiment.

If the pattern for compensating for the image deviation is formed by scanning at a higher speed than the speed at which the ordinary images are formed, the image density in the sub scan directions is increased by the same ratio as the increase of the light beam scan speed. Consequently, the exposure energy per a unit area is increased at the same ratio. Accordingly, if the scan speed of the light beam is increased, the density of the pattern for compensating for the image deviation is increased. Consequently, the output level of the sensors have enough allowance from the threshold.

Figure 27:
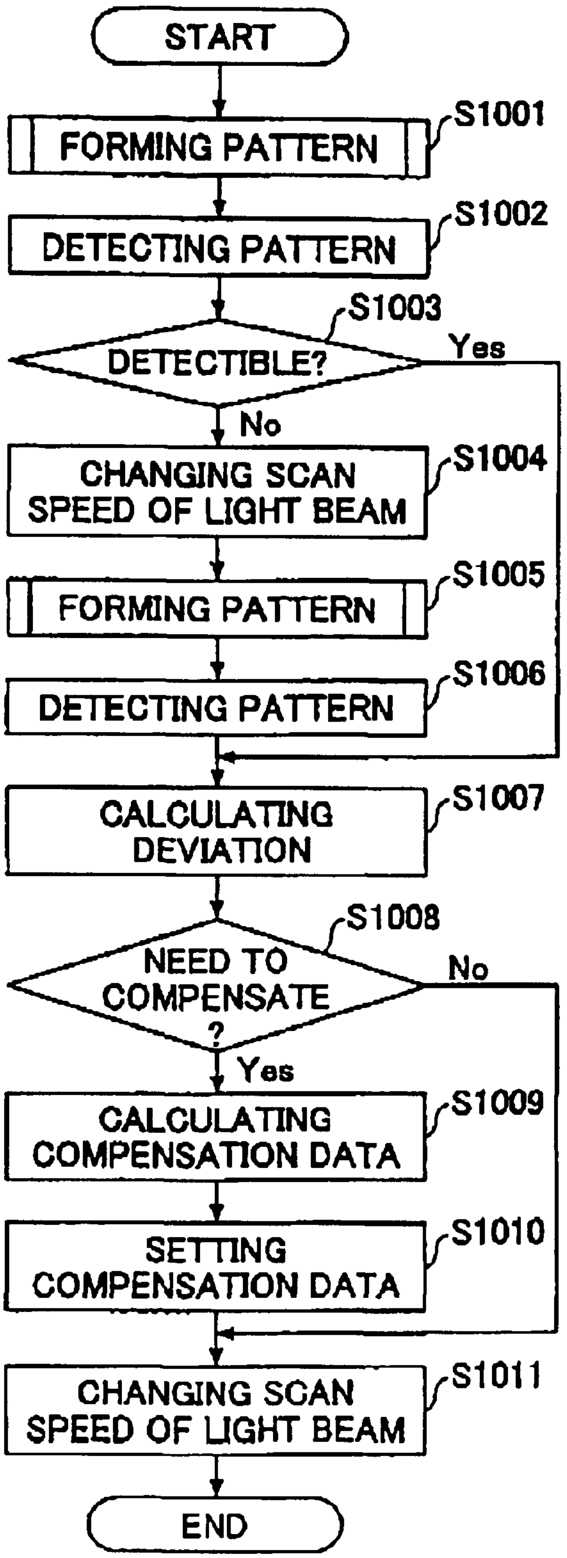
FIG. 27 is a flow chart showing the 1$^{st}$ exemplary operation of an image forming apparatus according to the 10$^{th}$ embodiment.
Figure 28:
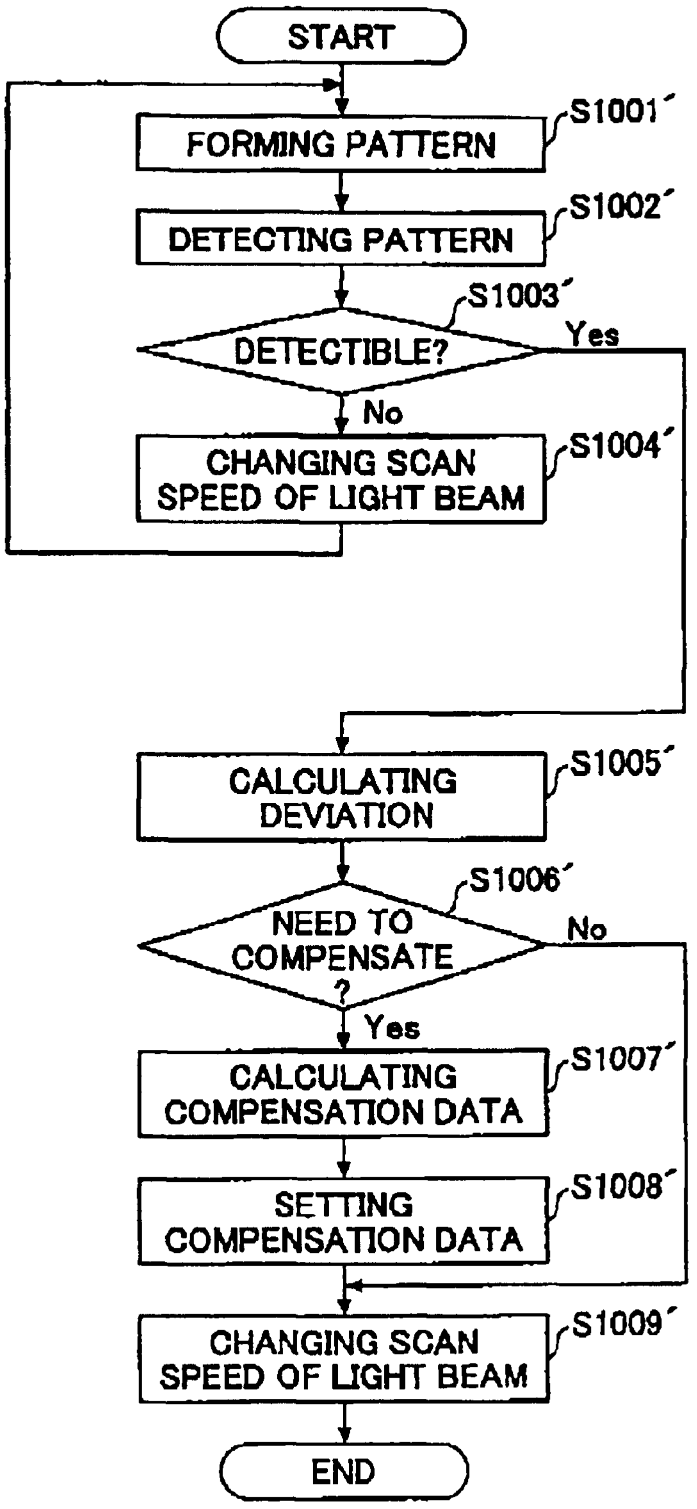
FIG. 28 is a flow chart showing the 2$^{nd}$ exemplary embodiment of the image forming apparatus according to the 10$^{th}$ embodiment.

FIGS. 27 and 28 are flow charts showing the first and second exemplary operation, respectively, for compensating for the positional deviation according to the tenth embodiment. The operation for compensating for the positional deviation according to the tenth embodiment is different from the of the third embodiment in that, when the pattern density is increased, the printer controller 207 sends a polygon motor control signal to the polygon motor controller 201 to accelerate the rotative speed of the polygon motor 1022. Since the other portion of the operation according to the tenth embodiment is the same as that of the third embodiment, no detailed description is given here.

[$11^{th}$ Embodiment]

An image forming apparatus according to the eleventh embodiment of the present invention is described below. The structure of the image forming apparatus according to the embodiment and the pattern for compensating for the image deviation are identical to those of the first embodiment.

Figure 29:
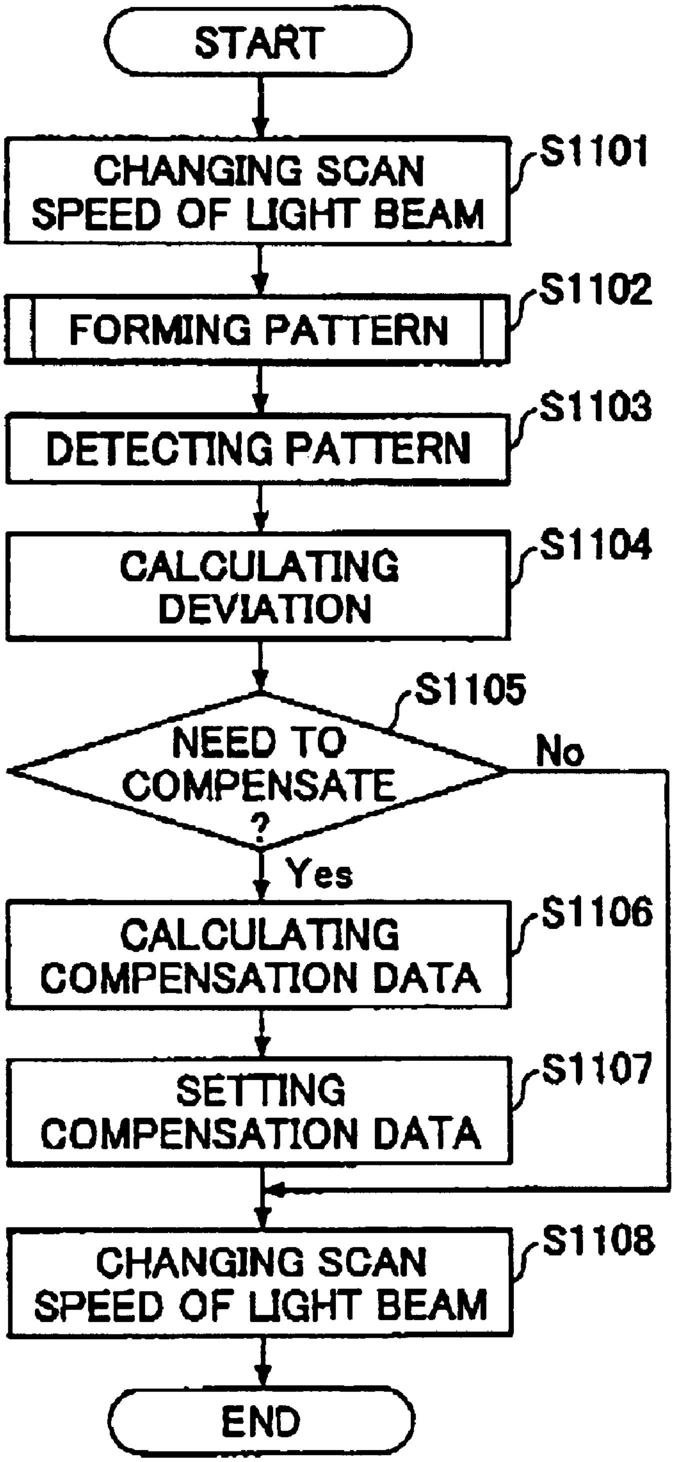
FIG. 29 is a flow chart showing the exemplary operation of an image forming apparatus according to the 11$^{th}$ embodiment.

FIG. 29 is a flow chart showing an exemplary operation for compensating for the positional deviation according to the eleventh embodiment. The operation for compensating for the positional deviation is different from that of the fourth embodiment only in that, when the density of the pattern is increased, the printer controller 207 sends a polygon motor control signal to the polygon motor controller 201 to accelerate the rotative speed of the polygon motor 1022. The other portion of the operation is the same as that of the fourth embodiment, therefore no detailed description is given.

[$12^{th}$ Embodiment]

An image forming apparatus according to the twelfth embodiment is described below. The structure of the image forming apparatus according to the twelfth embodiment and the pattern for compensating for the image deviation are the same as that of the first embodiment.

If the rotative speed of the photosensitive body 1011 and the transfer belt 103 is lower than that of the ordinary images, the image density in the sub scan directions increases at the same rate as the decrease in the rotative speed, and consequently, the exposure energy by the unit area increases.

Accordingly, the image density of the pattern for compensating for the positional deviation can be increased by lowering the rotative speed of the photosensitive body drum 1011 and the transfer belt 103, in order to have enough allowance below the threshold.

Figure 30:
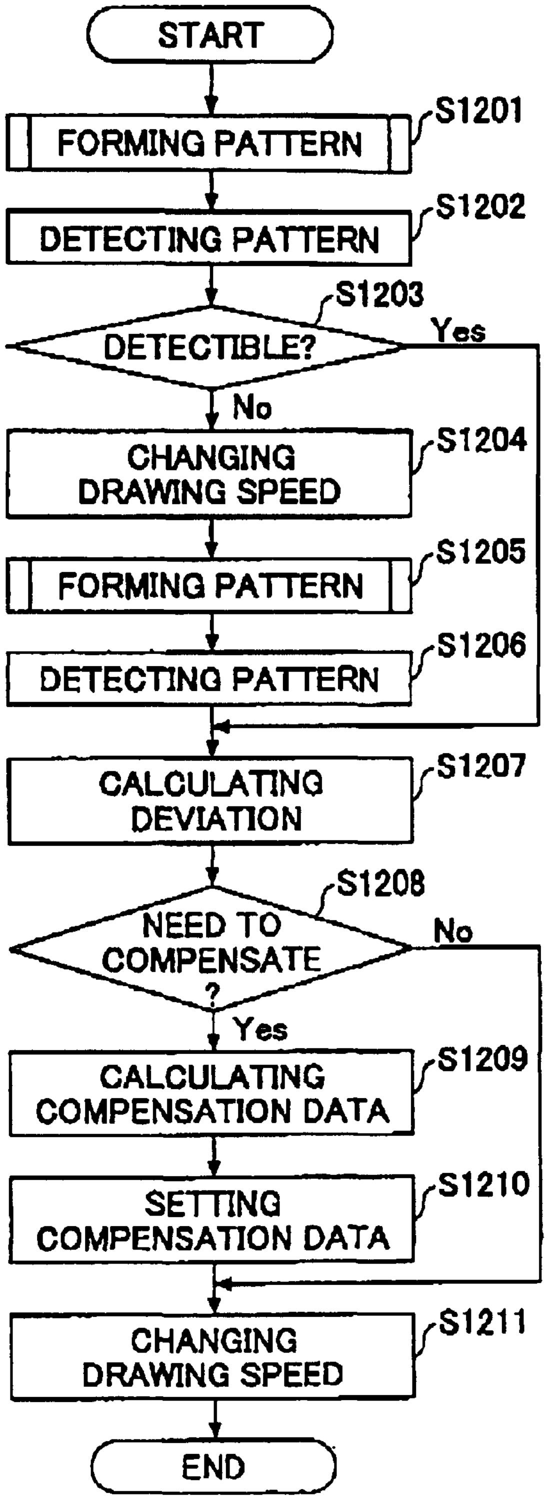
FIG. 30 is a flow chart showing the 1$^{st}$ exemplary embodiment of an image forming apparatus according to the 12$^{th}$ embodiment.
Figure 31:
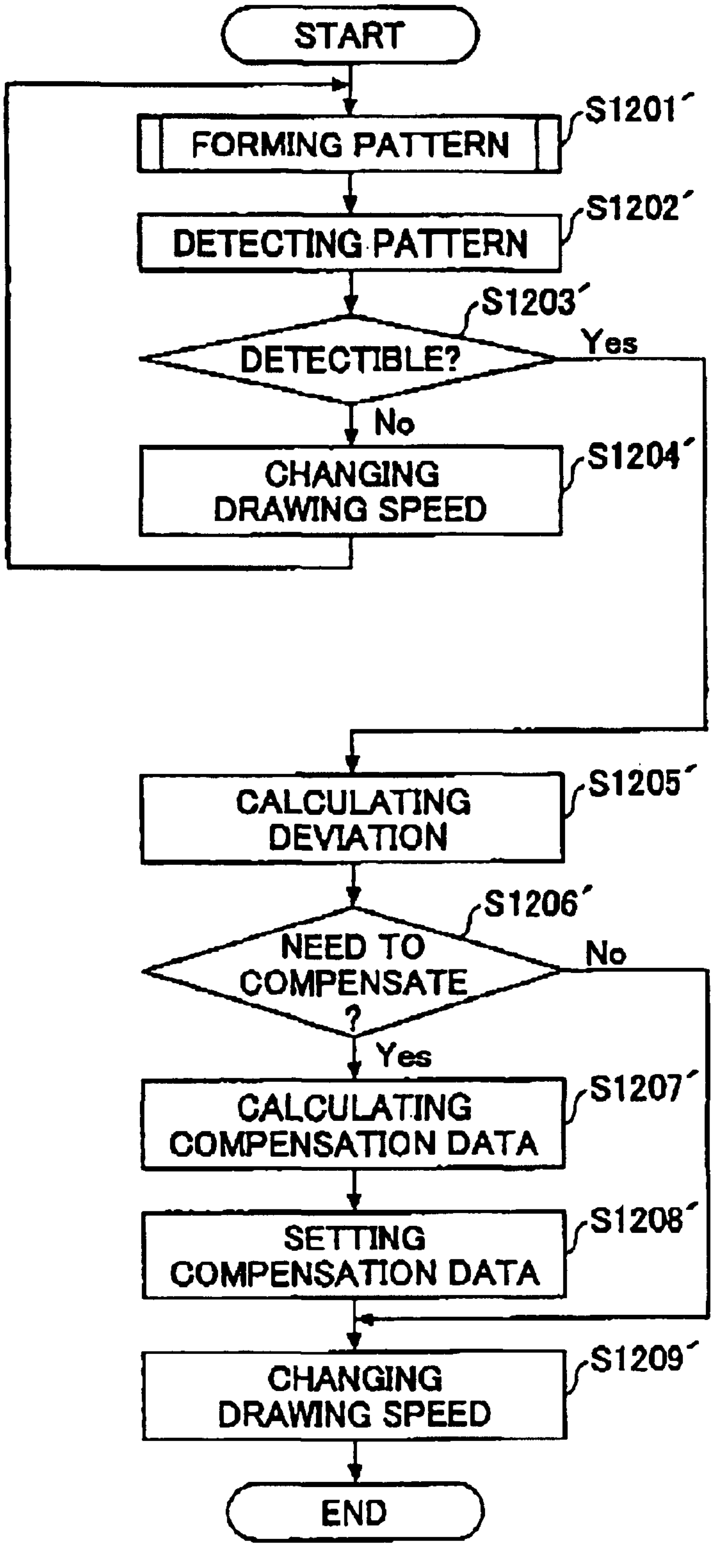
FIG. 31 is a flow chart showing the 2$^{nd}$ exemplary embodiment of the image forming apparatus according to the 12$^{th}$ embodiment.

FIGS. 30 and 31 are flow charts showing the operation for compensating for the image deviation according to the twelfth embodiment. When the image density of the pattern for compensating for the image deviation is increased, the printer controller 207 sends a signal to a photosensitive drum rotation controller (not shown) and the transfer belt rotation controller (not shown) to lower the rotative speed of the photosensitive drum 1011 and the transfer belt 103. The other portion of the operation is the same as that of the third embodiment, so the detailed description of the operation is omitted.

[$13^{th}$ Embodiment]

An image forming apparatus according to the thirteenth embodiment is described below. The structure of the image forming apparatus according to the embodiment and the pattern for compensating for the image deviation are the same as those of the first embodiment.

Figure 32:
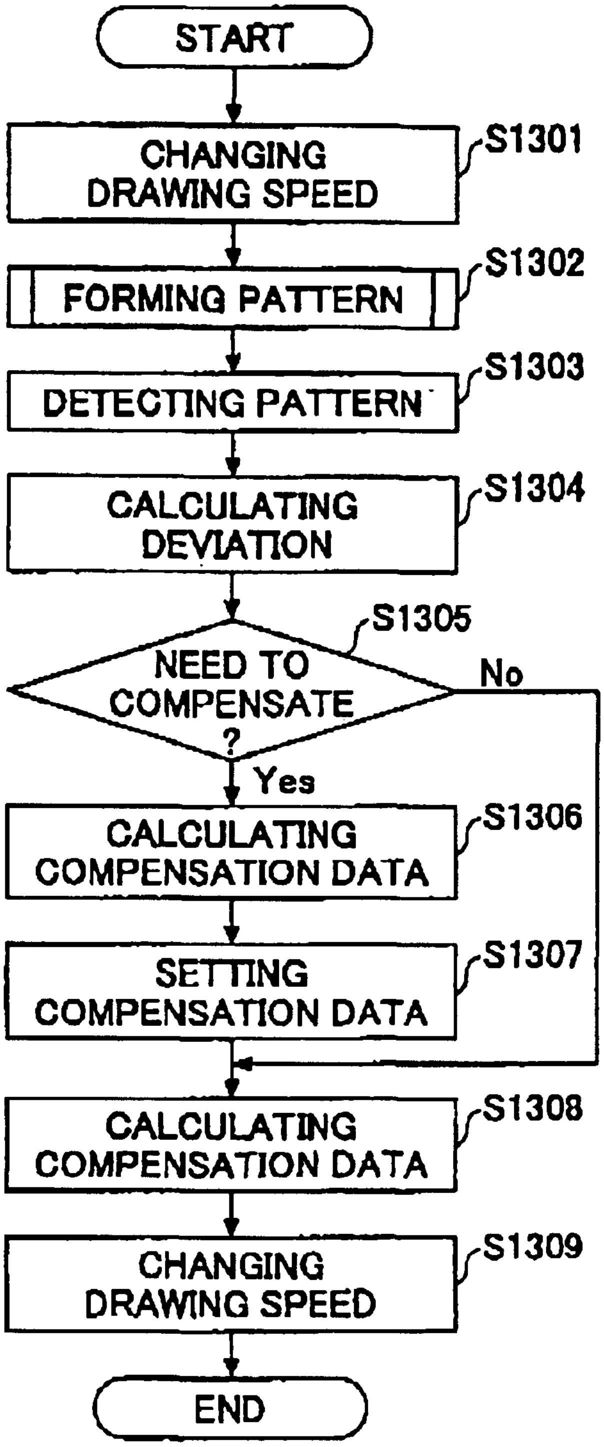
FIG. 32 is a flow chart showing the exemplary embodiment of an image forming apparatus according to the 13$^{th}$ embodiment.

FIG. 32 is a flow chart showing the operation of the image forming apparatus according to the thirteenth embodiment for compensating for the positional deviation. In the operation for compensating for the positional deviation according to the embodiment, the printer controller 207 sends a signal to not shown photosensitive drum rotation controller and transfer belt rotation controller to lower the rotative speed of the photosensitive drum 1011 and the transfer belt 103. The other portion of the operation is the same as those of the fourth embodiment, therefore the detailed description is omitted.

[$14^{th}$ Embodiment]

An image forming apparatus according to the fourteenth embodiment is described below. The structure of the image forming apparatus according to the embodiment and the pattern for compensating for the image deviation are the same as those of the first embodiment.

In this embodiment, at least one of the operations for compensating for the image deviation described above is performed. In other words, the image forming apparatus according to the fourteenth embodiment can perform a plurality of compensations performed by the image forming apparatus according to the above embodiments.

The image deviation can be compensated for by combining the methods described above.

[15$^{th}$ Embodiment]

An image forming apparatus according to the fifteenth embodiment is described below.

Figure 33:
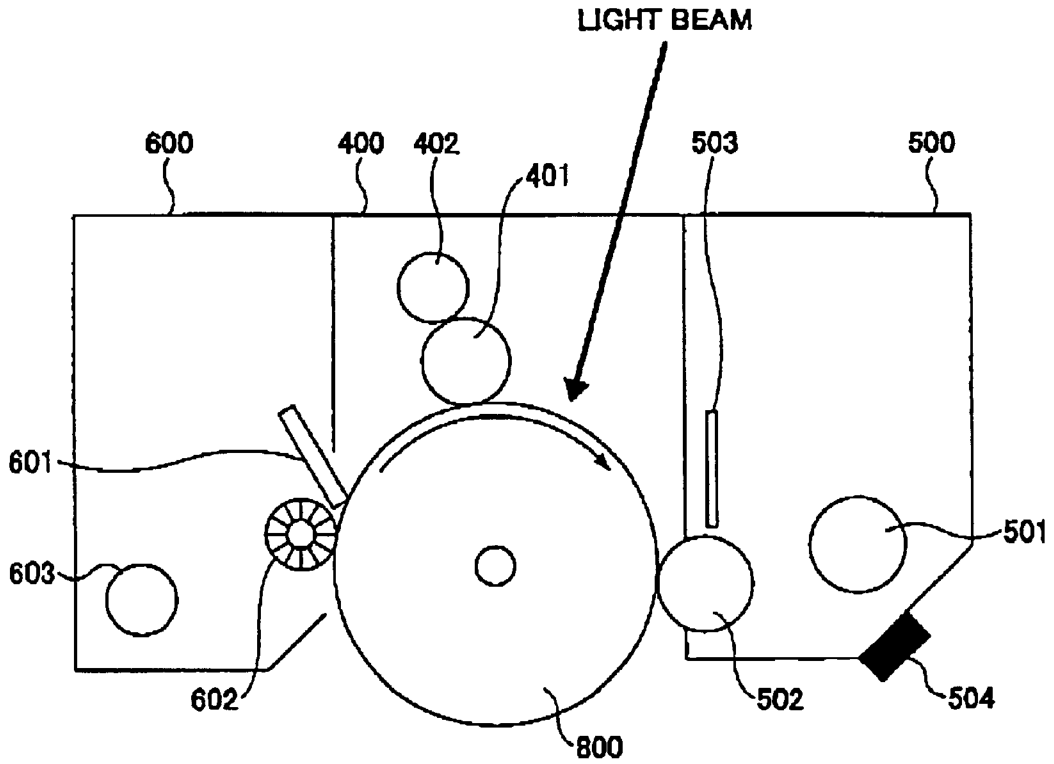
FIG. 33 is a schematic diagram showing a process cartridge of an image forming apparatus according to the 15$^{th}$ embodiment.

The structure of the image forming apparatus according to the fifteenth embodiment and the controllers provided therein and the pattern for compensating for the image deviation are the same as those of the first embodiment. In the fifteenth embodiment, as shown in FIG. 33, the photosensitive drum 800, a charging unit 400, a development unit 500, and a cleaning unit 600 are built into a process cartridge. The process cartridge is detachable from and reattachable to the image forming apparatus. A separate process cartridge independently corresponds to each color.

The charging unit 400 is provided with a charging roller 401 and a charge cleaning roller 402. The charging roller 401 rotates in the opposite direction to the rotation of the photosensitive body drum 800 so that the roller surface of the charging roller 401 moves at the same speed and the same direction as the drum surface of the photosensitive drum 800 touching the roller surface moves. The charging roller 401 charges the drum surface of the photosensitive drum 800 uniformly. The charge cleaning roller 402 is provided above the charging roller 401 that always touches the charging roller 401, and cleans the charging roller 401.

The development unit 500 is provided with a transport screw 501, a development roller 502, a development doctor blade 503, and a toner density sensor 504. The transfer screw 501 stirs toner transported from a toner cartridge (not shown) to mix the toner with developer, and transports them to the development roller 502. The development roller 502 provides the photosensitive body drum 800 with the toner mixed with developer. The development doctor blade 503 limits the amount of the toner mixed with developer attached to the surface of the development roller 502. The toner density sensor 504 detects the density of toner in the toner mixed with developer to control the toner density. That is, the toner density is controlled by supplying toner from the toner cartridge based on the toner density detected by the toner density sensor 504.

The cleaning unit 600 is provided with a cleaning blade 601, a cleaning brush 602, and a waste toner transport coil 603. The cleaning blade 601 always touches the surface of the photosensitive drum 800 in the direction counter to the rotation of the photosensitive drum 800. The cleaning brush 602 rotates in the opposite rotative direction to the rotation of the photosensitive body drum 800 so that the brush surface moves at the same speed and the same direction as those of the drum surface touching the brush surface.

The toner mixed with developer remaining on the surface of the photosensitive body drum 800 is removed by the cleaning blade 601 and the cleaning brush 602 from the surface of the photosensitive body drum, and is sent to the waste toner transport coil 603. The unused toner mixed with developer sent to the waste toner transportation coil 603 is transported to a not shown waste toner discharge opening, and placed in a not shown waste toner bottle.

The image forming apparatus according to the fifteenth embodiment can perform the operation for compensating for the positional deviation described in connection with the first through fourteenth embodiments.

[16$^{th}$ Embodiment]

An image forming apparatus according to the sixteenth embodiment is described below. The structure of the image forming apparatus according to the sixteenth embodiment and the controllers provided therein and the pattern for compensating for the image deviation are the same as those of the first embodiment.

Figure 34:
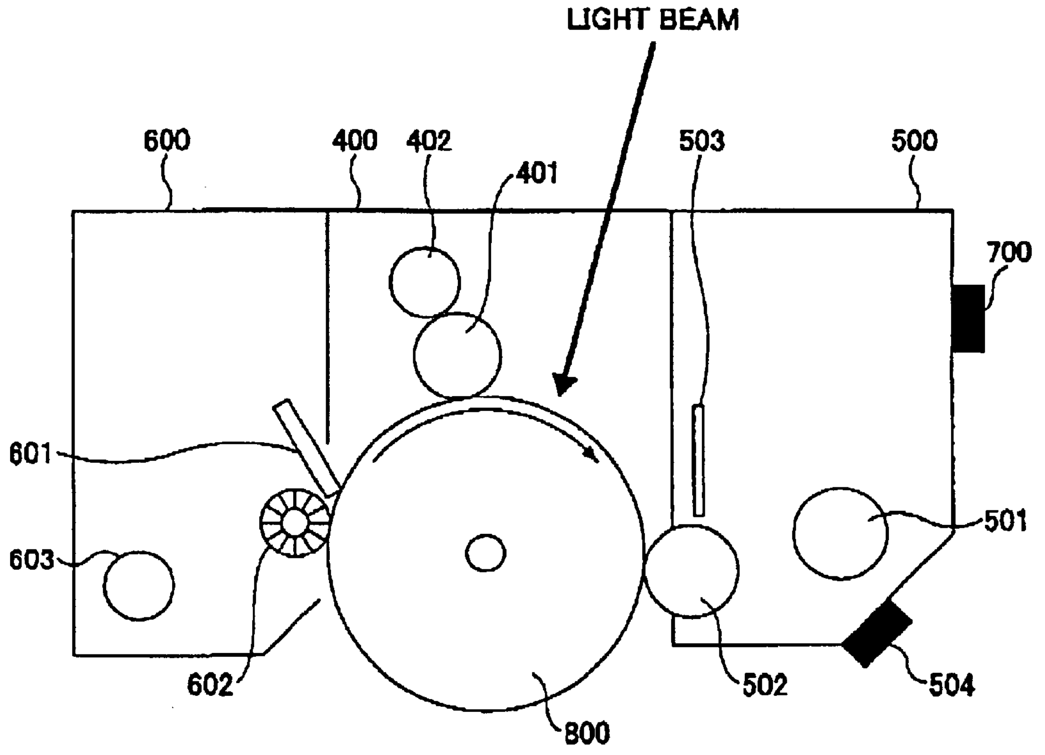
FIG. 34 is a schematic diagram showing the structure of a process cartridge provided in the image forming apparatus according to the 16$^{th}$ embodiment.

As shown in FIG. 34, in the case of this embodiment, the photosensitive body drum 800, the charging unit 400, the development unit 500, and the cleaning unit 600 are built into the process cartridge in the same manner as the fifteenth embodiment. However, the process cartridge according to this embodiment is different form that of the fifteenth embodiment in that it is provided with a memory 700.

The memory 700 is a non-volatile storage device that stores image forming conditions for the pattern for compensating for the image deviation (at least one of the exposure energy of the light beam, the development bias voltage, the transfer current, the toner amount, the scan speed, and the linear speed of the photosensitive body).

Figure 35:
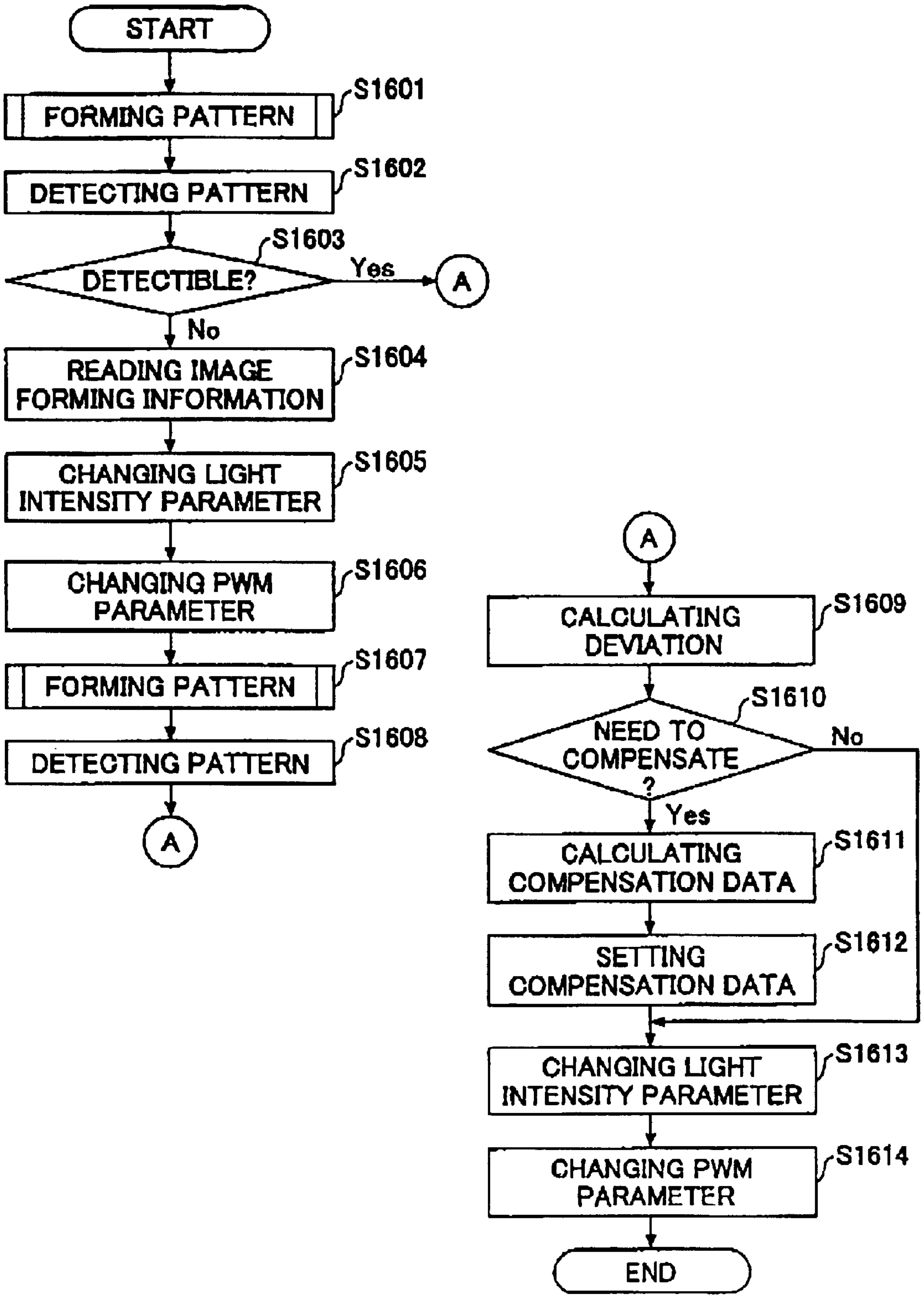
FIG. 35 is a flow chart showing the exemplary operation of an image forming apparatus according to the 16$^{th}$ embodiment.

According to this embodiment, the image forming condition to be used when the pattern for compensating for the image deviation is stored in the memory 700 in advance. FIG. 35 is a flow chart showing the operation of the image forming apparatus according to this embodiment of compensating for the positional deviation.

This operation is almost same as the operation of the image forming apparatus according to the first embodiment shown in FIG. 10, but is different in that, if the printer controller 207 cannot detect the pattern formed in step S1601 with the sensors 105 and 106 ('No" in step S1603), the printer controller 207 reads the image forming condition stored in the memory 700 (step S1604), transmits a light intensity control signal and a pulse width control signal to the LD controller 203 so as to set the light intensity parameter and the PWM parameter at values corresponding to the image forming condition read from the memory 700 (steps S1605, S1606).

As described above, in the case the image forming condition with which the pattern for compensating for the positional deviation is formed is stored in the memory 700, if the process cartridge is once removed from the image forming apparatus and then attached to the image forming apparatus again, the printer controller 207 can form the pattern for compensating for the image deviation using the image forming condition stored in the memory 700.

In the case that the image forming condition with which the ordinary images are formed is also stored in the memory 700, if the process cartridge is once removed from the image forming apparatus and then attached to the image forming apparatus again, the image forming apparatus can form the ordinary images using the image forming condition stored in the memory 700. Accordingly, the image forming apparatus can maintain the image quality constant. Additionally, if the process cartridge is replaced with another process cartridge, the image forming apparatus can form the ordinary images using the image forming condition stored in the memory 700. Accordingly, the image quality becomes stable.

In the case in which the pattern for compensating for the image deviation and the image forming condition with which the ordinary images are formed change over time or due to environmental change, the image forming condition stored in the memory 700 may be updated. The image forming apparatus can always compensates for the image deviation without fail. The image forming apparatus can always output ordinary images of high quality.

In the above description, the case in which the printer controller 207 changes the light intensity and the PWM parameter based on the image forming condition stored in the memory 700 is described. The printer controller 207 may change the development bias voltage, the transfer current, the toner amount, the scan speed and/or the linear speed of the photosensitive body in the same manner. Additionally, the printer controller 207 may change two of the exposure energy of the light beam, the development bias voltage, the transfer current, the toner amount, the scan speed and/or the linear speed of the photosensitive body based on the image forming condition stored in the memory 700.

[17$^{th}$ Embodiment]

An image forming apparatus according to the seventeenth embodiment is described below.

Figure 36:
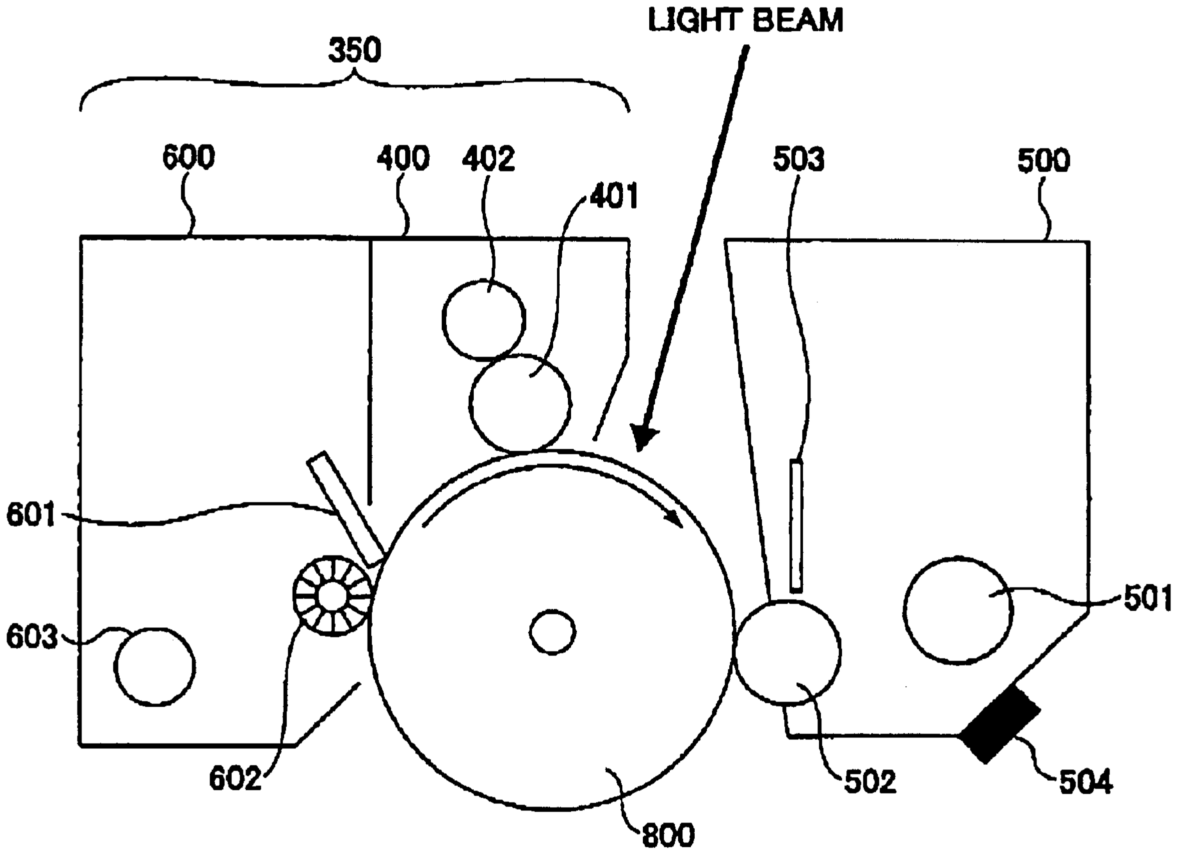
FIG. 36 is a schematic diagram showing the structure of a photosensitive body unit and a development unit provided in an image forming apparatus according to the 17$^{th}$ embodiment.

The structure of the image forming apparatus according to this embodiment and the controllers provided therein and the pattern for compensating for the image deviation are the same as those of the first embodiment. However, in this embodiment, as shown in FIG. 36, the photosensitive body drum 800, the charging unit 400, and the cleaning unit 600 are built into a photosensitive body unit 350, and both the photosensitive body unit 350 and the development unit 500 are detachable on and off the image forming apparatus. The photosensitive unit 350 and the development unit 500 are provided for each color independently.

The structure of the photosensitive body drum 800, the charging unit 400, and the cleaning unit 600 forming the photosensitive body unit 350 and the construction of the development unit 500 are the same as those described in connection with the fifteenth embodiment.

The image forming apparatus according to this embodiment can perform the operation for compensating for the image deviation in the same manner as the image forming apparatuses according to the first through fourteenth embodiments.

[18$^{th}$ Embodiment]

An image forming apparatus according to the eighteenth embodiment is described below. The structure of the image forming apparatus according to this embodiment and the controllers provided therein and the pattern for compensating for the image deviation are the same as those of the first embodiment.

Figure 37:
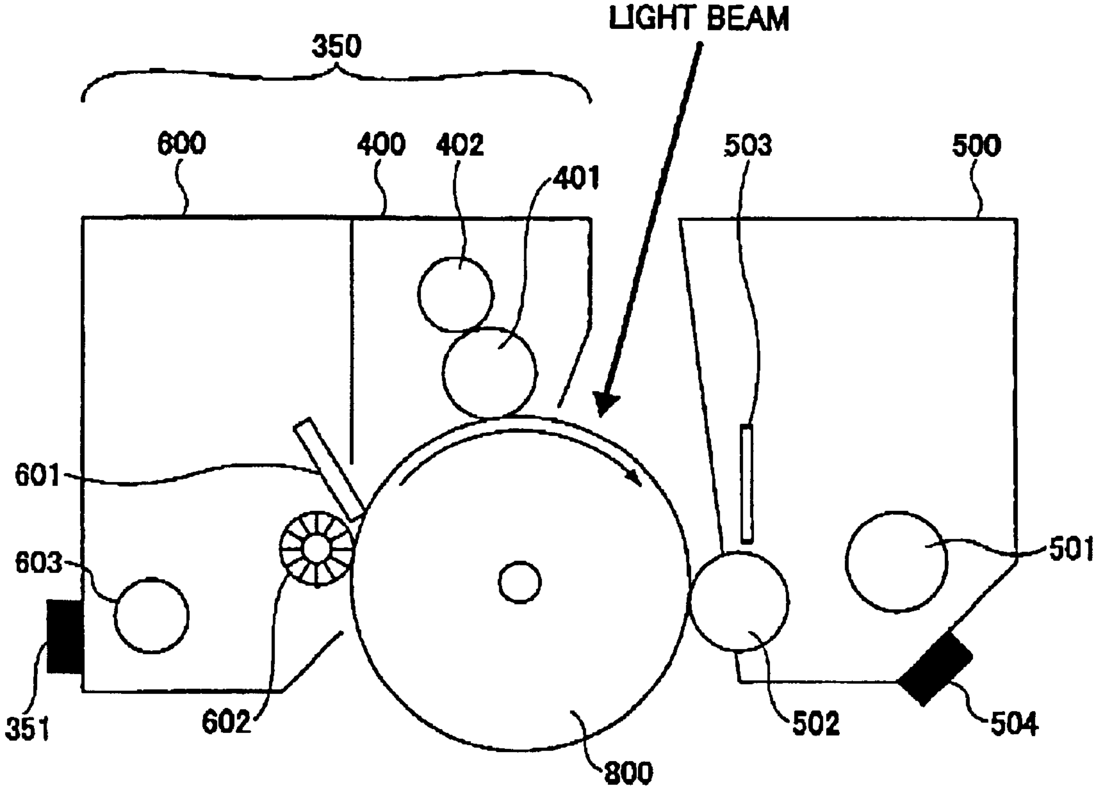
FIG. 37 is a schematic diagram showing a photosensitive body unit in which a memory is provided and a development unit of an image forming apparatus according to the 18$^{th}$ embodiment.

As shown in FIG. 37, according to the embodiment, the photosensitive body unit 350 combining the photosensitive drum 800, the development unit 400, and the cleaning unit 600, and the development unit 500 are both detachable on and off the image forming apparatus. In addition, the photosensitive body unit 350 and the development unit 500 are provided for each color independently.

According to the embodiment, a memory 351 is built in the photosensitive body unit 350. The memory 351.is a non-volatile storage device that stores the image forming condition of the pattern for compensating for the image deviation.

In this embodiment, the image forming condition of the pattern for compensating for the image deviation is stored in the memory 351 in advance. However, the image forming condition to be stored in the memory 351 is at least one of the exposure energy of the light beam, the scan speed of the light beam, the linear speed of the photosensitive body drum 800, the transfer current, and the development bias voltage.

The operation for compensating for the positional deviation of the image forming apparatus according to the eighteenth embodiment is the same as that of the sixteenth embodiment. When the image forming condition of the pattern for compensating for the image deviation is changed, the printer controller 207 reads information stored in the memory 351, and updates the image forming condition based on the information.

As described above, in the case in which the exposure condition used when the pattern for compensating for the positional deviation is formed is stored in the memory 351, if the photosensitive body unit is detached from the image forming apparatus and then reattached to the image forming apparatus, the pattern for compensating for the image deviation can be formed under the exposure condition stored in the memory 351.

Figure 38:
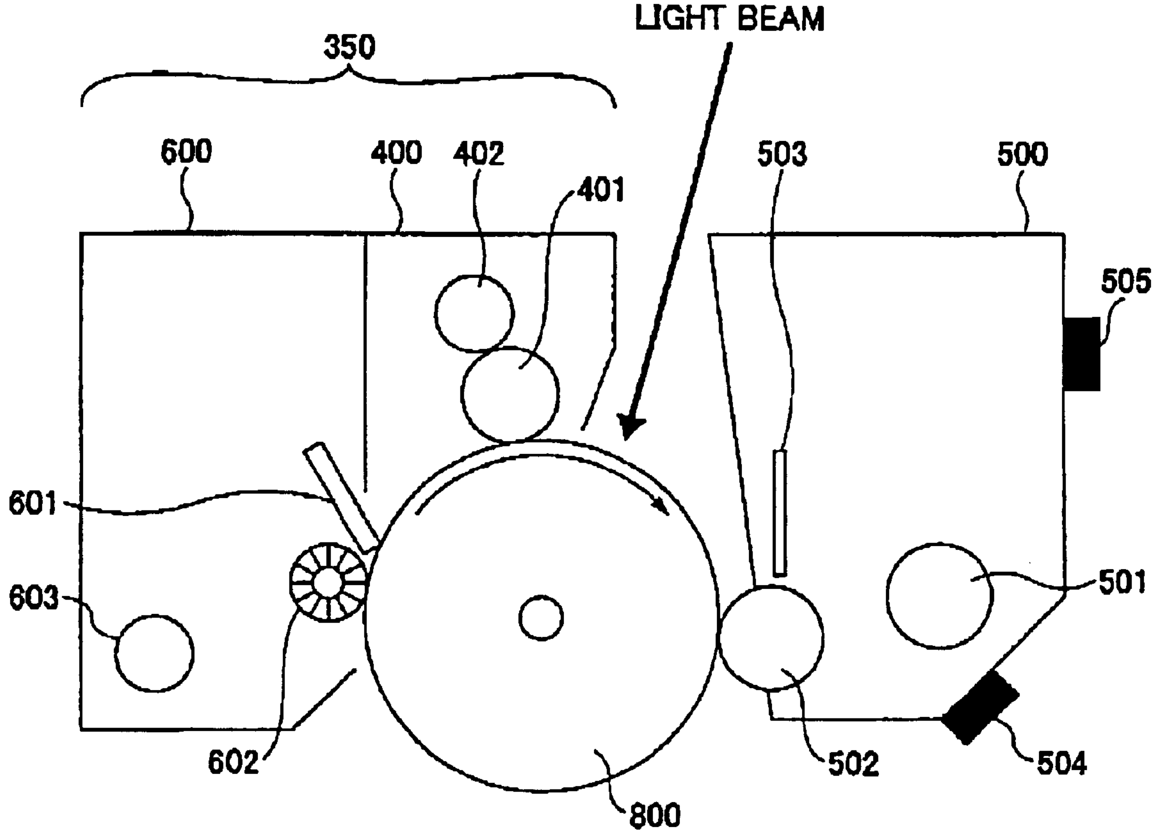
FIG. 38 is a schematic diagram showing a photosensitive body unit and a development unit in which a memory is provided of an image forming apparatus according to the 18$^{th}$ embodiment.

In the case in which the toner amount is used as the image forming condition used when the pattern for compensating the image deviation is formed, as shown in FIG. 38, a memory 505 is provided in the development unit 500, and the image forming condition can be stored in the memory 505.

Figure 39:
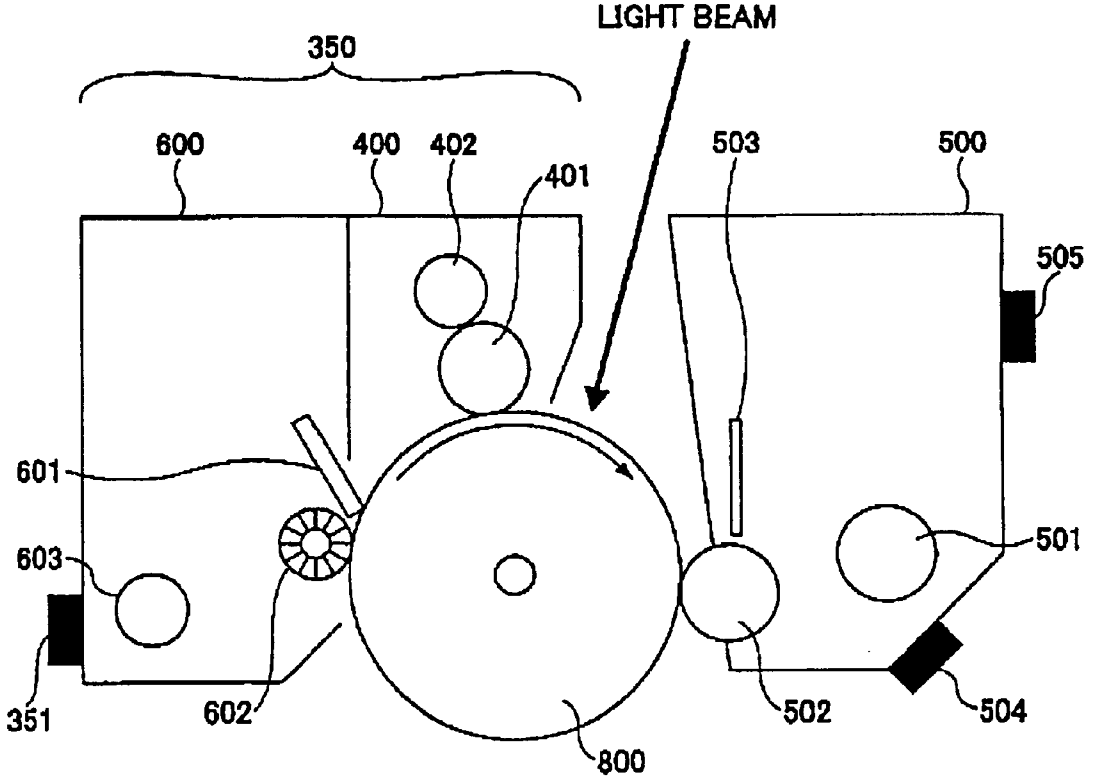
FIG. 39 is a schematic diagram showing a photosensitive body unit and a development unit, both of which are provided with a memory, of an image forming apparatus according to the 18$^{th}$ embodiment.

In the case in which the toner amount and at least one of the exposure energy of the light beam, the scan speed of the light beam, the linear speed of the photosensitive body drum 800, the transfer current, and the development bias voltage are used as the image forming condition for the pattern for compensating for the image deviation, as shown in FIG. 39, the memory 351 and the memory 505 may be provided in the photosensitive body unit 350 and the development unit 500, respectively, and the image forming condition may be stored therein.

If the image forming condition with which the ordinary images are formed is also stored in the memory 351 and the memory 505, even when the photosensitive body unit 350 and the development unit 500 are detached off and then reattached to the image forming apparatus, the ordinary images can be formed using the image forming condition stored in the memory 351 and the memory 505. Accordingly, the image quality can be maintained at a constant level. Even if the photosensitive body unit 350 and the development unit 500 are replaced with those of another image forming apparatus, the ordinary images can be formed using the image forming condition stored in the memory 351 and the memory 505. The image quality becomes stable.

In the case the image forming condition of the pattern for compensating for the image deviation and the ordinary images is changed over time or due to environmental change, the compensation for the image deviation can be performed without fail by updating the image forming condition stored in the memory 351 and the memory 505. Accordingly the image forming apparatus can form the ordinary images of high quality.

[19$^{th}$ Embodiment]

An image forming apparatus according to the nineteenth embodiment is described below. The structure of the image forming apparatus according to the nineteenth embodiment and the controllers provided therein and the pattern for compensating for the image deviation are the same as those of the first embodiment.

Figure 40:
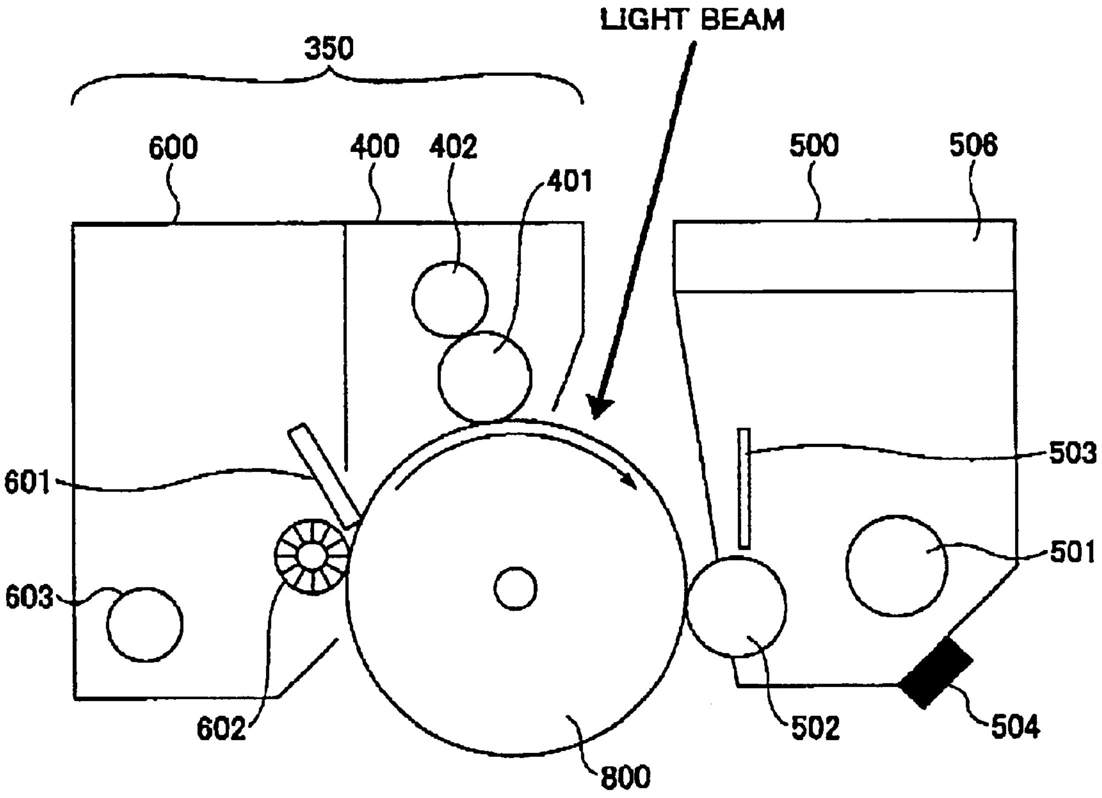
FIG. 40 is a schematic diagram showing a photosensitive body unit and a development unit of an image forming apparatus according to the 19$^{th}$ embodiment.

As shown in FIG. 40, in this embodiment, the development unit 500 and the photosensitive body unit 350 into which the photosensitive drum 800, the charging unit 400, and the cleaning unit 600 are built are constructed detachable from the image forming apparatus. The photosensitive body unit 350 and the development unit 500 are independently provided for each color. However, this embodiment is different from the seventeenth embodiment in that a backup toner tank 506 is provided above the development unit 500.

The backup toner tank 506 is replenished with toner from a toner cartridge (not shown). A predetermined amount of toner is always stored in the backup toner tank 506.

Figure 41:
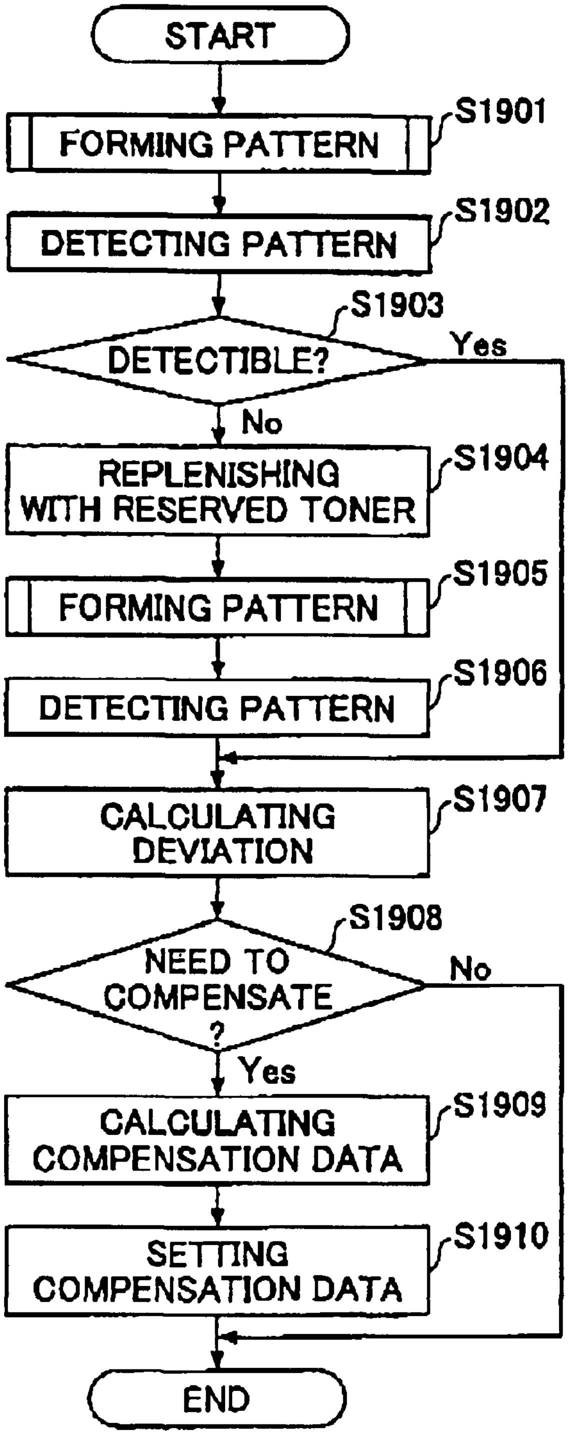
FIG. 41 is a flow chart showing the exemplary operation of the image forming apparatus according to the 19$^{th}$ embodiment.

FIG. 41 is a flow chart showing the operation of the image forming apparatus according to the nineteenth embodiment for compensating for the positional deviation. This operation is the same as the first exemplary operation of the seventh embodiment shown in FIG. 23, but is different in that, if the pattern for compensating for the image deviation formed in step S1901 is not detectible (No in step S1903), the toner is provided from the backup toner tank 506 (step S1904).

Besides the toner used when the ordinary images are formed, toner for compensating for the image density of the pattern for compensating for the image deviation is reserved in the reserved toner tank 506. Accordingly, the pattern for compensating for the image deviation of detectible image density can be formed without fail.

The structure in which the photosensitive body unit 350 and the development unit 500 are coupled is described above. Needless to say, the photosensitive body unit 350 and the development unit 500 may be built into the process cartridge and the reserved toner tank may be formed therein.

It is self-evident that the image forming according to this embodiment can perform the second exemplary operation of the image forming apparatus according to the seventh embodiment for compensating for the positional deviation.

[$20^{th}$ Embodiment]

An image forming apparatus according to the twentieth embodiment is described below. The structure of the image forming apparatus according to this embodiment and the controllers provided therein and the pattern for compensating for the image deviation are the same as those of the first embodiment.

In this embodiment, the development unit 500 and the photosensitive body unit 350 into which the photosensitive body drum 800, the charging unit 400, and the cleaning unit 600 are built are detachable from (and attachable to) the image forming apparatus. The photosensitive body unit 350 and the development unit 500 are independently provided for each color. In this embodiment, the reserved toner tank 506 is provided over the development unit 500 in the same manner as the nineteenth embodiment.

Figure 42:
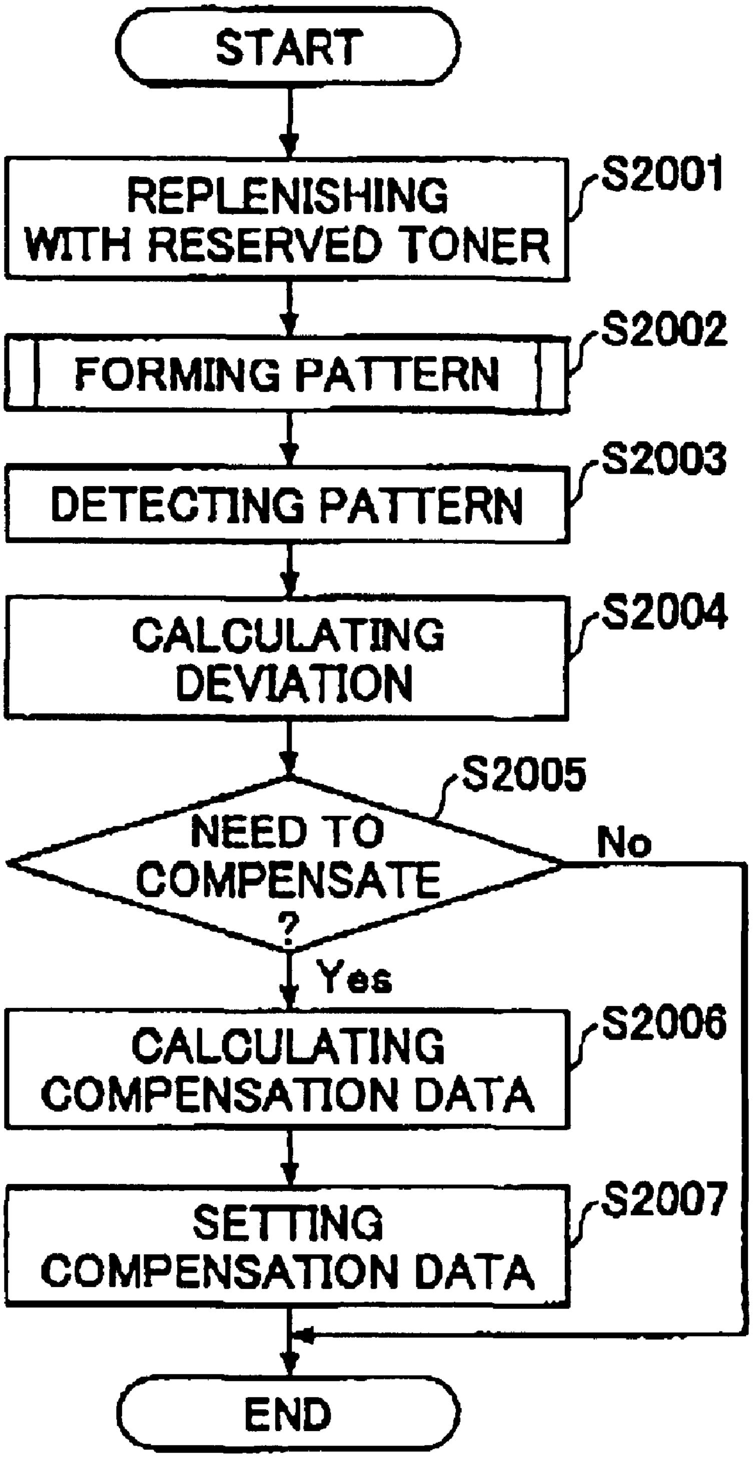
FIG. 42 is a flow chart showing the exemplary operation of an image forming apparatus according to the 20$^{th}$ embodiment.

FIG. 42 is a flow chart showing an exemplary operation of the image forming apparatus according to the twentieth embodiment for compensating for the positional deviation. The operation according to this embodiment is almost the same as that of the image forming apparatus according to the eighth embodiment.

However, the difference is that, before forming the pattern for compensating for the image deviation, toner is provided from the reserved toner tank 506 (step S2001).

After reserved toner is provided, if a determination is made that the image quality may be degraded due to the provided reserved toner based on the output level of the pattern detected by the sensors, images may be formed to consume the toner after the adjustment.

Toner may be reserved in the reserved toner tank 506 separately from the toner used when forming the ordinary images, and may be used for adjusting the image density of the pattern for compensating for the image deviation. Accordingly, the image density of the pattern for compensating for the image deviation can be adjusted to a detectible level without fail.

The case in which the photosensitive body unit 350 and the development unit 500 are coupled is described above. The photosensitive body unit 350 and the development unit 500 may be built into a process cartridge, and a reserved toner tank may be provided therein.

[$21^{st}$ Embodiment]

An image forming apparatus according to the twenty-first embodiment is described below. The structure of the image forming apparatus according to the twenty-first embodiment and the controllers provided therein and the pattern for compensating for the image deviation are the same as those of the first embodiment.

In this embodiment, the development unit 500 and the photosensitive body unit 350 into which the photosensitive body drum 800, the charging unit 400, and the cleaning unit 600 are detachable from the image forming apparatus. The photosensitive body unit 350 and the development unit 500 are provided independently for each color. A reserved toner tank 506 is provided over the development unit 500 in the same manner as the nineteenth embodiment.

The operation of the image forming apparatus according to the twenty-first embodiment is almost the same as the nineteenth and twentieth embodiments.

Figure 43:
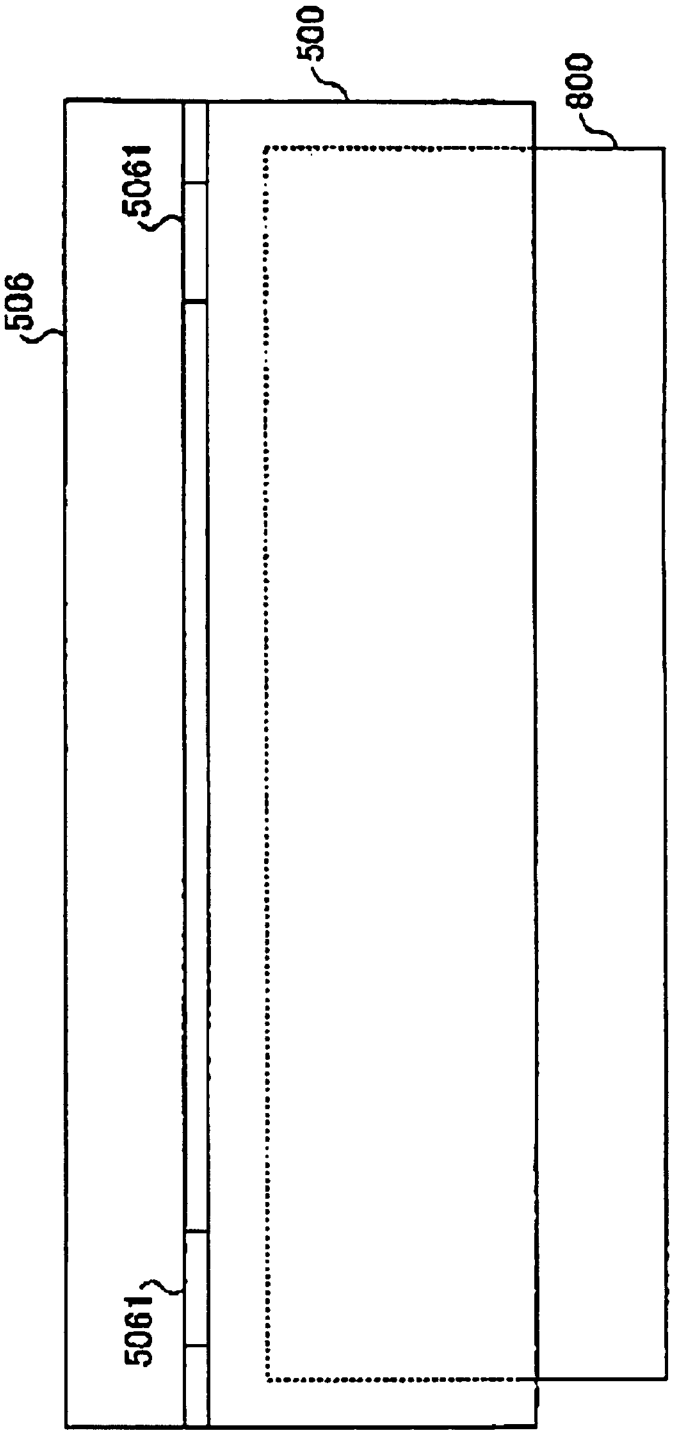
FIG. 43 is a schematic diagram showing a development unit of an image forming apparatus according to the 21$^{st}$ embodiment.

FIG. 43 is a schematic diagram showing the development unit 500 according to the embodiment seen from the right in FIG. 40 (the opposite direction to the photosensitive body drum 800).

As described above, the pattern for compensating for the image deviation is formed at both edges of the transfer belt as shown in FIG. 4. When the pattern is formed, the latent images of the patterns formed at both edges of the photosensitive body drum 800 need to be developed.

Accordingly, two supply openings 5061 through which toner is provided from the reserved toner tank 506 to the development unit 500 are provided at positions corresponding to respective edges of the photosensitive body drum 800.

Accordingly, since the supply openings 5061 through which toner is provided from the reserved toner tank 506 to the development unit 500 are provided at positions corresponding to respective edges of the photosensitive body drum 800, the detectible pattern for compensating for the image deviation can be formed without fail.

For example, in FIG. 4, if another pattern for compensating for the image deviation is desired to be formed, another supply opening may be provided in the middle of the photosensitive drum 800, which realizes similar effect as above.

[$22^{nd}$ Embodiment]

An image forming apparatus according to the $22^{nd}$ embodiment is described below. The structure of the image forming apparatus according to the embodiment and the controllers provided therein and the pattern for compensating for the image deviation are the same as those of the first embodiment.

Figure 44:
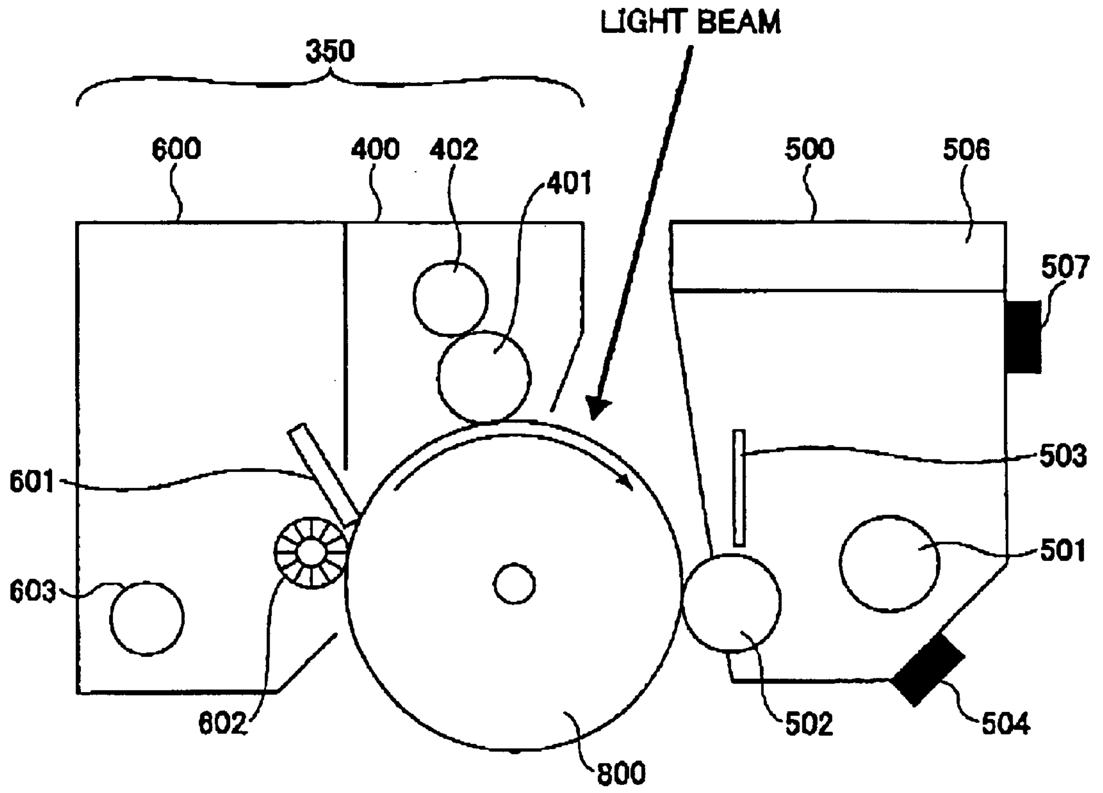
FIG. 44 is a schematic diagram showing the structure of a photosensitive body unit and a development unit of an image forming apparatus according to the 22$^{nd}$ embodiment.

In this embodiment, the development unit 500 above which the reserved toner tank 506 and the photosensitive body unit 350 into which the photosensitive body drum 800, the charging unit 400, and the cleaning unit 600 are built to be detachable from the image forming apparatus. The photosensitive body unit 350 and the development unit 500 are independently provided for each color. However, as shown in FIG. 44, a memory 507 is provided in the development unit 500.

The memory 507 is a non-volatile storage device that stores the toner amount to be provided to the development unit 500 from the reserved toner tank 506.

Figure 45:
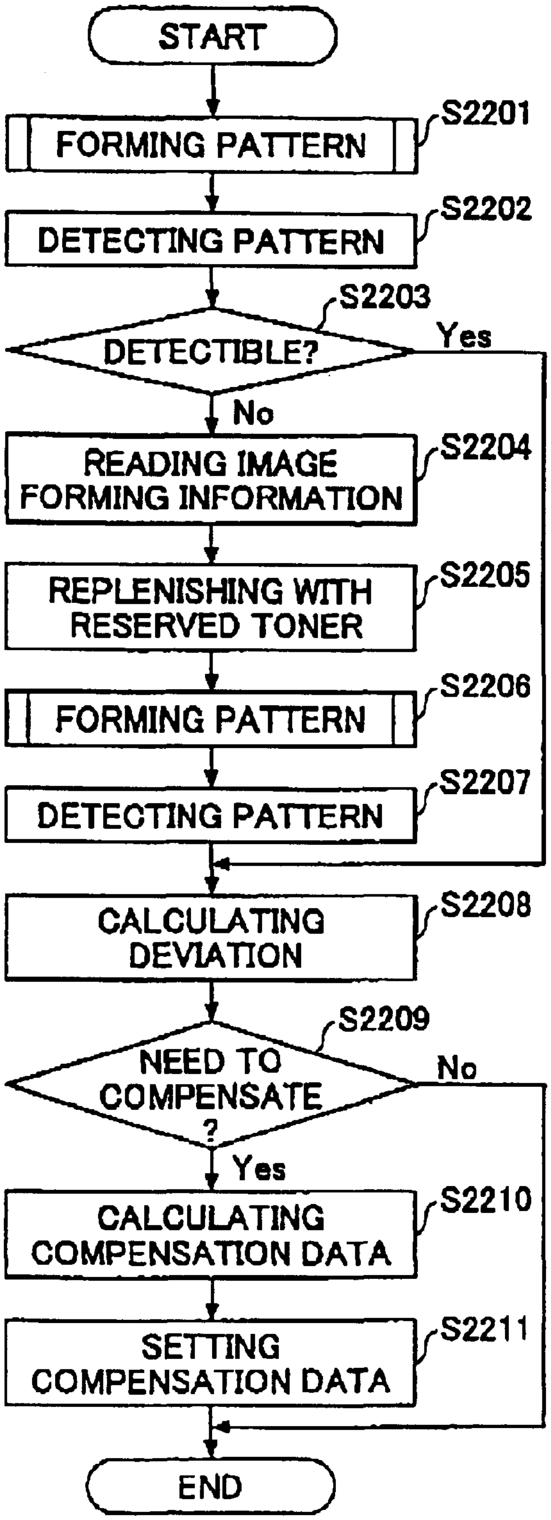
FIG. 45 is a flow chart showing the 1$^{st}$ exemplary operation of an image forming apparatus according to the 22$^{nd}$ embodiment.

FIG. 45 is a flow chart showing the first exemplary operation of the image forming apparatus according to the $22^{nd}$ embodiment for compensating for the positional deviation. This operation is almost the same as that of the image forming apparatus according to the, $19^{th}$ embodiment, however, it is different in that, when the pattern formed in step S2201 is not correctly detectible (No in step S2203), the printer controller 207 reads the toner amount stored in the memory 507 (step S2204) and provides toner of that amount from the reserved toner tank 506 to the development unit 500.

Figure 46:
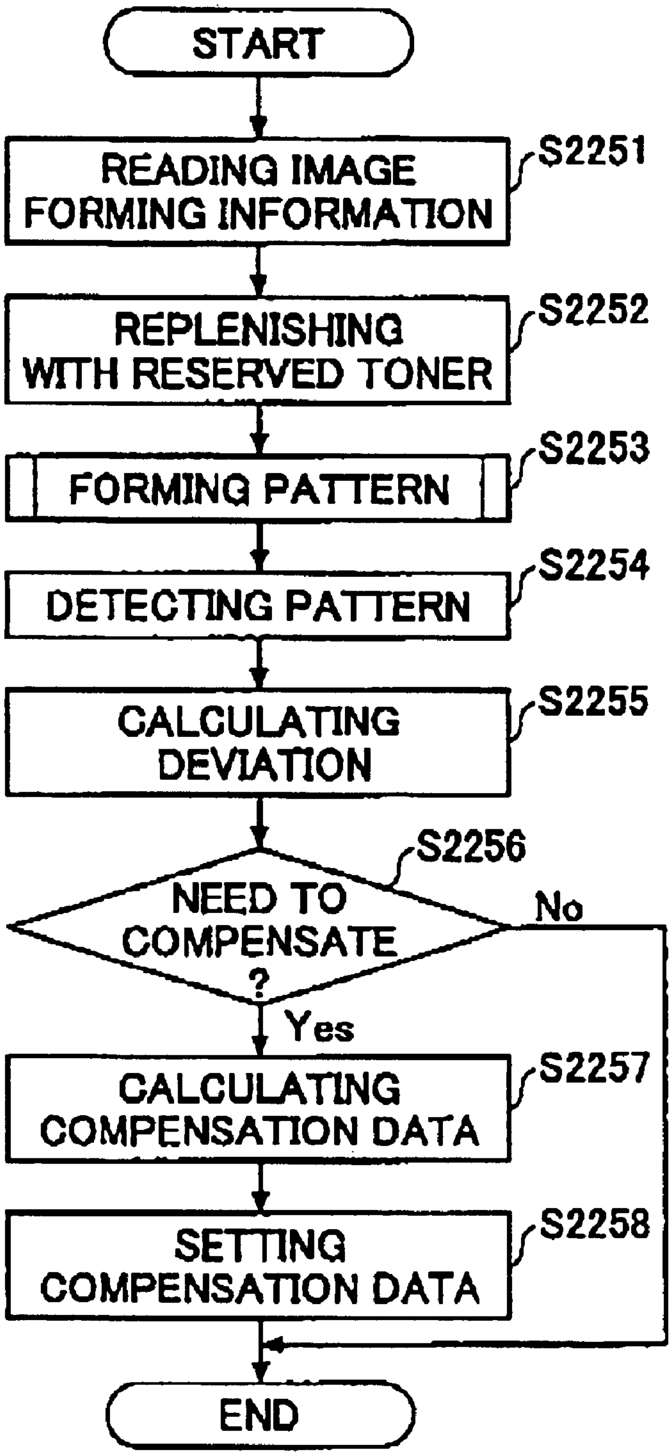
FIG. 46 is a flow chart showing the 2$^{nd}$ exemplary operation of the image forming apparatus according to the 22$^{nd}$ embodiment.

FIG. 46 is a flow chart showing the second exemplary operation of the image forming apparatus according to the $22^{nd}$ embodiment for compensating for the positional deviation.

This operation is almost the same as the operation of the image forming apparatus according to the $20^{th}$ embodiment for compensating the positional deviation.

However, before forming the pattern for compensating for the image deviation, the printer controller 207 reads the toner supply amount stored in the memory 507 (step S2251) and provides toner of the supply amount from the reserved tank 506 to the development unit 500 (step S2252).

If it is possible that the image to be formed after the adjustment is degraded by the supplied reserved toner, the toner may be consumed by performing an image forming operation for consuming the toner after the adjustment.

As described above, the toner supply amount to be supplied from the reserved toner tank 506 to the development unit 500 is stored in the memory 507, so that a detectible pattern for compensating for image deviation can be formed without fail.

If the toner amount to be supplied to the development unit 500 from the reserved toner tank 506 depends on the change over time and environmental change, the toner supply amount stored in the memory 507 may be updated. The compensation for the image deviation can always be performed without fail.

[$23^{rd}$ Embodiment]

An image forming apparatus according to the $23^{rd}$ embodiment is described below. The structure of the image forming apparatus according to the $23^{rd}$ embodiment and the controllers provided therein and the pattern for compensating for the image deviation are the same as those of the $1^{st}$ embodiment.

In this embodiment, the photosensitive body drum 800, the charging unit 400, the development unit 500, the cleaning unit 600 and the memory 700 are built into a process cartridge, of which structure is the same as that of the $16^{th}$ embodiment.

Figure 47:
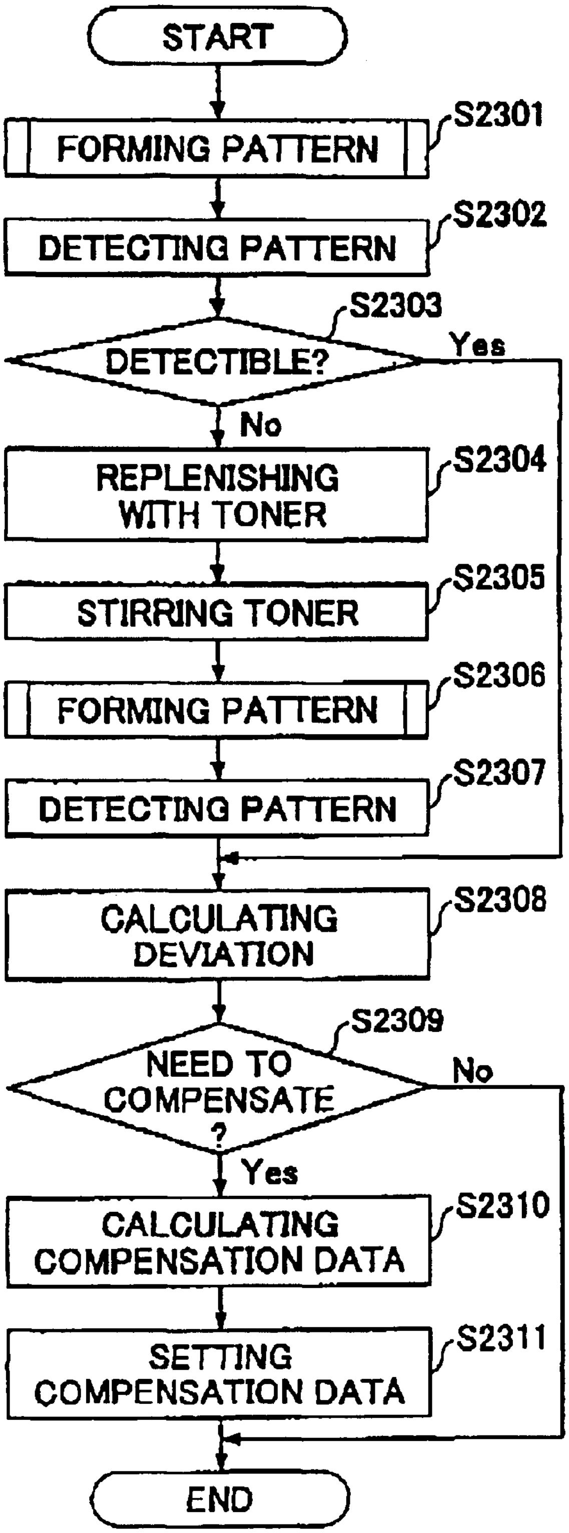
FIG. 47 is a flow chart showing the 1$^{st}$ exemplary operation of an image forming apparatus according to the 23$^{rd}$ embodiment.
Figure 48:
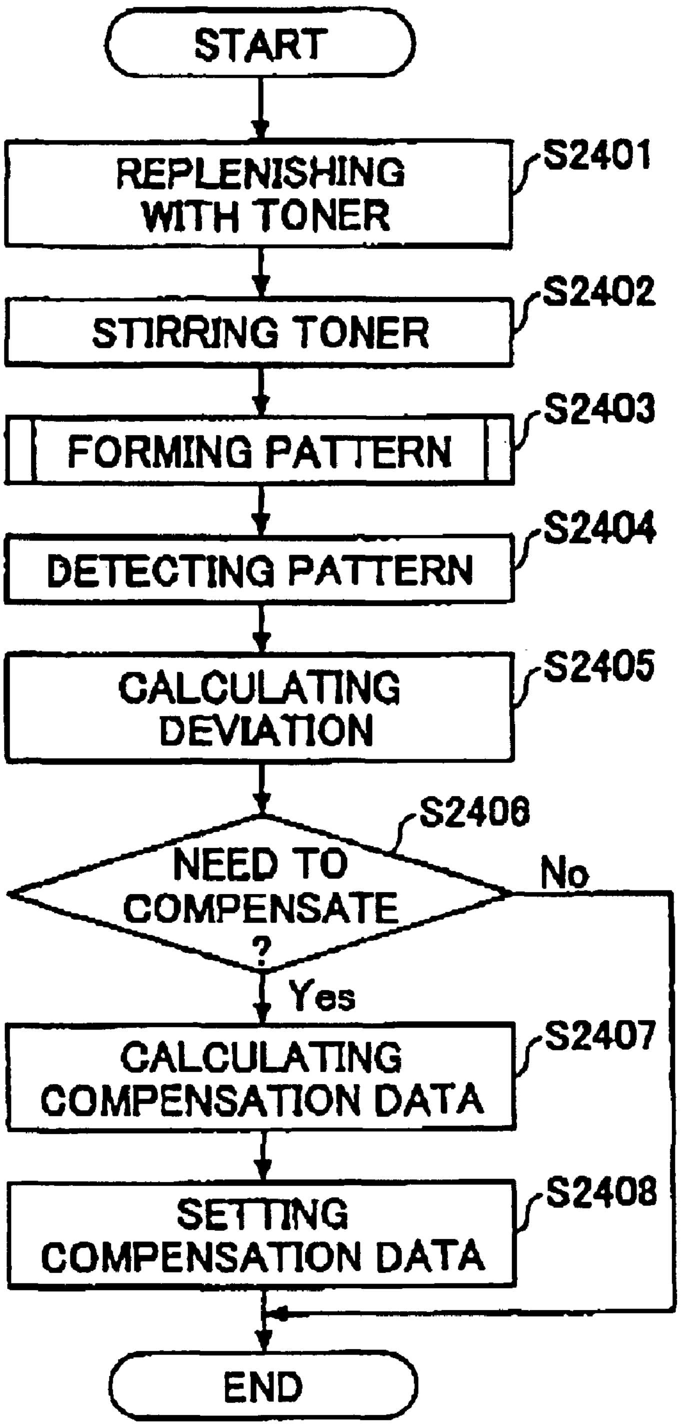
FIG. 48 is a flow chart showing the 2nd exemplary operation of an image forming apparatus according to the 23rd embodiment.

FIGS. 47 and 48 are flow charts showing the first and second exemplary operation, respectively, of the image forming apparatus according to the $23^{rd}$ embodiment for compensating for the positional deviation. These operations are almost the same as those of the $7^{th}$ and $8^{th}$ embodiments, respectively, but are different in that, if the toner amount is changed for forming the pattern for compensating, a stirring screw 501 is activated before forming the pattern for compensating, and mixes the toner and the developer by stirring.

In the $23^{rd}$ embodiment, because the toner supplied for increasing the image density of the pattern and the developer are stirred and mixed, the detectible pattern for compensating for the image deviation can be formed without fail. In addition, the time in which the toner and the developer are stirred and mixed may be stored in the memory 700 to make the quality of toner mixed with developer stable.

If it is possible that the images after the compensation are degraded by the supply of the reserved toner, the toner may be consumed by performing an image forming operation for consuming the excess toner.

[$24^{th}$ Embodiment]

An image forming apparatus according to the $24^{th}$ embodiment of the present invention is described below. The structure of the image forming apparatus according to the $24^{th}$ embodiment and the controllers provided therein and the pattern for compensating for the image deviation are the same as those of the $1^{st}$ embodiment.

Figure 49:
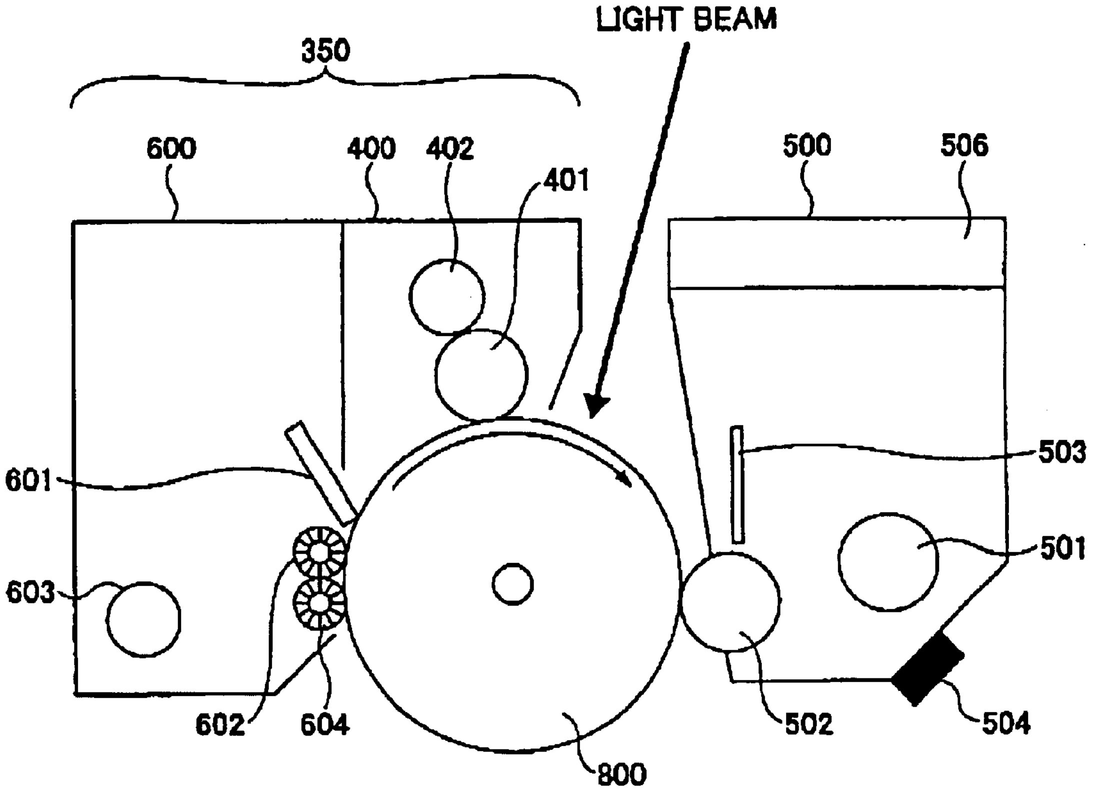
FIG. 49 is a schematic diagram showing a photosensitive body unit and a development unit of an image forming apparatus according to the 24th embodiment.

As shown in FIG. 49, in the $24^{th}$ embodiment, the photosensitive body unit 350 in which the photosensitive body drum 800, the charging unit 400, and the cleaning unit 600 are combined and the development unit 500 above which the reserved toner tank 506 is provided are structured to be detachable from the image forming apparatus in the same manner as the $19^{th}$ embodiment. The photosensitive body unit 350 and the development unit 500 are independently provided for each color.

Figure 50:
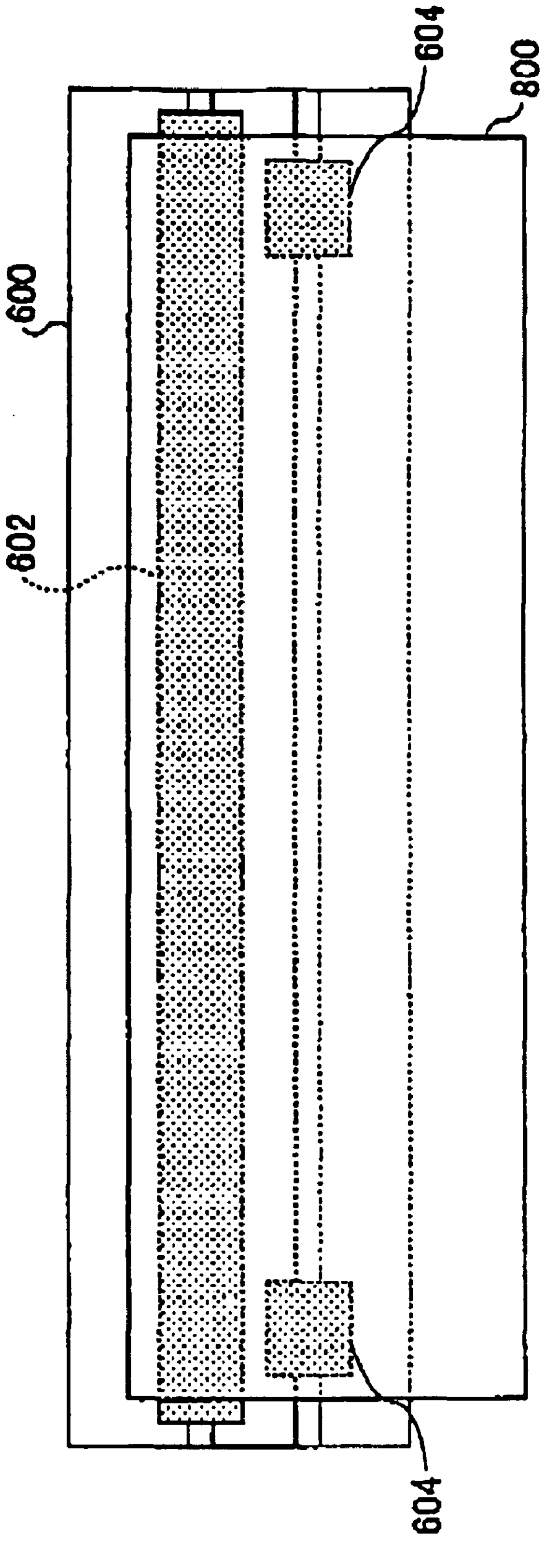
FIG. 50 is a schematic diagram showing the structure of a cleaning unit of an image forming apparatus according to the 24th embodiment.

FIG. 50 is a schematic diagram showing the cleaning unit 600 according to the $24^{th}$ embodiment seen from the left in FIG. 49 (the opposite the photosensitive body drum 800).

The image forming apparatus according to the $24^{th}$ embodiment forms the pattern for compensating for the image deviation at both edges of the transfer belt as shown in FIG. 4. Accordingly, when the pattern is formed, the electrostatic latent images are developed with toner formed at both edges of the photosensitive body drum 800.

Accordingly, besides the cleaning roller 602 that cleans the entire surface of the photosensitive body drum 800, two second cleaning brushes 604 that clean the portion of the surface of the photosensitive body drum 800 where the latent image of the pattern is formed are provided.

Because the members that clean the position corresponding to the latent image of the pattern for compensating for the image deviation on the photosensitive body are provided, the detectible pattern can be formed without fail.

For example, in FIG. 4, if another pattern is desired to be formed in the middle of the transfer belt, another second cleaning brush 604 that cleans the center portion of the photosensitive drum 800 may be provided to achieve the above effect.

If the second cleaning brushes 604 are provided, the contrast of the pattern to the background becomes higher. The printer controller 207 can detect the pattern for compensating for the image deviation with the sensors 105 and 106 without fail.

The preferred embodiments of the present invention are described above. The present invention is not limited to these embodiments, but various variations and modifications may be made without departing from the scope of the present invention.

For example, although the image forming apparatus is assumed to have a drum-shaped photosensitive body, the shape of the photosensitive body may be different from a drum.

It is assumed that the image forming apparatus described above forms a color image by superposing monochrome images corresponding to the four colors yellow, magenta, cyan, and black. However, the present invention is applicable to an image forming apparatus that superposes at least two images. The image forming apparatus may superpose images of the same color formed separately.

As is apparent from the above description, an image forming apparatus that can compensate for image deviation without fail, a process cartridge, a photosensitive body unit, and a development unit used therein, and a method of compensating for the image positional deviation are provided.

This patent application is based on Japanese Priority Patent Application No. 2002-229255 filed on Aug. 6, 2002, and No. 2003-202102 filed on Jul. 25, 2003, the entire contents of which are hereby incorporated by reference.

What is claimed is:

1. An image forming apparatus that forms a multi-color image by superposing a plurality of monochrome images, comprising:

a plurality of image forming units corresponding to respective colors, each of which forms said corresponding monochrome image;

a plurality of pattern forming units corresponding to the respective colors, each of which forms a predetermined compensation pattern;

a plurality of pattern position detecting units corresponding to the respective colors, each of which detects the position of said compensation pattern formed by said pattern forming unit of the corresponding color; and a plurality of image position adjusting units corresponding to the respective colors, each of which adjusts the position of said monochrome image to be formed by said image forming unit based on the position of said compensation pattern detected by said pattern position detecting unit of the corresponding color;

wherein said compensation pattern is formed under an image forming condition adjustable independently from an image forming condition with which said monochrome image formed by said image forming unit of the corresponding color is formed.

2. The image forming apparatus as claimed in claim 1, wherein each of said plurality of image forming units further comprises:

one of a rotating and a moving image retaining unit on which a latent monochrome image is formed by scanning said image retaining unit with a light beam based on image data;

a development unit that makes said formed latent monochrome image visible; and one of a rotating and a moving transfer unit that transfers said visible monochrome image to a recording medium.

3. The image forming apparatus as claimed in claim 2, wherein said image forming condition is adjusted by changing exposure energy of said light beam.

4. The image forming apparatus as claimed in claim 3, wherein said exposure energy of said light beam is adjusted by changing light intensity of said light beam.

5. The image forming apparatus as claimed in claim 3, wherein said exposure energy of said light beam is adjusted by changing time in which said light beam is radiated.

6. The image forming apparatus as claimed in claim 2, wherein said image forming condition is adjusted by changing bias voltage applied to said development unit.

7. The image forming apparatus as claimed in claim 2, wherein said image forming condition is adjusted by changing bias voltage applied to said transfer unit.

8. The image forming apparatus as claimed in claim 2, wherein said development unit makes said formed latent monochrome image visible with toner; and said image forming condition is adjusted by changing amount of toner to be used to make said formed latent monochrome image visible.

9. The image forming apparatus as claimed in claim 8, wherein if the amount of remaining toner is lower than a predetermined level, said amount of toner to be used to make said formed latent monochrome image visible is changed.

10. The image forming apparatus as claimed in claim 8, wherein if said amount of toner is changed, said toner is stirred before forming said latent monochrome image.

11. The image forming apparatus as claimed in claim 2, wherein said image forming condition is adjusted by changing scan speed at which said light beam scans said image retaining unit.

12. The image forming apparatus as claimed in claim 2, wherein said image forming condition is adjusted by changing one of moving speed and rotative speed of said image retaining unit.

13. The image forming apparatus as claimed in claim 2, wherein said image forming condition is adjusted by changing at least two of exposure energy by said light beam, bias voltage of said development unit, bias voltage of said transfer unit, toner amount to be used for making said formed latent monochrome image visible, scan speed at which said light beam scans said image retaining unit, and one of moving speed and rotative speed of said image retaining unit.

14. The image forming apparatus as claimed in claim 2, wherein said image retaining unit coupled with at least one of a charging unit that charges said image retaining unit, said development unit, and a cleaning unit that cleans said image retaining unit forms a detachable process cartridge.

15. The image forming apparatus as claimed in claim 14, wherein said process cartridge further comprises a memory unit that stores said image forming condition under which said compensation pattern is formed; and said process cartridge, when forming said compensation pattern, reads said image forming condition stored in said memory unit and forms said compensation pattern under the read image forming condition.

16. The image forming apparatus as claimed in claim 15, wherein said image forming condition stored in said memory unit is rewritable.

17. The image forming apparatus as claimed in claim 16, wherein said image forming condition with which said monochrome image is formed is stored in said memory unit; and when said monochrome image is formed, said image forming condition with which said monochrome image is formed is read from said memory unit, and said monochrome image is formed under the read image forming condition.

18. The image forming apparatus as claimed in claim 17, wherein said image forming condition with which said monochrome image is formed stored in said memory unit is rewritable.

19. The image forming apparatus as claimed in claim 14, wherein said process cartridge has a room in which reserved toner is stored; and if image density of said compensation pattern is equal to or less than a predetermined density, said reserved toner stored in said room is provided to said development unit.

20. The image forming apparatus as claimed in claim 19, wherein said process cartridge provides said reserved toner to a portion of said developing unit that forms said compensation pattern.

21. The image forming apparatus as claimed in claim 19, wherein amount of reserved toner provided to said portion of said developing unit is stored in said memory unit.

22. The image forming apparatus as claimed in claim 19, wherein said process cartridge, before forming said compensation pattern, stirs said reserved toner to be provided to said development unit.

23. The image forming apparatus as claimed in claim 2, wherein said image retaining unit coupled with at least one of a charging unit that charges said image retaining unit and a cleaning unit that cleans said image retaining unit forms a detachable photosensitive body unit; and said development unit forms a detachable developing unit.

24. The image forming apparatus as claimed in claim 23, wherein at least one of said photosensitive body unit and said development unit has a memory unit to store an image forming condition to be used when said compensation pattern is formed; and when said compensation pattern is formed, said image forming condition stored in said memory unit is read, and said compensation pattern is formed using said read image forming condition.

25. The image forming apparatus as claimed in claim 24, wherein said image forming condition stored in said memory unit is rewritable.

26. The image forming apparatus as claimed in claim 24, wherein said image forming condition of said monochrome image is stored in said memory unit; and when said monochrome image is formed, said image forming condition of said monochrome image is read from said memory unit, and said monochrome image is formed using said image forming condition of said monochrome image.

27. The image forming apparatus as claimed in claim 26, wherein said image forming condition of a monochrome image stored in said memory unit is rewritable.

28. The image forming apparatus as claimed in claim 23, wherein said development unit is provided with a space for storing reserved toner; and when image density of said formed compensation pattern is lower than a predetermined density, said reserved toner stored in said space can be supplied to said development unit.

29. The image forming apparatus as claimed in claim 28, wherein said reserved toner is supplied to a portion of said development unit that forms said compensation pattern.

30. The image forming apparatus as claimed in claim 28, wherein said development unit is provided with a memory for storing the supplied amount of said reserved toner.

31. The image forming apparatus as claimed in claim 28, wherein said development unit stirs said reserved toner provided thereto before forming said compensation pattern.

32. The image forming apparatus as claimed in claim 2, further comprising a cleaning unit that cleans a position of said image retaining unit at which said compensation pattern is formed.

33. The image forming apparatus as claimed in claim 2, wherein said compensation pattern of each color is formed under said image forming condition for forming said monochrome image.

34. A process cartridge that is used for an image forming apparatus of claim 2, comprising:

said image retaining unit;

at least one of a charging unit that charges said image retaining unit, said development unit, and a cleaning unit that cleans said image retaining unit;

a memory unit that stores said image forming condition to be used when said compensation pattern is formed;

wherein said image retaining unit and at least one of said charging unit, said development unit, and said cleaning unit are combined and detachable from said image forming apparatus.

35. The process cartridge as claimed in claim 34, wherein said image forming condition of said compensation pattern stored in said memory unit is rewritable.

36. The process cartridge as claimed in claim 34, wherein said memory unit stores said image forming condition to be used when said monochrome image is formed.

37. The process cartridge as claimed in claim 36, wherein said image forming condition of said monochrome image stored in said memory unit is rewritable.

38. The process cartridge as claimed in claim 34, further comprising a space in which reserved toner is stored;

wherein, when image density of said formed compensation pattern is lower than a predetermined density, said reserved toner stored in said space can be provided to said development unit.

39. The process cartridge as claimed in claim 38, wherein said reserved toner is provided to a portion of said development unit that forms said compensation pattern.

40. The process cartridge as claimed in claim 38, further comprising a memory unit that stores the supplied amount of said reserved toner.

41. The process cartridge as claimed in claim 38, wherein said reserved toner supplied to said development unit is stirred before forming said compensation pattern.

42. A photosensitive body unit used for the image forming apparatus of claim 2, wherein said photosensitive body unit is structured by said image retaining unit combined with at least one of a charging unit that charges said image retaining unit and a cleaning unit that cleans said image retaining unit; and said photosensitive body unit is provided with a memory unit that stores said image forming condition used when said compensation pattern is formed.

43. The photosensitive body unit as claimed in claim 42, wherein said image forming condition of said compensation pattern stored in said memory unit is rewritable.

44. The photosensitive body unit as claimed in claim 42, wherein said memory unit stores said image forming condition used when said monochrome image is formed.

45. The photosensitive body unit as claimed in claim 44, wherein said image forming condition of said monochrome image stored in said memory unit is rewritable.

46. The photosensitive body unit as claimed in claim 42, further comprising a cleaning unit that cleans a position on said image retaining unit at which said compensation pattern is formed.

47. A detachable development unit that is used for the image forming apparatus as claimed in claim 2, comprising a memory unit that stores said image forming condition to be used when said compensation pattern is formed.

48. The development unit as claimed in claim 47, wherein said image forming condition of said compensation pattern stored in said memory unit is rewritable.

49. The development unit as claimed in claim 48, wherein said memory unit stores said image forming condition to be used when said monochrome image is formed.

50. The development unit as claimed in claim 49, wherein said image forming condition of said monochrome image stored in said memory unit is rewritable.

51. The development unit as claimed in claim 47, further comprising a space in which reserved toner is stored;

wherein, if image density of said formed compensation pattern is less than a predetermined density, said reserved toner can be supplied to said development unit.

52. The development unit as claimed in claim 51, wherein said reserved toner is supplied to a portion of said development unit that forms said compensation pattern.

53. The development unit as claimed in claim 51, further comprising a memory unit that stores the supplied amount of said reserved toner.

54. The development unit as claimed in claim 51, wherein said reserved toner provided to said development unit is stirred before forming said compensation pattern.

55. An image forming apparatus that forms a multi-color image by superposing at least two monochrome images, comprising:

means for forming a plurality of monochrome images one provided for each color;

means for forming a plurality of predetermined compensation patterns one provided for each color;

means for detecting positions of said formed compensation patterns provided for each color; and means for adjusting positions of said monochrome images to be formed based on the positions of said detected compensation patterns provided for each color;

wherein said compensation pattern is formed under an image forming condition adjustable independently from another image forming condition under which said monochrome images are formed.

56. The image forming apparatus as claimed in claim 55, wherein said means for forming monochrome images further comprises:

means for retaining a latent monochrome image formed by scanning said means for retaining a latent monochrome image with a light beam based on image data; said means for retaining a latent monochrome image rotating or moving;

means for developing said latent monochrome image formed on said means for retaining a latent monochrome image; and means for transferring said developed monochrome image to a recording medium that is rotating or moving.

57. The image forming apparatus as claimed in claim 56, wherein said image forming condition is adjusted by changing exposure energy of said light beam.

58. The image forming apparatus as claimed in claim 57, wherein said exposure energy of said light beam is adjusted by changing light intensity of said light beam.

59. The image forming apparatus as claimed in claim 57, wherein said exposure energy of said light beam is adjusted by changing time in which said light beam is radiated.

60. The image forming apparatus as claimed in claim 56, wherein said image forming condition is adjusted by changing bias voltage applied to said means for developing said latent monochrome image.

61. The image forming apparatus as claimed in claim 56, wherein said image forming condition is adjusted by changing bias voltage applied to said means for transferring said developed monochrome image.

62. The image forming apparatus as claimed in claim 56, wherein said means for developing said latent monochrome image make said formed latent monochrome image visible with toner; and said image forming condition is adjusted by changing the amount of toner to be used to make said formed latent monochrome image visible.

63. The image forming apparatus as claimed in claim 62, wherein if the amount of remaining toner is lower than a predetermined level, said amount of toner to be used to make said formed latent monochrome image visible is changed.

64. The image forming apparatus as claimed in claim 56, wherein said image forming condition is adjusted by changing scan speed at which said light beam scans said means for retaining said latent monochrome image.

65. The image forming apparatus as claimed in claim 56, wherein said image forming condition is adjusted by changing at least two of exposure energy of said light beam, bias voltage of said means for developing said latent monochrome image, bias voltage of said means for transferring said developed monochrome image, toner amount to be used for making said formed latent monochrome image visible, scan speed at which said light beam scans said means for retaining said latent monochrome image, and one of moving speed and rotative speed of said image retaining unit.

66. A method of compensating for image deviation, using an image forming apparatus that forms a color image by superposing a plurality of monochrome images, comprising the steps of:

setting an image forming condition with which a prescribed compensation pattern for compensating for said image deviation of each monochrome image is formed;

forming said prescribed compensation pattern of each monochrome image using said set image forming condition;

detecting the position of said formed compensation pattern;

adjusting the position at which each monochrome image is formed based on said determined pattern position.

67. The method as claimed in claim 66, further comprising the step of determining whether said formed compensation pattern is detectible;

wherein the step of setting said image forming condition, the step of forming said prescribed compensation pattern of each monochrome image, and the step of detecting said pattern position are repeated until said formed compensation pattern is determined to be detectible before said image position is adjusted.

68. The method as claimed in claim 67, wherein said image forming condition is set by adjusting exposure energy of a light beam.

69. The method as claimed in claim 68, wherein said exposure energy of said light beam is adjusted by changing light intensity of said light beam.

70. The method as claimed in claim 68, wherein said exposure energy of said light beam is adjusted by changing time in which said light beam is radiated.

71. The method as claimed in claim 66, wherein said image forming condition is set by changing bias voltage applied to a development unit.

72. The method as claimed in claim 66, wherein said image forming condition is set by changing bias voltage applied to a transfer unit.

73. The method as claimed in claim 66, wherein said compensation pattern is made visible from a latent pattern with toner; and said image forming condition is set by changing the amount of toner to be used to make said latent pattern visible.

74. The method as claimed in claim 66, wherein, if the amount of remaining toner is lower than a predetermined level, the amount of said toner to be used to make said latent pattern visible is changed.

75. The method as claimed in claim 66, wherein, if the amount of said toner is changed, said toner is stirred before forming said latent pattern.

76. The method as claimed in claim 66, wherein said image forming condition is adjusted by changing scan speed at which a light beam scans an image to be retained.

77. The method as claimed in claim 66, wherein said image forming condition is adjusted by changing moving speed or rotative speed of an image retaining unit.

78. The method as claimed in claim 66, wherein said image forming condition is adjusted by changing at least two of exposure energy by a light beam, bias voltage of a development unit, bias voltage of a transfer unit, the amount of toner to be used for making a formed latent pattern visible, and scan speed at which a light beam scans an image retaining unit.

79. The method as claimed in claim 66, further comprising the step of reading said image forming condition with which said prescribed compensation pattern is formed, stored in a memory unit;

wherein said prescribed compensation pattern is formed using said read image forming condition.

80. The method as claimed in claim 66, wherein said image forming condition with which said compensation pattern is formed is different from another image forming condition with which said plurality of monochrome images are formed.

* * * * *